US008554657B2

(12) United States Patent
von der Borch

(10) Patent No.: US 8,554,657 B2
(45) Date of Patent: Oct. 8, 2013

(54) FINANCIAL SYSTEM AND METHOD

(75) Inventor: John von der Borch, Middle Park (AU)

(73) Assignee: Holzhausen Pty Ltd., Middle Park, Victoria (AU)

( * ) Notice: Subject to any disclaimer, the term of this patent is extended or adjusted under 35 U.S.C. 154(b) by 0 days.

(21) Appl. No.: 13/513,274

(22) PCT Filed: Dec. 10, 2010

(86) PCT No.: PCT/AU2010/001673
§ 371 (c)(1),
(2), (4) Date: Jun. 1, 2012

(87) PCT Pub. No.: WO2011/069211
PCT Pub. Date: Jun. 16, 2011

(65) Prior Publication Data
US 2012/0239593 A1    Sep. 20, 2012

(30) Foreign Application Priority Data
Dec. 10, 2009    (AU) ................................ 2009906029

(51) Int. Cl.
    *G06Q 40/00*    (2012.01)
(52) U.S. Cl.
    USPC .......................................... 705/36 R; 705/30
(58) Field of Classification Search
    USPC ..................................................... 705/10–44
    See application file for complete search history.

(56) References Cited

U.S. PATENT DOCUMENTS

| | | | |
|---|---|---|---|
| 6,643,639 B2 * | 11/2003 | Biebesheimer et al. ...... | 707/709 |
| 7,263,496 B1 * | 8/2007 | Weigelt et al. ............... | 705/7.25 |
| 7,974,904 B2 * | 7/2011 | Frischer ...................... | 705/36 R |
| 8,219,479 B1 * | 7/2012 | D'Amico ..................... | 705/36 R |
| 8,442,908 B2 * | 5/2013 | Niccolini et al. ............. | 705/38 |
| 2005/0131791 A1 * | 6/2005 | MacMillan et al. .......... | 705/35 |
| 2006/0293985 A1 * | 12/2006 | Lederman et al. ............. | 705/35 |
| 2007/0118451 A1 | 5/2007 | Schneider | |
| 2010/0074029 A1 * | 3/2010 | Katayama ................ | 365/185.29 |
| 2010/0145877 A1 | 6/2010 | Haug | |

(Continued)

FOREIGN PATENT DOCUMENTS

WO        02099576       12/2002

OTHER PUBLICATIONS

International Search Report and Written Opinion issued in connection with PCT/AU2010/001673, dated Feb. 17, 2011.

(Continued)

*Primary Examiner* — Frantzy Poinvil
(74) *Attorney, Agent, or Firm* — Vedder Price P.C.

(57) ABSTRACT

The present invention relates to a data processing method and system for predicting income derived from an anticipated future benefit (Horizon Gain), wherein the system comprises: (a) registration means for registering a borrower in a first database and for registering characteristics a lender in a second database; (b) first automated means for inputting values to a first database; (c) automated means for generating databases as necessary populated with values for one or more selected future time divisions for the borrower's asset over one or more AD's before optimization, the values being calculated according to a predetermined formulae; (d) visual display means to represent predicted income derived from the anticipated future benefit; (e) automated means for responding to a redemption event by determining the value of a payment to the lender that is the greater of, (i) an agreed proportion of appreciation of the asset (HGAV), or (ii) qualifying outgoings (QO).

31 Claims, 43 Drawing Sheets

(56) References Cited

U.S. PATENT DOCUMENTS

2011/0153508 A1* 6/2011 Jhunjhunwala ............... 705/306
2011/0173109 A1* 7/2011 Synesiou et al. ................ 705/34
2012/0239593 A1* 9/2012 von der Borch ............ 705/36 R

OTHER PUBLICATIONS

International Preliminary Report on Patentability issued in connection with PCT/AU2010/001673, dated Jun. 12, 2012.

* cited by examiner

| 25 years | BORROWER BENEFITS: HOME ANNUATION IN LIEU OF SHARED APPRECIATION |||||||||
| --- | --- | --- | --- | --- | --- | --- | --- | --- |
|  | HA | SAM | HA | SAM | HA | SAM | HA | SAM |
| Home appreciation rate | 0.00% | 0.00% | 4.00% | 4.00% | 5.00% | 5.00% | 7.00% | 7.00% |
| Value of property | $500,000 | $500,000 | $500,000 | $500,000 | $500,000 | $500,000 | $500,000 | $500,000 |
| Value of property (year 25) | $500,000 | $500,000 | $1,332,918 | $1,332,918 | $1,693,177 | $1,693,177 | $2,713,716 | $2,713,716 |
| Income received by Borrower | $110,343 | $100,000 | $110,343 | $100,000 | $110,343 | $100,000 | $110,343 | $100,000 |
| Lender's appreciation share (40%) | $0 | $0 | $0 | $416,459 | $0 | $595,588 | $0 | $1,106,858 |
| Repayment of Principal | $110,343 | $100,000 | $416,459 | $100,000 | $595,588 | $100,000 | $1,106,858 | $100,000 |
| Total repaid by borrower to lender | $110,343 | $100,000 | $416,459 | $516,459 | $596,588 | $695,588 | $1,106,858 | $1,205,858 |
| Cost of borrowing | $0 | $0 | -$306,115 | -$416,459 | -$486,245 | -$596,588 | -$996,514 | -$1,106,858 |
| Home Annuation Saving to | $110,343 |  | $110,343 |  | $110,343 |  | $110,343 |  |
| Borrower's cost of finance | 0% | 0% | 5.45% | 6.79% | 6.98% | 8.07% | 9.66% | 10.48% |

| 25 years | LENDERS MARGIN COMPARISON: HOME ANNUATION V SHARED APPRECIATION (ACCOUNTING FOR FUNDING COSTS) |||||||||
| --- | --- | --- | --- | --- | --- | --- | --- | --- |
|  | HA | SAM | HA | SAM | HA | SAM | HA | SAM |
| Home appreciation rate | 0.00% | 0.00% | 4.00% | 4.00% | 5.00% | 5.00% | 7.00% | 7.00% |
| Value of property | $500,000 | $500,000 | $500,000 | $500,000 | $500,000 | $500,000 | $500,000 | $500,000 |
| Value of property (year 25) | $500,000 | $500,000 | $1,332,918 | $1,332,918 | $1,693,177 | $1,693,177 | $2,713,716 | $2,713,716 |
| Income received by Borrower | $110,343 | $100,000 | $110,343 | $100,000 | $110,343 | $100,000 | $110,343 | $100,000 |
| Lender's cost of funding (5%) | $96,771 | $338,635 | $96,771 | $338,635 | $96,771 | $338,635 | $96,771 | $338,635 |
| Lender's total cost | $207,115 | $438,635 | $207,115 | $438,635 | $207,115 | $438,635 | $207,115 | $438,635 |
| Lender's principal repayment value | $110,343 | $100,000 | $0 | $100,000 | $0 | $100,000 | $0 | $100,000 |
| Lender's appreciation share (40%) | $0 | -$338,635 | $416,459 | $416,459 | $596,588 | $596,588 | $1,106,858 | $1,106,858 |
| Lender's Profit / Loss | -$95,771 | -$338,635 | $209,344 | $77,823 | $389,473 | $257,953 | $899,743 | $768,222 |
| Lender's Return | -2.49% | -5.74% | 2.83% | 0.66% | 4.32% | 1.87% | 6.93% | 4.13% |

Figure 33

FINANCIAL SYSTEM AND METHOD

RELATED APPLICATIONS

This application claims priority to Australian Provisional Patent Application No. 2009906029 in the name of Holzhausen Pty Ltd, which was filed on 10 Dec. 2009, entitled "Financial System and Method" and the specification thereof is incorporated herein by reference in its entirety and for all purposes.

FIELD OF THE INVENTION

The present invention relates to a data processing method and system which may be used in relation to various financial matters including, but not limited to, income, capital gain, investment and saving.

While the description of the invention herein is primarily concerned with home annuation and the novel systems and processes required to source, price, integrate and manage such arrangements, it will be appreciated that the invention is not limited to these applications and can be applied to numerous other financial arrangements and any type of asset that can appreciate in value. Furthermore, for convenience the description of the invention herein is primarily concerned with consumers, superannuation and retirement funds/investors however it will be appreciated that the invention is not so limited and can be used by a wide variety of customers.

BACKGROUND ART

It is to be appreciated that any discussion of documents, devices, acts or knowledge in this specification is included to explain the context of the present invention. Further, the discussion throughout this specification comes about due to the realisation of the inventor and/or the identification of certain related art problems by the inventor. Moreover, any discussion of material such as documents, devices, acts or knowledge in this specification is included to explain the context of the invention in terms of the inventors knowledge and experience and, accordingly, any such discussion should not be taken as an admission that any of the material forms part of the prior art base or the common general knowledge in the relevant art in Australia, or elsewhere, on or before the priority date of the disclosure and claims herein.

The financial industry is an amalgam of many different financial entities and trusts that offer a wide variety of services, products and schemes. In general, the financial services industry generates revenue by providing a range of services to its customers.

One of the best known processes of the financial industry consists of borrowing from consumers (taking their deposits) at a given interest rate and then lending back to consumers (potentially the same monies in part) at a higher rate of interest, thereby generating a revenue for the financial industry. This process produces a net loss for most consumers. Only a comparatively small proportion of consumers avoid a net loss, typically by using the money borrowed from the finance industry in high risk or speculative investments.

As the financial industry has evolved, more complicated financial products have been developed, such as 'securitisation'. Securitisation is based on aggregation of debt instruments (commonly mortgages) in a pool, which is then sold to third parties. Securitisation is popular because it enables the financial industry, including mortgage originators, to clear their balance sheets and facilitates further transactions with the consumer through continued lending (see FIG. 1). Pension and Superannuation funds have emerged as a substantial source of pooled wealth, and the financial industry has been entrusted by Governments worldwide to manage consumers' retirement funds. When securitisation is taken up by pension and Superannuation fund managers (and when Governments fund securitisation), a consumer who borrows money from the financial industry, is effectively paying the financial industry a premium to borrow their own pension or superannuation money (see FIG. 1a). Many recent innovations in mortgage and finance products incorporate an integrated securitisation feature. These include, for example, reverse mortgage products such as those offered by Bluestone Group Pty Ltd, conventional mortgages provided by, non-deposit taking lenders and equity finance mortgages as described in Australian innovation patent Nos. 2007100448, 2007100445, 2005100871, 2005100869, 2005100868, 2005100867, 2005100865, 2005100864. Sometimes securitization of shared appreciation mortgage pools involves introduction of debt into the pool in order that investor yields can be smoothed. Borrowings can be distributed as annual yield in the expectation that real investment return on the underlying mortgage investments at a future date will repay the principal and cost of the debt.

In response to consumer and Government demand for innovation in the financial industry to improve the affordability of housing, a number of shared equity or equity finance products have arisen. These products attempt to better align the financial industry's revenue generation systems and models more closely with consumer interests.

Since 1996 in the UK Shared Appreciation Mortgages (SAMs) have been offered to consumers by Barclays and the Royal Bank of Scotland. SAMs involve a lender advancing a defined sum of money at settlement in return for a percentage share of the future capital appreciation of the real property asset over which it is secured. The nature of a SAM, whereby a defined value is lent, yet the repayment can continue to grow exponentially, has resulted in a class action against HBOS and Barclays.

Various SAM and equity release schemes have also operated in the United States. U.S. Pat. No. 5,983,206 relates to a system for creating single mortgages with multiple obligations which allow for financing through a combination of mortgage debt and equity participation in the underlying property value. The US Department of Housing and Urban development also administers Home Equity Conversion Mortgages that are a type of Reverse mortgage available to those 62 years of age and above.

In Australia shared appreciation mortgages, also known as "collateral-dependent mortgage" or "equity finance mortgage" exist for lending money to entities on a variety of ratio bases (e.g. 1/2/1). If a lender advances 20% of an asset's value to fund the borrowers purchase, no interest accrues on the loan amount for as long as it remains outstanding (except in the event of default), in return for 40% of any appreciation of the asset. At the same time, the lender provides an "Insurance service" by sharing in 20% of depreciation of the asset's value.

All financial industry lending products available follow the basic principal of advancing a sum of money (principal), or quantum of credit, under a loan contract which requires the money to be repaid in addition to (i) interest payments throughout the term, or (ii), payment of 'interests worth' (in the case of asset depreciation, a deduction) upon redemption of the mortgage loan, typically calculated using either a compounding interest rate or using a ratio of asset appreciation, or both.

Prior art products are also based on an agreement between a financial industry participant and consumer, that is, a person not in the finance industry. They are not suitable for consumer to consumer arrangements. Specifically, those in the business of making loans available by advancing a principal amount in return for a share of capital appreciation in an underlying asset, benefit from a free leverage. For example, a lender who advances twenty percent of a $500,000 asset has the benefit of free leverage, obtaining an agreed proportion of the total asset appreciation, without having to fund any part of the remaining $400,000 with debt. By contrast, consumers wishing to obtain access to the same leveraged returns may need to invest twenty percent of the asset value (i.e. $100,000.00) and subsequently fund the $400,000.00 difference with debt (interest bearing or otherwise) in order to secure the rights to capital appreciation over the $500,000.00 asset. The prior art systems teach away from the provision of free leverage to consumers.

In the UK and Europe schemes that join counterparties for pseudo retirement saving (investment) and retirement income purposes do exist, and they have prompted ethical questions, extensive debate and a number of court cases in the UK. As an example, a typical home reversion involves a percentage transfer in ownership of a senior citizens' property asset in exchange for a one time payment and a life tenancy. The payment value, as a percentage of the current asset value, is always less than the percentage of ownership exchanged. The difference between the payment value and the current value of ownership transferred allegedly takes into account the value of the life tenancy and the life expectancy of the senior citizen using a calculation based on the value of the property at the time of the agreement. Upon the death of the senior citizen, the property is sold and the investor receives their full payout based upon the value of the property at the sale date and a percentage share of the property set out in the agreement.

Consumers have generally been constrained to dealing with the financial industry if they wish to obtain long term mortgage credit or to generate an income by trading currently held assets or equity. Furthermore, consumers have been constrained by lending practices that are based on a predetermined maximum value of principal and/or predetermined maximum term. There is therefore a need for consumers to have access to more flexible loans comprising an ongoing principal having an ongoing value combined with no preset maximum term.

Some prior art methods (patent applications) describe an investor or investors paying ongoing sums of money to an asset owner (borrower) in exchange for a share of asset appreciation in the asset over which the loan is secured or in which the investor is granted a share of ownership. Each of these methods provide their, own method of calculating a value for their respective ongoing payments and term over which it is paid (if a term is applicable) but no prior art method has the systems which enable an investor, or system custodian, to firstly select an investor's desired return for a given asset appreciation rate and subsequently calculate the ongoing payment value, whether or not it is subsequently indexed, that will achieve this return. Concomitantly, none of the prior art systems are capable of calculating or administering agreements based upon appreciation share that also incorporate the cumulative value of ongoing payments made to the asset owner as part of the redemption value calculation, so as to not result in significant losses for investors or extreme cost of finance for borrowers under economic conditions which deviate from average. Such an example is US Patent application with Publication Number US20100145877A1, which presents a method for enabling an investor to invest in a real estate asset in exchange for periodic payments to the owner of the real estate asset. The method for calculating the value of periodic payments involves multiplying the asset value by an appreciation share percentage and the resultant value by an arbitrarily selected percentage rate; the resultant value becomes the periodic payment amount. The method for calculating the amount repayable to the lender at the end of the agreement is a mere product of the agreed appreciation share and asset value at that time, with no reference to the cumulative value of ongoing payments made. Accordingly, these prior art systems do not present an effective method for lending periodic payments to an asset owner in exchange for a share of asset appreciation, as where economic conditions vary from expected norms, significant losses for the investor or very high cost of borrowing for the asset owner will be the result.

SUMMARY OF THE INVENTION

It is an object of the embodiments described herein to overcome or alleviate at least one of the above noted drawbacks of related art systems or to at least provide a useful alternative to related art systems. Another object of the embodiments described herein is to provide consumers with an income or borrowing instrument having an ongoing principal that is provided as ongoing advances or a combination of lump sum and ongoing advances without the need for a fixed maximum value or term, and independent of traditional interest charges. Another object of the embodiments described herein is to provide the technological system to enable calculation of an on-going payment amount to be made from an investor to an asset owner (borrower) in relation to a preselected investor return at a predetermined future point in time and in relation to a linear, non-linear, or average forecast asset appreciation rate so that a loan agreement can be settled between the borrower and the investor which has a redemption value (and therefore investor return or borrowers cost of finance) calculated by the system in direct reference to both the cumulative amount loaned via the periodic payments over time and the agreed appreciation share. Another object of the embodiments described herein is to provide consumers with a method for making debt free leveraged investment, including 'upside only' debt free leverage, whereby the investor is not exposed to the magnified losses associated with prior art leveraged investment methods. Another object of the embodiments described herein is to provide a 'greater of borrowing' mechanism whereby borrowers are only obliged to repay either the amount they borrowed or the agreed share of horizon gain in the asset, not both. Another object of the embodiments described herein is to provide consumers with a method for creating divisions within their property (or other) assets, with each division of the asset capable of being treated as a separate asset under embodiments of the present invention. A further object of the embodiments described herein is to provide a system for saving or asset investment that enables a capital guarantee on all contributions and access to the capital gain of the asset.

The embodiments of the invention described hereafter enable a borrower to secure a periodic payment from a lender based on an agreed value of the borrower's asset(s) which may be calculated in relation to a target investor return in year n with said return calculated by invoking proprietary algorithms, and upon redemption of the loan the lender is entitled to the greater of either an agreed proportion of the appreciation of the asset, or qualifying outgoings which include the periodic payments. By this method, the lender is assured of at least recovering the periodic payments made to the borrower, and will further benefit if the asset appreciation is significant. Concomitantly, by this method a lender according to embodiments of the present invention is assured the return of their qualifying outgoings as well as potential investment return, but without the need for debt. By contrast, financial products of the prior art expose prior art borrowers (who may borrow to invest in assets in pursuit of leveraged returns) to potential loss of capital either due to asset depreciation or inability to meet loan repayments resulting in repossession of their asset by the lender.

In the context of the disclosure of the present specification, it is to be understood that the term "annuation" as used herein is to be taken as meaning a quantum of value calculated on a periodic basis, preferably but not necessarily annually.

In a first aspect the present invention provides an automated system including databases and the means for monitoring and recording information flow and data as well as information and data display and making requisite calculations for the management and realisation of asset classes. The system is adapted to perform calculations to predict income derived from an anticipated future benefit referred to herein as Horizon Gain, said database system having the capability to optimise investor returns to a predetermined figure at a predetermined future point in time. The database system carries out a number of steps in order to firstly generate an optimised ongoing principal (IP) which is itself varied throughout the optimisation process along with a coefficient of predetermined starting value to ensure the optimisation algorithm used does not optimise upon local maximums. The database system requires a user to initially input five mandatory static values to user input fields:

(I) an initial value for an asset owned by the borrower wherein the asset may increase or decrease in value over time,
(ii) a Horizon Gain Allocation percentage, expressed in favour of the lender,
(iii) a lender's target return value
(iv) a gearing factor, wherein the database system forecasts a potential growth in asset value and therefore a Horizon Gain Allocation Value (HGAV) for any future time interval, for the gearing factor entered,
(v) a value representing the number and size of Asset Divisions (AD)

The database system may also accommodate optional user inputs to enable it to calculate:
(a). Forecast Term
(b) Fixed Term The system firstly generates values in accordance with the following formulae, before populating one or more databases with the results of the following formulae for selected future time division(s) to generate a time series table of data for each agreement established over one or more AD's before optimisation:

(i) an initial value for the periodic payment from the lender to the borrower based on an ongoing principal value (IP) is calculated according to, $$TB_0 \times HGA_i \times R \times MRCc_0 = IP \qquad \text{eqn (1)}$$

wherein,
$MRCc_0$ is a mandatory redemption criteria coefficient,
R is a coefficient chosen to optimize IP based on nominated lender and borrower returns at year n and borrower selected variables,
$HGA_i$ is a horizon gain allocation proportion at time=1 expressed in favour of the lender, and
$TB_0$ is the transaction base calculated from the asset value according to $$ADV_0 - (M)TC_0 - (P)LS_0 = TB \qquad \text{eqn (2)}$$

wherein,
$TC_0$ comprises transaction costs,
M is a coefficient chosen to weight the significance in value of $TC_0$,
P is a coefficient chosen to weight the significance in value of $LS_0$,
$LS_0$ comprises any lump sum payment including any premium loading made by the lender, and
$ADV_0$ is the asset division value calculated from the equation, $$AV_0 \times ADP = ADV_0 \qquad \text{eqn (3)}$$

wherein,
ADP is the asset division proportion input by the user, and
$AV_0$ is the whole of asset value,
and
(ii) an amount payable to a lender upon occurrence of a redemption event, is calculated by selecting the greater of,
(i) an agreed proportion of appreciation of the asset (HGAV), or
(ii) qualifying outgoings (QO)
wherein the value of QO and HGAV may be first adjusted by multiplication with a coefficient calculated or selected in relation to borrower or lender criteria.

The databases are preferably accessed and used by display processor means adapted to operate in accordance with a predetermined instruction set to create a visual display of predicted income derived from the anticipated future benefit (Horizon Gain) The visual display may be in any convenient format such as text, tables, graphs or combinations thereof.

The automated method may also include the step of establishing a lenders qualifying outgoings (QO) value at time i according to $$(M)TC_i + (P)LS_0 + \Sigma OP_i = QO_i \qquad \text{eqn (4)}$$

where $\Sigma OP$ is the cumulative total of all ongoing principal and allowable administration charges and costs paid by a lender in direct relation to a particular agreement between the lender and borrower.

The automated method may also include the step of establishing a lenders horizon gain allocation value at time i in order to run a "lender redemption value" ("LRV") algorithm which invokes the "greater of" rule in respect of qualifying outgoings and horizon gain. This step would apply the following:

$$(ADM_i - TB)HGA_i = HGAV_i \qquad \text{eqn (5)}$$

wherein the lender redemption value algorithm is used to select between $HGAV_i$ and $QO_i$ and said lender redemption value algorithm may apply further weighting to both or either $HGAV_i$ and $QO_i$ prior to selecting between the two, such weighting applied by way of a coefficient calculated in accordance with terms of one or more agreement between the borrower and the lender.

The method may also include a step for establishing a maximum value to which a capital guarantee all monies mortgage ("CGAMM") securing an agreement of the present invention, may accrue, should there be no appreciation or depreciation in the agreement asset after settlement. Where a value is set value for capital guarantee at settlement "$CG_0$", it may be varied on a ratio basis thereafter in relation to appreciation or depreciation of the asset value, so that;
(i) in the event of asset depreciation the capital guarantee after settlement "$CG_i$" may reduce to nil or even a negative amount where so allowed for in a particular agreement; and (ii) in the event of asset appreciation the said $CG_i$ may increase with no upper limit yet will be calculated with respect to the following limitations:
at the date of settlement;

$$U_0 + CG_0 = ADV_0 \quad \text{eqn (6)}$$

where $U_0$ is the portion value of $ADV_0$ which will remain unencumbered by the agreement of the present invention and $CG_0$ is the maximum value of capital guarantee which could be applied upon settlement of an agreement, or at anytime after the settlement date, should the agreement asset not appreciate in value. $CG_0$ may be varied thereafter whilst an agreement is active, so that:

$CG_0$ will decrease on a 1:1 ratio (or some other ratio) for each dollar (or other currency) amount that the agreement asset decreases in value until $CG_i=0$; in which case $$U_0 - CG_i = U_0 \quad \text{eqn (7)}$$

and $CG_0$ will increase on a 1:1 ratio (or some other ratio) for each dollar amount (or other currency) of appreciation in the ADV, so that $$CG_0 + (x)HG_i = CG_i \quad \text{eqn (8)}$$

given that $$HG_i = ADV_i - TB \quad \text{eqn (9)}$$

wherein, $HG_i$ is the total horizon gain for the asset division
and
(x) is a coefficient selected to determine the ratio at which $CG_i$ will increase in relation to appreciation in ADV
$CG_i$ may be varied on this basis (as described above) up to the occurrence of a redemption event or occurrence of other event causing conversion of an active agreement to an inactive agreement The resultant databases generated within the system may be structured to provide a time series of data, whereby each column represents the status for a division of a borrower's asset for each given time period (i.e. days, weeks, months, years); enabling measurement of investor return at time 'n' so that said time series table data may be optimised to produce required investor return at time n.

A single time period within the table may be represented vertically as follows:

| Table Row Number | Field Description | Field Value at Time Period 1 to n |
|---|---|---|
| 1 | Asset Division Value at outset of agreement | Asset value input by system operator before calculating payment value to Borrower |
| 2 | Transaction Base | $ADV_0 - (M)TC_0 - (P)LS_0 = TB$ ........eqn (2) |
| 3 | Asset Division Value at end of Time Period n | $(ADV_0)*(1+\text{'gearing factor'})\hat{}\ t_n$ |
| 4 | Transaction Cost 1 (TC1) | =TC1 |
| 5 | Transaction Cost 2 (TC2) | =TC2 |
| 6 | Transaction Cost n (TCn) | =TCn |
| 7 | Ongoing Principal (IP) | =IF("CurrentPeriod">"PreferredTerm" $_{THEN}$ "PreviousPeriodBalance" $_{OTHERWISE}$ IF(AND("LenderDefaultPeriod">0 $_{AS\ WELL\ AS}$ "CurrentPeriod"="LenderDefaultPeriod") $_{THEN}$ ($IP_{outset}$)*(((1+"Indexation")^("CurrentPeriod"*12)-1)/"Indexation") $_{OTHERWISE}$ IF(AND("LenderDefaultPeriod">0 $_{AS\ WELL\ AS}$ "CurrentPeriod">"LenderDefaultPeriod") $_{THEN}$ "PreviousPeriodBalance" $_{OTHERWISE}$ ($IP_{outset}$)*(((1+"Indexation")^("CurrentPeriod"*12)-1)/"Indexation")))) |
| 8 | Ongoing Transaction Fee (OTF) | =IF("CurrentPeriod" > "PreferredTerm" $_{THEN}$ "PreviousPeriodBalance" $_{OTHERWISE}$ IF(AND("LenderDefaultPeriod" > 0 $_{AS\ WELL\ AS}$ "CurrentPeriod" = "LenderDefaultPeriod") $_{THEN}$ ("MonthlyAdminFee")*(((1+"Indexation")^("CurrentPeriod"*12)-1)/"Indexation") $_{OTHERWISE}$ IF(AND("LenderDefaultPeriod">0 $_{AS\ WELL\ AS}$ "CurrentPeriod">"LenderDefaultPeriod") $_{THEN}$ "PreviousPeriodBalance" $_{OTHERWISE}$ ("MonthlyAdminFee")*(((1+"Indexation")^("CurrentPeriod"*12)-1)/"Indexation")))) |
| 9 | Total Investor Input to Agreement (TII) | = IP + OTF + $TC_{1\ to\ n}$ |
| 10 | Redemption Costs | =IF("CurrentPeriod">"PreferredTerm" $_{THEN}$ "PreviousPeriodBalance" $_{OTHERWISE}$ IF(AND("LenderDefaultPeriod">0 $_{AS\ WELL\ AS}$ "CurrentPeriod"="LenderDefaultPeriod") $_{THEN}$ ("RedemptionCosts")*(1+"Indexation")^"CurrentTerm" $_{OTHERWISE}$ IF(AND("LenderDefaultPeriod">0 $_{AS\ WELL\ AS}$ "CurrentPeriod">"LenderDefaultPeriod") $_{THEN}$ "PreviousPeriodBalance" $_{OTHERWISE}$ ("RedemptionCosts")*(1+"Indexation")^"CurrentPeriod"))) |
| 11 | Qualifying Outgoings | =MINIMUM("$LS_{lodingpremium}$"+"LS"+"CummulativeIP" $_{OR}$ "$ADV_1$") |
| 12 | Total Horizon Gain over TB | =($ADV_1$-TB) - "RedemptionCosts" |
| 13 | Horizon Gain Allocation Value (HGAV) | =IF(HG>0 $_{THEN}$ HG*HGA $_{OTHERWISE}$ HG) |
| 14 | Total Actually Repaid to Investor (operation of 'Greater of Rule') | =IF("CurrentPeriod">"PreferredTerm" $_{THEN}$ "PreviousPeriodBalance" $_{OTHERWISE}$ IF(AND("LenderDefaultPeriod">0 $_{AS\ WELL\ AS}$ "CurrentPeriod"="LenderDefaultPeriod" $_{AS\ WELL\ AS}$ "LenderDefaultPeriod"<"PreferredTerm") $_{THEN}$ MINIMUM("CapitalGuarantee" $_{OR}$ QO) $_{OTHERWISE}$ IF(AND("LenderDefaultPeriod">0 $_{AS\ WELL\ AS}$ "CurrentPeriod">"LenderDefaultPeriod" $_{AS\ WELL\ AS}$ "LenderDefaultPeriod"<"PreferredTerm") $_{THEN}$ "PreviousPeriodBalance" $_{OTHERWISE}$ IF(AND(QO<CG $_{AS\ WELL\ AS}$ QO>HGAV) $_{THEN}$ MINIMUM(CG,QO) $_{OTHERWISE}$ IF(AND(QO>CG $_{AS\ WELL\ AS}$ QO>HGAV $_{AS\ WELL\ AS}$ (QO-$HGAV_{positive\ values\ only}$)<CG) $_{THEN}$ QO $_{OTHERWISE}$ IF(AND(QO>CG $_{AS\ WELL\ AS}$ QO>HGAV $_{AS\ WELL\ AS}$ (QO-$HGAV_{positive\ values\ only}$)>CG) $_{THEN}$ $HGAV_{positive\ values\ only}$+CG $_{OTHERWISE}$ MAXIMUM(HGAV $_{OR}$ QO))))))) |

| Table Row Number | Field Description | Field Value at Time Period 1 to n |
|---|---|---|
| 15 | surplus/Shortfall in Capital gain to be deducted from Borrowers PEV—Preserved Estate Value (where negative); or added (where positive) | ="HorizonGain"– "InvestorPayoutValue" |
| 16 | Preserved Estate Value (PEV) (unadjusted) | =TB |
| 17 | Preserved Estate Value (PEV) (Adjusted) | =IF("Surplus/ShortfallInHG"<0 $_{THEN}$ PEV+"Surplus/ShortfallInHG" $_{OTHERWISE}$ (PEV+"Surplus/ShortfallInHG")) |
| 18 | TOTAL OUTGOINGS FROM SALE PRICE OF PROPERTY (inc. vonlife & 3rd party fees) | =PEV$_{adjusted}$+"InvestorPayoutValue"+"RedemptionCosts" |
| 19 | Capital Sale Value | ="ADV$_{end\ of\ agreement}$" |
| 20 | Arbitrage | ="ADV$_{end\ of\ agreement}$"–"TotalOutgoingsFromSaleofProperty" |

Accordingly, the value of a lenders all monies security over the agreement asset which underwrites his $QO_i$ or $HGAV_i$ at any point in time (subject to $CG_1$ and "greater of rule" and any variations thereof), will for an active agreement, vary as a function of $QO_i$, $HGAV_i$, the $CG_i$ and the "greater of rule" for that particular agreement. Upon occurrence of a default event, a redemption event, assignment event, or any calculation which assigns a valuation to a lenders all monies security under an agreement of the present invention by reference to the time period in which the event occurred; and independent of the LRV algorithm (which invokes the "greater of rule"), the maximum pay out (redemption) value to a lender will be determined as follows:

(i) where $QO_i > HGAV_i$, the maximum pay out (redemption) value to a lender is the lesser of $CG_0$ or $QO_i$;

(ii) where $QO_i > CG_0$ and $QO_i > HGAV_i$ and $(QO_i - HGAV_i) < CG_0$, the maximum pay out (redemption) value to a lender will be equal to $QO_i$;

(iii) where $QO_i > CG_0$ and $QO_i > HGAV_i$ and $(QO_i - HGAV_i) > CG_0$ the maximum pay out (redemption) value to a lender will be $(HGAV + CG_0)$ (iv) where $HGAV_i > CG_0$, and $(QO_i - HGAV_i) < CG_0$ the maximum pay out (redemption) value to a lender is the greater of HGAV or QO as determined by the "greater of rule"

(v) where $HGAV_i > CG_0$ and $HGAV_i > QO_i$ the maximum pay out (redemption) value to a lender would be the greater of HGAV or $QO_i$ as determined by the "greater of rule" (and variations thereof)

The above does not limit the application of the 'greater of rule', including all variations thereof, in determining the conversion value pertaining to a default event, or the pay out value to a lender upon occurrence of a redemption event pertaining to either an active or inactive agreement; but rather, sets a maximum pay out (redemption) value a lender may receive irrespective of the redemption or conversion value (from CGAMM to CGFM) as calculated by the systems LRV algorithm.

The automated method can thus be used to facilitate an arrangement between the lender and borrower including agreed and calculated parameters. For example, arrangements between the borrower and lender may be based on the values generated by the automated method of the present invention and used as the basis for a formal, legally binding agreement between the parties The systems of the present invention consolidate information particular to each Asset Division (AD) into an Asset Summary Module (ASM) in order to provide a whole of asset ledger and cash flow to demonstrate a balanced outcome in relation to agreements of embodiments of the present invention secured over each AD and the asset as a whole. The ASM is automatically updated to reflect any changes in AD agreement tables and outputs.

One or more agreements can be established for one or more agreement assets. Thus the lender can operate a pooling and/or securitization process within their funds. In a preferred embodiment the asset(s) can be nominally divided into divisions, each division comprising one, two or more equal or unequal portions.

In a preferred embodiment a custodian, acts as 'middleman' between the borrower and lender to facilitate the working of embodiments of the present invention. For example, a financial advisor could broker an agreement between a borrower and lender using the system of the current invention, which could be owned and operated by the custodian. After settlement of the agreement the custodian could administer the transaction using the system of the preferred embodiment of the current invention. Using the database system according to embodiments of the present invention, the custodian can generate summaries or visual depictions of various proposed binding contractual agreements a borrower and lender could enter into and demonstrate the affect that various lender, borrower and wider economic variables can have on the outcome for each party under the terms of an agreement generated and administered using the systems of the present invention. Amongst a variety of outputs, the borrower and lender can see their financial position opposite various rates of asset appreciation.

Similarly, the custodian can present these summaries and visual depictions to potential lenders in order to identify a suitable lender having borrower related variables that are an appropriate fit with lender related variables and expectations. Thereafter the custodian can broker an agreement between a lender and a borrower by assigning the lender to the borrower within the database system so that the agreement can be settled, monitored, administered and redeemed in accordance with the parameters for the agreement originally generated by the database system via the optimisation process and represented to the lender via a borrowers offer document (BOD).

Redemption by the borrower may result from operation of conditions in the agreement and upon recognition by the database system of mandatory redemption criteria occurrence, which may arise from borrower monthly returns input by the custodian or the borrower themselves where they are granted access to the user interface, the database system will calculate a redemption figure for the applicable time period. It is envisaged that suitable processor means can be programmed to facilitate the database recognition of mandatory redemption criteria occurring as would be understood by the person skilled in the art In accordance with another aspect of embodiments of the invention, when multiple agreements subsist for one or more agreement assets, a lender can cause settlement of one or more of the agreements in conjunction with prior art interest bearing debt secured over a single agreement asset so that interest payments due to a lender on interest bearing debt provided to a borrower, can be netted off against the ongoing payments due from the lender to the borrower in relation to one or more agreements. If the lender holds all the agreements in a single vehicle (e.g. a fund), the resulting asset derives both ongoing income and horizon gain entitlements.

In another aspect of embodiments described herein there is provided a computer implemented system for predicting income derived from an anticipated future benefit (Horizon Gain), wherein the system comprises:
(a) first registration means for registering characteristics associated with a borrower in a first database,
(b) second registration means for registering characteristics associated with a lender in a second database,
(c) first automated means including user fields for inputting the following values to a first database;
   (i) an initial value for an asset owned by a borrower, wherein the asset may increase or decrease in value over time,
   (ii) a Horizon Gain Allocation percentage, expressed in favour of a lender,
   (iii) the lender's target return value,
   (iv) a gearing factor, wherein the system forecasts a potential growth in asset value and therefore a Horizon Gain Allocation Value (HGAV) for any future time interval, for the gearing factor entered, and
   (v) a value representing the number and size of Asset Divisions (AD)
(d) automated means for generating a second database, and subsequent databases as necessary, populated with values for one or more selected future time divisions for the borrower's asset over one or more AD's before optimisation, the values being as follows and calculated according to the following formulae;
   (i) an agreed periodic payment from the lender to the borrower based on an ongoing principal value (IP) calculated according to, $$TB_0 \times HGA_i \times R \times MRCc_0 = IP \quad \text{eqn (1)}$$

wherein,
   $MRCc_0$ is a mandatory redemption criteria coefficient,
   R is a coefficient chosen to optimize IP based on nominated lender and borrower returns at year n and borrower selected variables,
   $HGA_i$ is a horizon gain allocation proportion at time=1 expressed in favour of the lender, and
   $TB_0$ is the transaction base calculated from the asset value according to $$ADV_0 - (M)TC_0 - (P)LS_0 = TB_0 \quad \text{eqn (2)}$$

wherein,
   $TC_0$ comprises transaction costs,
   M is a coefficient chosen to weight the significance in value of $TC_0$,
   P is a coefficient chosen to weight the significance in value of $LS_0$,
   $LS_0$ comprises any lump sum payment including any premium loading made by the lender, and
   $ADV_0$ is the asset division value calculated from the equation, $$AV_0 \times ADP = ADM) \quad \text{eqn (3)}$$

wherein,
   ADP is the asset division proportion input by a user, and
   $AV_0$ is the whole of asset value,
   and
   (ii) an amount payable to a lender upon occurrence of a redemption event, calculated by selecting the greater of, an agreed proportion of appreciation of the asset (HGAV), or
   qualifying outgoings (QO)

wherein the value of QO and HGAV may be first adjusted by multiplication with a coefficient calculated or selected in relation to borrower or lender criteria.
(e) visual display means for creating visual depictions based on the values in the database or databases to represent predicted income derived from the anticipated future benefit,
(f) automated means for responding to a redemption event by determining the value of a payment to the lender that is the greater of,
   (i) an agreed proportion of appreciation of the asset (HGAV), or
   (ii) qualifying outgoings (QO).

A suitable platform for the above described system would comprise one or a combination of a personal computer (be it desktop or laptop), a server, a terminal connected to a server, or a hand held mobile device, or a personal digital assistant, connected via a communication network to one or more other computers and database servers.

The first database, second database and optional subsequent databases of the above system may be the same or different databases. Typically the first database holding records for the borrower on a central server. The second database holding records for the lender may be located on the same, or a different central server. It should be noted that where the terms "server", "secure server" or similar terms are used herein, a communication device is described that may be used in a communication system, unless the context otherwise requires, and should not be construed to limit the present invention to any particular communication device type. Thus, a communication device may include, without limitation, a bridge, router, bridge-router (router), switch, node, or other communication device, which may or may not be secure.

In another aspect of embodiments described herein there is provided an apparatus adapted to automate leveraging of assets to generate income comprising:
processor means adapted to operate in accordance with a predetermined instruction set,
said apparatus; in conjunction with said instruction set, being adapted to perform the above described method as disclosed herein in any combination of the method steps (a) to (d) described above.

In yet another aspect of embodiments described herein there is provided a computer readable recording medium having computer readable program code and computer readable system code embodied on said computer readable recording medium, for leveraging assets to generate income within a data processing system,
wherein said computer readable program code and said computer readable system code are adapted for carrying out any combination of the above described method steps (a) to (d) as disclosed herein within a data processing system.

The method of the present invention has many different applications including the provision of:
affordable housing systems;
a combined asset backed intergenerational retirement saving and retirement income system;
a heterogeneous derivative market for real property assets;
underwriting of insurance policies covering the periodic payment;
a system for holders of mortality risk to hedge said risk by obtaining exposure to life extension risk;
home annuation agreement transfers ("HAAT"s) which have some characteristics of bonds and can be structured as indexed 'coupon' or capital growth financial instruments;

a system for home owners with prior art interest bearing debt to offset some of their principal and/or interest payments via the periodic payment of ongoing principal (IP) payable under the agreements;

a system for retirees to effectively manage longevity risk without having to forego any of their current net wealth;

a new form of asset finance (e.g. house finance) which combines prior art debt with agreement(s).

Advantages provided by embodiments of the present invention, that are not provided by database systems or financial products of the prior art include the ability to generate, settle, manage, administer and redeem commercial agreements which feature:

an ongoing quantum of credit (i.e. ongoing principal) that,
is either regularly paid, or paid in a lump sum with ongoing regular payments, and/or
does not have to be purchased or bought ahead of time (cf annuity or account based income streams), and/or debt free leverage
Prior art systems require debt to create leverage, whereas the system of the present invention can create substantial levels of leverage without the need for an investor (lender) to borrow dynamic combined, time and asset state weighted investor returns or borrower cost of finance do not necessarily require a pooling or units mechanism, and/or do not expose borrower or lender to direct interest rate risk, and/or allow both lender and borrower to share in asset appreciation (or depreciation if required), and/or may allow the borrower to substantially define the terms and conditions upon which he wishes to borrow, and/or can be made available to all borrowers regardless of their location or other credit scoring criteria as used by prior art lenders, and/or allow borrowers the option to effectively split their asset into divisions so that they may enter into numerous independent asset state financing (or income) arrangements with separate lender entities.

Furthermore, unlike preferred embodiments of the present invention, the methods and systems of the prior art do not generate the necessary data for implementing a consumer based model which comprises both saving and borrowing wherein, saving can include, but is not limited to, accumulation of cash, or cash worth, in a secured method combined free of the risk of exposure to interest rates but with the potential capital gains of real property assets, or other asset over which the accumulated cash payments are secured, and borrowing can include, but is not limited to, lump sum cash receipts, ongoing cash receipts for an indefinite term, or a combination of both.

Finally, there is no product of the prior art that can provide the necessary data to implement or manage a combined consumer based retirement income and retirement savings system and/or consumer or business cashflow solution, in combination with the following advantages of the present invention;

no direct exposure to interest rate risk, capital guarantee on all and/or some contributions, including any contributions later paid out as administration fees or charges, direct returns on real assets (such as residential property), direct transfer of savings (loans) to retirees (borrowings) as income for immediate use without 'leakage' to the financial service industry as described earlier, conversion of the savers' (lenders') interest in real property security to cash, without restriction, by assignment of his interest to another entity (for example, without need for redemption of a 'home annuation' or other relevant agreement), a capital guarantee upon all contributions as outlined above or the return on real assets if greater; and maintenance of wealth within families assisting the intergenerational transfer of wealth, which is inhibited by many of the current range of financial industry retirement income, borrowing and cash flow products.

Thus, the present invention can provide significant benefits to specific segments of society as well as the wider community.

Definitions

For clarity, the description and illustrations will include a number of terms having the definitions set out below. These definitions are intended to assist understanding of the embodiments in the illustrations and are not intended to limit the broader scope of the invention as described or claimed:

active agreement means an agreement under which a lender accrues horizon gain entitlement and does not include any such agreement under which the lender is in default;

agreement means an agreement according to the present invention and includes multiple agreements;

agreement asset means the asset, or asset division thereof, over which an agreement is secured;

approved valuation means a valuation of the agreement asset. For example the approved valuation may be carried out by a licensed valuer or other appropriately qualified party, the custodian, or by agreement between the borrower and lender;

asset means one or more properties owned by the borrower which appreciate in value and can be the subject of a security.

asset backed intergenerational system means an income system for non-working individuals (such as pensioners and retirees) where contributions from the working generation are used to directly and immediately fund the benefits paid or granted and where said working generation payments made are concurrently secured upon a real asset. This system helps guard against 'shocks' or long term trend increases in dependency rates of non-working individuals such as, for example, those aged over 60, relative to working individuals aged 20-59.

asset division means a proportion of the value of an asset that is allocated to a particular agreement (e.g. home annuation agreement);

assignment valuation means a valuation in the form of a statement generated at the request of a lender which contains, amongst other information, a balance of his qualifying outgoings at a time proximate to the date an assignment valuation was requested and an estimate of the horizon gain allocation value either backed by an approved valuation of the agreement asset over which the agreement is secured or an estimate of same;

asset division proportion means substantially the same as asset division;

affordable housing means any real property dwelling over which an agreement is secured;

approved insurer means an insurance provider or underwriter for insurance calculated in accordance with procedure INS (see FIG. 22);

asset summary ledger means a ledger containing the data held within the asset summary module and a form legible to a system operator;

asset summary module means the database and interface which consolidates all asset divisions and agreements relating to the agreement asset;

beneficial lenders means a primary lender under an agreement. The identity of this lender may change, for example due to assignment, notwithstanding the primary lenders security over the agreement asset remains superior to any agreement certificates (MPAC's) secured thereon.

borrower means a counter-party to the investor under an agreement. For example, the counter-party can include, but is not limited to; individuals, incorporated or unincorporated bodies, consumers, trustees of self managed superannuation funds, superannuation or pension funds or specialist funds.

conversion calculation means a process carried out when converting a capital guarantee all monies mortgage ("CGAMM") to a capital guarantee fixed mortgage ("CGFM") in order to calculate the value of said CGFM;

conversion premium means an offset, surcharge or similar offered by either the borrower or lender counterparties to be included in the calculation of qualifying outgoings or horizon gain allocation value and the custodian may also apply any conversion premium;

conversion value means that value calculated by way of the conversion calculation which represents the value of a capital guarantee fixed mortgage ("CGFM") after conversion from a capital guarantee all monies mortgage ("CGAMM").

custodian means an entity who optionally performs one or more roles such as brokering, formalising or policing the agreement, or acting as custodian of the agreement asset(s);

default premium means substantially the same as reserve monies premium and is that premium calculated in accordance with the terms of each particular agreement and applied to each ongoing payment, where a lender is in default, so that a reserve monies balance is replenished to required value;

default consultation period means the day count, as prescribed in each particular agreement of embodiments of the present invention, with day one commencing when a lender fails to deposit a required ongoing payment to the custodian trust account (TA 402, FIG. 2) by the $3^{rd}$ day of any given payment period during the term of an active agreement (see FIG. 20);

default conversion statement means a statement generated as one output of the conversion calculation, containing information such as the conversion value along with other instructions necessary for a legal settlement provider to process the CGAMM to CGFM settlement;

defaulting lender means a lender who has failed to deposit a required ongoing payment to the custodian trust account (TA 402, FIG. 2), by the nominated day of any given payment period during the term of an active agreement and thereafter is yet to recommence scheduled payments within the default consultation period set out in each particular agreement; and is yet to meet the entire amount and number of default premium (reserve monies premium) payments as scheduled by the agreement custodian in addition to recommencement of the standard scheduled ongoing payments at (a), as prescribed in the default recovery notice issued by the custodian with which the terms of the agreement are varied so that lenders scheduled ongoing payments subsequently include reserve monies premium payments.

default recovery notice means a notice issued to a lender by the custodian at commencement of the default consultation period and throughout the reserve monies recuperation period thereafter as required and in accordance with the terms of each particular agreement of embodiments of the present invention;

division value means the monetary value of an asset division;

financial industry means banks, non-bank lenders, providers of financial products who are not an institution;

free leverage means that form of gearing available to consumer or other entitles, that are generally not in the business of lending, without need for debt;

generation date means the date on which the initial value for the asset is agreed by the borrower and lender. For example, it may be the day on which an offer document for an agreement is generated;

greater of rule means the method by which a lenders redemption value is determined after calculating the value of both qualifying outgoings ("QO") and horizon gain allocation value ("HGAV") for any given point in time, whereas;

(a) the calculation methods for QO and HGAV are particular to each agreement of embodiments of the present invention; and (b) the greater of rule determines that a lenders redemption value will be, the greater of QO or HGAV.

horizon gain means the net gain in excess of the transaction base after the proceeds of the sale of the asset (or an approved valuation where the borrower is redeeming the agreement without sale), over which the agreement was granted, have been applied to necessary costs, expenses or other deductions. These may include, for example:

(a) lump sum loading premium;
(b) legal costs and expenses;
(c) costs and expenses incurred in repairing and maintaining the agreement asset;
(d) agent sale commissions;
(e) taxes;
(f) premiums payable under an insurance policy;
(g) any custodian fees or other charges; and
(h) conversion premium or valuation premium offered by the lender to induce early redemption;

horizon gain allocation means that portion of horizon gain (normally expressed in favour of a lender) allocated to borrower and lender under an agreement;

horizon gain allocation value means the monetary value of a horizon gain allocation;

inactive agreement means an agreement under which a lender is in default and thereby does not continue to accrue horizon gain entitlement in accordance with the terms of an agreement;

in occupation means an agreement under which a mandatory redemption criteria is set to operate when a borrower ceases to occupy a real property asset over which the agreement is secured. For example, a borrower may cease to be in occupation, and have to fully redeem any capital guarantee all monies mortgage ("CGAMM") or capital guarantee fixed mortgage ("CGFM") if they cease to occupy a real property asset for more than 6 months in a given period of time. In another example, the borrower may cease to be in occupation due to death.

institutions (financial institutions) means superannuation funds, pension funds or other funds which obtain funding as contributions from consumers either through contributions to superannuation or via taxation.

insurance means, in relation to 'procedure INS', a contract of insurance issued by an approved insurer and written in favour of the borrower in respect of an agreement and which provides that the insurer will pay the lenders ongoing payments under the agreement in case of the lender defaulting upon his ongoing payments. The insurance may be subject to any convenient provisos.

investor means a counter-party to the borrower under an agreement. For example, the counter-party can include, but is not limited to; individuals, incorporated or unincorporated bodies, consumers, trustees of self managed superannuation funds, superannuation or pension funds or specialist funds.

leakage means any costs incurred by a consumer through interactions with the financial industry, whereby charges made upon the consumer are not recoverable by liquidating agreements with the financial industry;

lender has the same meaning as investor, lender default consultation period has the same meaning as default consultation period;

lender default floor means the 'no less than' horizon gain allocation to be used when calculating horizon gain value prior to application of the greater of rule in performing a conversion calculation;

lender redemption value means the amount owing to a lender under an agreement and calculated by a method that includes the greater of rule as if the agreement were to be redeemed in full by borrower, leveraged growth of ongoing principal at constant yield means a growth in ongoing principal (IP), which may be expressed as a percentage rate or monetary value, derived from the underlying agreement asset value (or division thereof);
(a) using the method of the present invention by assigning constant values to the coefficients and fixing other variables to generation date values whilst the value of the agreement asset (or division thereof) is allowed to vary, thereby generating a growth in ongoing principal; or
(b) applying indexation to an ongoing principal where the indexation measure is the value of the underlying agreement asset or division thereof;

life expiry means the death of a borrower or lender;

life extension means an increase in maximum or average lifespan, or increase in time elapsed until life expiry;

lump sum means payment by a lender of a sum of money in addition to ongoing payments under an agreement of embodiments of the present invention which is, typically made upon settlement of the agreement;

lump sum loading premium means a specified amount, as set out in an offer document, to be added to a lenders qualifying outgoings where a lump sum is paid by said lender and usually offered by a borrower as an incentive for the lender to contribute said lump sum in addition to the ongoing payments prescribed;

mandatory redemption criteria means criteria upon which occurrence an agreement must be fully redeemed by the borrower in favour of the lender and where said criteria is equal for multiple agreements secured upon an asset, all such agreements must be redeemed in full; notwithstanding agreements of unequal criteria will be redeemed only upon occurrence of mandatory redemption criteria particular to each agreement;

offer document means a document generated according to systems of the present invention stating the proposed terms and conditions of a proposed agreement;

preserved estate value means estimated monies that a borrower would receive at a given point in time as net proceeds from sale of an agreement asset subsequent to all said agreements being fully redeemed;

primary lender means that entity classed as a lender in relation to an agreement to the exclusion of lenders under an agreement certificate ("MPAC") or a fixed investment agreement certificate ("FIMPAC");

qualifying outgoings means the ongoing payment contributions by a lender under a particular agreement plus any fees and charges paid pursuant to the agreement and specifically identified in the offer document or other transaction documents;

quarantine database means that subordinate ledger of the PPS 401 (FIG. 2) main ledger, in which agreements are managed whilst in the default consultation period and reserve monies recuperation period;

redemption settlement statement means a statement generated according to the present invention setting out necessary instructions that would enable a legal settlement provider to execute a borrowers redemption (or part thereof) of one or more capital guarantee all monies mortgage/(s) ("CGAMM"), or capital guarantee fixed mortgage/(s) ("CGFM"); as valued in accordance with the terms and conditions of each agreement to which they pertain;

redemption valuation means a calculation performed by the custodians and systems of the present invention in order that a value for qualifying outgoings, horizon gain, preserved estate value, CGAMM and CGFM can be ascertained;

required balance means the minimum total balance in a lenders account within the custodian trust account, as required at a time just prior to the stated time for generation of a trust account bank ledger report; in relation to one or more agreements;

reserve monies means monies paid in advance by a lender and held by the custodian on trust to be applied by the custodian in the event of default by a lender upon his ongoing payment obligations. The custodian will apply the reserve monies to further ongoing payments due, as well as costs, fees, charges, as they arise whether scheduled or as a result of the default; and where a lender recommences his ongoing payment obligations in accordance with the agreement before the custodian has determined the agreement and converted the lenders capital guarantee all monies mortgage to a capital guarantee fixed mortgage, then the lender will be required to pay a reserve monies premium as a lump sum or along with his ongoing payments over time in order to replenish the reserve monies balance to its minimum balance.

reserve monies premium means additional amounts payable as a lump sum or a series of payments made on a regular basis, as determined by the custodian in order to replenish reserve monies to the minimum required balance; whereby these lump sum or series of payments are to be made in addition to the regular ongoing payments scheduled under each agreement and instructed to be paid by the custodian under a type of default recovery notice. Typically, a lender remains in default until he has replenished the reserve monies to the minimum required balance by making all of the reserve monies premium payments required by the custodian;

reserve monies recuperation period means a period during which an agreement remains in a quarantine database and until such time as the reserve monies balance has been restored to its minimum balance via lender payment of the reserve monies premium;

retiree means a person no longer in full time employment, typically a borrower;

retirement saver means a person or entity that may lend money to a retiree;

saver means a person or entity that may act as a lender, settlement date means the date on which the agreement becomes binding upon a lender and borrower or the date on which the lender and borrower propose to enter into an agreement;

specified event means without limitation, some circumstance, point in time, or identifiable occurrence which can be stated within an agreement as a mandatory redemption criteria;

transaction documents means documents associated with the agreement. This may include, for example, (a) the agreement incorporating any loan contract and general conditions; (b) the offer document including any further information statement, or precontract statement contained therein; (c) any agreement with the custodian; (d) any valuations, disclaimers, terms, conditions and releases transaction base means a monetary (or otherwise) value calculated by the systems of embodiments of the present invention from which horizon gain calculations can be derived;

trust account bank ledger report means an electronic report containing the balances and transaction history of each lender, borrower and reserve monies for each agreement;

unencumbered means an asset which is not secured by a fetter such as caveats, leans, mortgages or charges; except when the fetter is itself a mortgage securing a capital guarantee fixed mortgage of embodiments of the present invention;

valuation premium means an offset, surcharge or similar offered by either the borrower or lender to be included in the calculation of qualifying outgoings or horizon gain allocation value. For example, the custodian may from time to time apply a valuation premium;

variation statement means substantially the same as redemption settlement statement only generated in relation to a variation of an agreement.

Acronyms

For clarity, the description and illustrations also include a number of acronyms as set out below. These acronyms are intended to assist understanding of the embodiments described and are not intended to limit the broader scope of the invention as claimed:

The description will also include the following:

| | | |
|---|---|---|
| AAR | | asset appreciation rate |
| ABD | 404 | active borrower database |
| AD | 20a, 20b | asset division |
| ADD | | asset division proportion |
| ADV | | asset division value |
| AL | | approved lender |
| ALD | 405 | active lender database |
| AMS | 400 | agreement monitoring system |
| AOVVS | 100 | agreement origination valuation and variation |
| ASM | | agreement summary module |
| B | 40 | borrower |
| BD | 103 | borrower database |
| CGAMM | 31, 71, 91, 101 | capital guarantee all monies mortgage |
| CGFM | 31, 71, 91, 101 | capital guarantee fixed mortgage |
| CTP | 104 | computerised training programme |
| CD | 102 | consultant database |
| CP | | custodian payment |
| HA | | home annuation |
| HAA | 1, 2, 3, 4 | home annuation agreement |
| HABOD | | home annuation borrowers offer document |
| HAC | 60 | home annuation custodian |
| HG | | horizon gain |
| HGA | | horizon gain allocation |
| HGAV | | horizon gain allocation value |
| HGT | | horizon gain transfer |
| IP | | ongoing principal |
| OP | | ongoing payment |
| LOAM | 200 | lender origination approval module |
| LD | 201 | lender database |
| LS | | lump sum |
| MRC | | mandatory redemption criteria |
| MRCc | | mandatory redemption criteria coefficient |
| OAPM | 500 | offer acceptance processing module |
| OLS | 501 | offer listing system |
| OP | | ongoing payment |
| OPD | | ongoing payment defaults |
| PCVSS | | proforma conversion and variation settlement statement |
| PM | 100 | pricing module |
| PL | | profit leakage |
| PPS | 300 | payment processing systems |
| QO | | qualifying outgoings |
| QR | | quarantine report |
| RA | 50 | real asset |
| R | | random coefficient |
| RMB | | reserve monies balance |
| S | 30, 90, 70, 100 | saver (lender/Investor/retirement saver) |
| SP | | single payment |
| TA | 302 | transaction accounts |
| TABLR | | trust account bank ledger report |
| UV | | upper value |
| VW | | valuation workflow |

Further scope of applicability of embodiments of the present invention will become apparent from the detailed description given hereinafter. However, it should be understood that the detailed description and specific examples, while indicating preferred embodiments of the invention, are given by way of illustration only, since various changes and modifications within the spirit and scope of the disclosure herein will become apparent to those skilled in the art from this detailed description.

BRIEF DESCRIPTION OF THE DRAWINGS

Various embodiments of the invention will be described with reference to the following non-limiting illustrations representing preferred embodiments of the present invention;

FIG. 33 is a screenshot of a prototype 'combined system' 500 in a system state providing tabular representation of comparison outcomes between agreements generated by one embodiment of the present invention and prior are shared appreciation schemes, for both lender and borrower.

DETAILED DESCRIPTION

Figure 1:
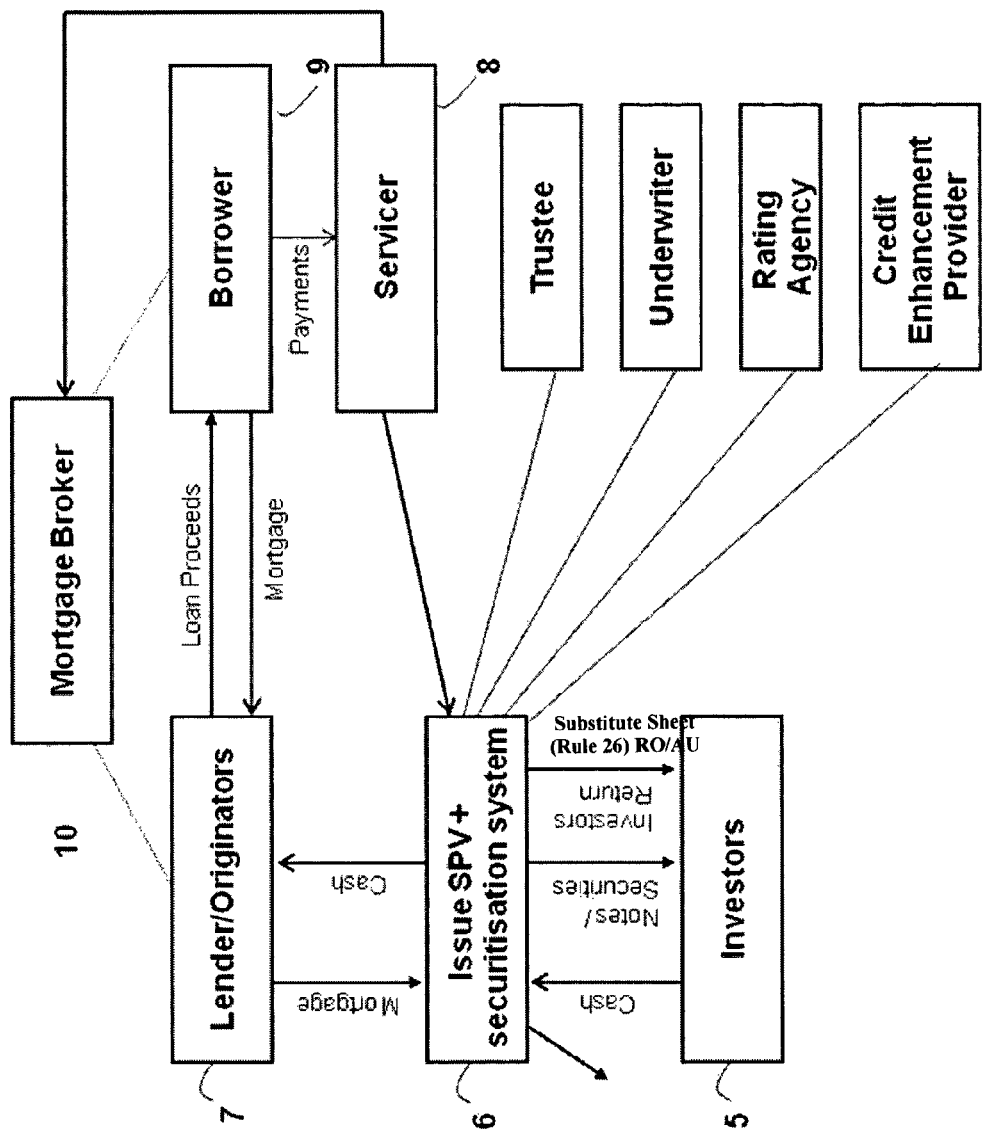
FIG. 1 is a schematic flow chart of prior art systems for mortgage origination and securitisation, showing "leakage" to the financial industry.

FIG. 1 depicts prior art mortgage origination and securitisation processes which are commonplace in addition to more traditional 'on balance sheet' lending practices. Revenue derived from the loan is from either interest payments throughout the term; or payment, and in the case of asset depreciation deduction, of 'interests worth' upon redemption of the mortgage loan. This revenue, or return in the case of the investor 5, is calculated in relation to the loan principal using either a compounding interest rate or using a ratio of asset appreciation/depreciation to loan principal, or both. Mortgage brokers 10 find borrowers 9 and submit loan applications on behalf of the borrower 9 to the lender/originator 7 who will approve or reject the borrowers 9 application, based upon criteria set by the issuer 6 in order to construct a pool of mortgages that can be securitised, typically via a unit trust mechanism and sold to investors 5 who then ultimately hold the credit risk. The servicer 8 is contracted to manage mortgage loans and collect payments from borrowers 9 and remit these payments to the issuer 6 who distributes to investors 5. Remuneration for the servicer 8 is generally based upon volume fees. Lenders/originators 7 generate their revenue from selling the mortgage loans as well as fees. Issuer 6 generates revenue from selling securities to investors 5 and clipping mortgage returns whether interest or appreciation based. Ultimately the majority of risk is passed onto the investor after credit enhancement, whether risk be; borrower default upon an interest based mortgage loan; or low, zero or negative growth of underlying assets over which shared appreciation and depreciation mortgages loans are secured.

An important aspect to appreciate regarding the existing mortgage loan origination systems, whether subsequently securitised or not, is that loan applications are approved or rejected based upon the lender's criteria. Of course in the case of existing contemporary lending methods this often reflects the nature of the securitisation pools for which there is investor demand. Borrowers can be rejected on what can seem to them as an arbitrary basis, in contrast to the home buying or selling process which a mortgage loan is often financing, where for example they (a consumer/home seller) can set out the value at which they will sell their home and offer it to millions of potential purchasers for acceptance. The invention described herein enables borrowers to take an active role in setting the terms under which they wish to borrow and offer such terms to an unrestricted market of potentially millions of lenders (savers/investors) as well as professional investor entities if they so desire.

Figure 1A:
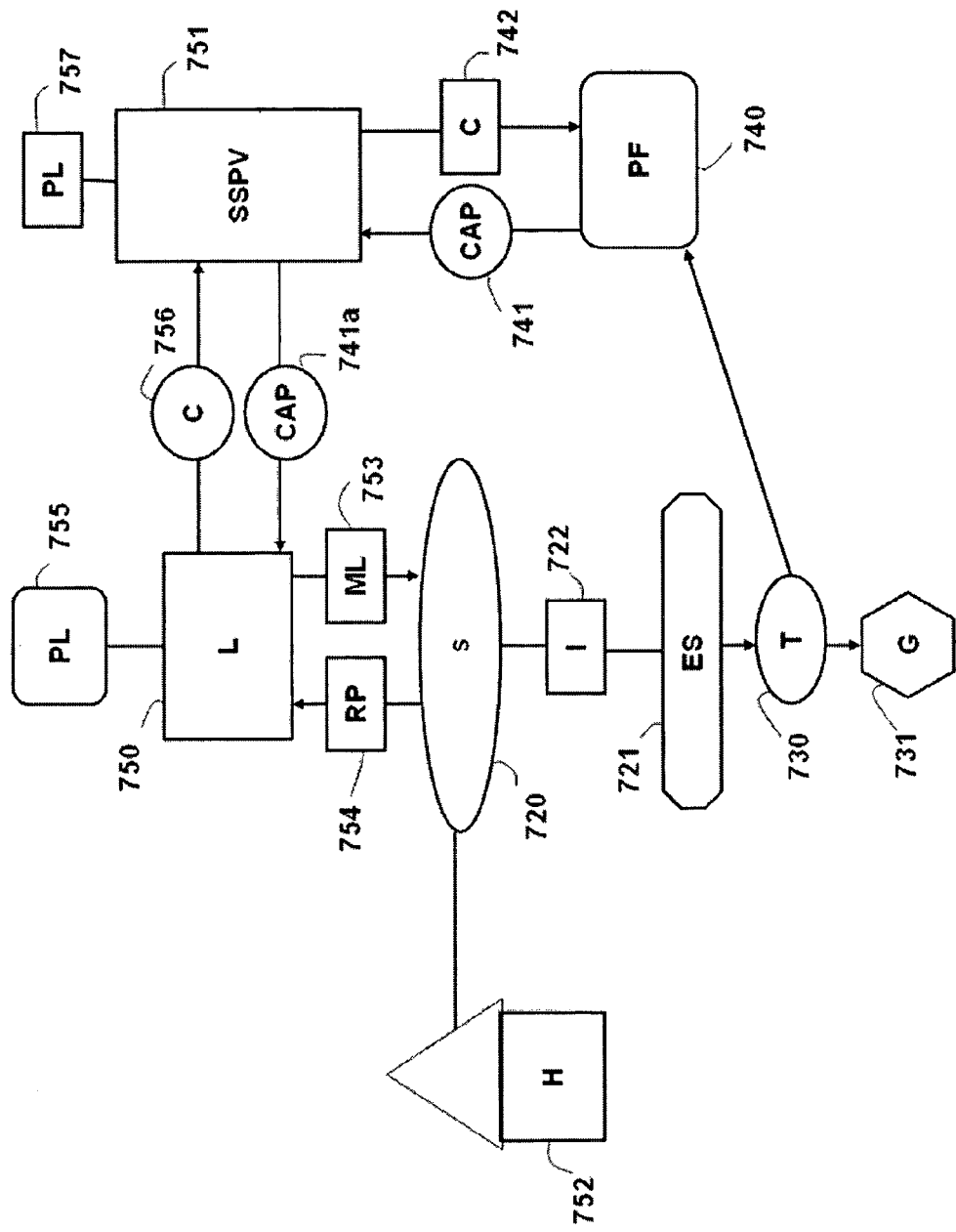
FIG. 1a is a schematic flow chart of a prior art consumer money cycle demonstrating leakage by way of profits to the financial industry.

To demonstrate the effect upon consumers of prior art lending systems, FIG. 1a is a simplified depiction of the loss to consumers from their interaction with prior art lending systems and which the present invention seeks to alleviate by allowing consumers to invoke the present invention in isolation or in combination with prior art lending systems and methods. FIG. 1a depicts saver ("S") 720 who participates in employment source ("ES") 721 in order to derive income ("I") 722 and which results in taxation ("T") 730 payments to government ("G") 731, with part of said T 730 allocated by said G 731 to pension fund ("PF") 740. It will be appreciated that PF 740 could also be depicted as a superannuation fund where said fund would receive a minimum of the super guarantee from ES 721. Once S 720 has sufficient deposit to purchase a home ("H") 752, he engages with lender ("L") 750 who provides mortgage loan ("ML") 753 secured upon H 752 and in return S 720 must make interest and principal repayments ("RP") 754. L 750 replenishes (or obtains as the case may be) his lending capital ("CAP") 741a from securitisation special purpose vehicle ("SSPV") 751 by issuing a security and paying coupon ("C") 756 which will have a lower value than RP 754; the difference between the two is represented by profit leakage ("PL") 755. There are of course many other profit leakages in this system in the form of fees and charges as entities managing the system in reality number far greater than the two shown as SSPV 751 and L 750. The SSPV 751 obtains capital ("CAP") 741 from PF 740 in exchange for issuing a security with a coupon ("C") 742 which will be less than C 756, such difference represented by profit leakage ("PL") 757 which goes towards the remuneration of such entities (not shown) as underwriter, trustee, rating agency, credit enhancement provider, mortgage servicer. The essence of FIG. 1a is a representation of a consumer having to pay the financial industry to employ money which, with particular reference to superannuation contributions, has already been allocated for the consumer to invest and manage in order to maximise the value of these monies available upon retirement and which value would arguably grow to a larger sum for retirement where the financial industry is not directly deriving income and profit from those monies. In respect of the PF 740 shown, FIG. 1a demonstrates that a leakage to the financial industry is present and that the consumer is always paying for this leakage through higher taxes, lower pensions and directly out of their disposable income over the course of their working lives via payments of interest or "interests' worth" to the financial industry. The present invention, in various embodiments will alleviate the cost to consumers. In one embodiment of the present invention, mortgage funds are established to provide housing (or otherwise) finance to consumers that combine prior art interest bearing debt finance with home annuation so that the immediate cost of finance to consumers is more affordable, through both direct means and indirectly; as such arrangements effectively lower consumer default risk and hence lower the risk premium a lender (the fund) needs to charge upon the interest bearing debt component.

The process of the invention additionally provides means for the borrower to divide real asset into equal or unequal portions so that they can concurrently obtain finance from a number of independent lenders on substantially different terms. In addition this instrument does not restrict the borrower to licensed credit providers, banks, or the like, but instead allows the borrower to borrow from other consumers, various entities, or licensed credit providers and banks in combination if so desired where engagement with more than one financing entity is sought.

By this system or method, consumers (such as owner occupiers and landlords) can access housing finance or implement effective retirement saving (investment/lending) and retirement income (borrowing) without necessarily having to engage in prior art systems developed by the financial industry, which can result in 'leakage' from their savings and income.

Figure 2:
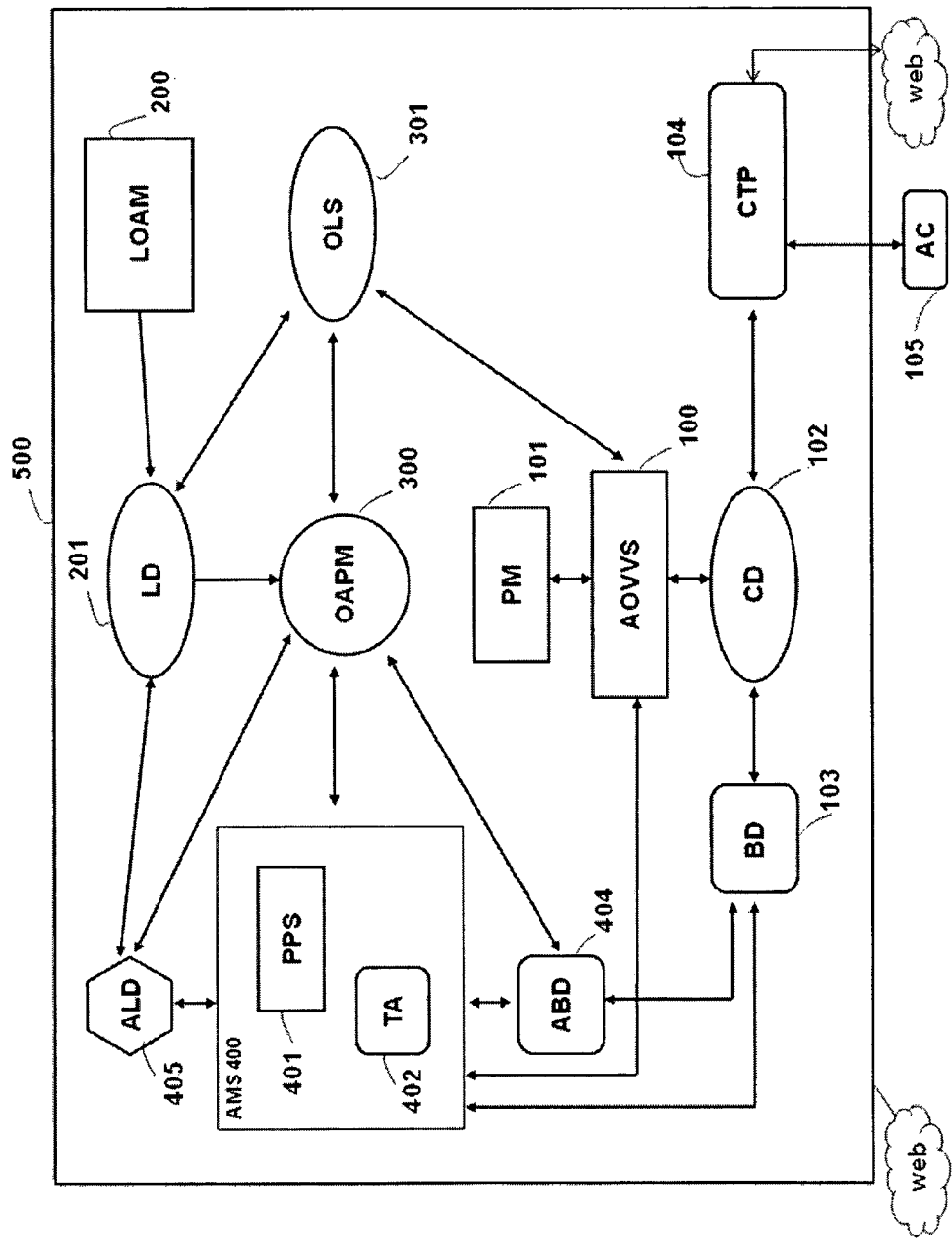
FIG. 2 is a schematic and flow chart of the agreement origination valuation and variation, lender origination, offer acceptance processing, agreement monitoring, payment processing and training systems of a preferred embodiment.

FIG. 2 describes how a number of modular systems integrate to form the "combined system 500" which collectively comprises the systems, methods, formulations, technologies and instruments which enable the present invention to be performed in its various embodiments. The "combined system" 500 is capable of operating on a largely automated basis with limited human input but has been designed to include & prompt for human oversight provided by a system operator ("SO") if required. This has social benefit of maintaining an element of human "common sense" throughout and contributes to the overall alignment of the "combined system" 500 with superior ethical and moral standards. For example, these standards are applied through non-discrimination of borrowers and enabling borrowers to substantially set the terms and conditions under which they would choose to borrow, in contrast to prior art lending systems that may reject borrower applications based upon combinations of generic rules such as postcode, asset type, demographic etc. on an automated basis. Under the present invention, it may be the lender who subsequently accepts a borrower's proposed terms on top of the general terms for the relevant embodiment.

The "combined system" 500 is capable of combining lenders and borrowers in unique agreements, described herein as a way of accessing ongoing principal, debt free leverage and indefinite term financing arrangements, to provide a means for stand-alone or combined retirement saving, housing finance, and retirement income.

For clarity sake, the "saver (investor/lender)" referred to herein can include, but is not limited to; consumers, trustees of self managed superannuation funds (whether corporate or individual), superannuation or pension funds, specialist funds, other entities. The "borrower" referred to herein can include, but is not limited to; consumers, trustees of self managed superannuation funds (whether corporate or individual), superannuation or pension funds, specialist funds, other entities.

As discussed the "combined system" 500 may have a number of modular components which integrate to enable commercialisation of the present invention. These interactions and systems are summarised as follows:

The "Agreement Origination Valuation and Variation System" 100

The "combined system" ("CS") 500 is ultimately operated by a custodian in the role of system operator ("SO"). The SO approves individual access to components of the CS 500 and at the outset the SO grants potential home annuation consultants access to the web based "consultant training programme" ("CTP") 104. Because CS 500 and its home annuation embodiment are so unique, optimally potential consultants will need to pass a (web based) CTP 104 training and examination process before applying to the SO for registration as a home annuation consultant. Registered consultants are entered into the "consultant database" ("CD") 102, from where they can consult with potential borrowers and generate entries in the "borrower database" ("BD") 103. In direct reference to a valid entry in the BD 103, the consultant can request the "agreement origination variation and valuation system" ("AOVVS") 100 to generate a "home annuation borrowers offer document" by submitting data to the AOVVS 100 via the interface provided for registered consultants. Upon such request, the AOVVS 100 processes the input data and performs calculations based upon the information it has received, in order to; create divisions within the real asset offered by the borrower as security (the agreement asset); and generate the volume and type of data required by the "pricing module" ("PM") 101. Upon receipt, of the data by AOVVS 100, a unique pricing engine is created within PM 101 for each division that was created within a borrower's real asset at AOVVS 100. Each of these unique pricing engines within PM 101 performs calculations based upon the data it received from AOVVS 100 which may have initially been generated to reflect borrower preferences. This is unique to the present invention as prior art systems generate offer documents based largely upon the lender's preferences, which in the case of most contemporary lending practices, refers ultimately back to investor preferences in securitized pools. Based upon the input data, PM 101 calculates the ongoing principal for each division of the real asset, as well as numerous forecasts and charts as to how the borrower and lender will fare under a variety of economic variables and for each scenario, provides comparisons of home annuation against existing prior art systems as they might apply to both lender and borrower. The PM 101 generates those tables and performs those calculations described above under Summary of invention for each division created in an asset by the database system and subsequently generates a home annuation borrower's offer document ("HABOD") in digital form for each division of the asset. AOVVS 100 consolidates each of the PM 101 divisional outputs to create a whole of asset summary ledger and report, comprising all divisions, whether or not each division secures a home annuation agreement. A digital representation of all inputs and outputs is stored within the AOVVS 100 indefinitely so that a real asset record can be called up for further calculations upon the asset divisions, including variation upon an established home annuation agreement or creation of a borrowers offer document for a new home annuation agreement over one of the asset divisions.

Borrowers home annuation offer documents generated within the PM 101 component of AOVVS 100 are submitted to an "offer listing system" ("OLS") 301 via digital signal so that they may be offered to prequalified lenders who have access to the OLS 301 via registration upon the "lender database" ("LD") 201. Home annuation offer documents accepted by lenders are routed via the "offer acceptance processing module" ("OAPM") 300 and once settled, are routed to the "agreement monitoring system" ("AMS") 400. Each of these workflow routes represents a change in status of a division in a real asset and as such, each status change is reported back to AOVVS 100 to update a real asset record accordingly at the asset summary module ("ASM").

Following inputs received from AOVVS 100, the calculations which take place within PM 101 in order to generate a HABOD primarily focus upon generation of time series data tables in order to identify an optimal value for ongoing principal (initial value thereof), with reference to a lender return at a nominated future time interval, which in itself represents a cost to a lender in obtaining potential asset appreciation on a debt free leverage basis with a capital guarantee over some or all qualifying outgoings. PM 101 generates said tables and optimised ongoing principal (IP) by invoking an algorithm to find an optimal solution to the IP equation, which contains coefficients themselves based upon equations that represent unique relationships between various inputs to the system. The general form of the ongoing principal equation is as follows, $$TB_0 \times HGA_i \times R \times MRCc_0 = IP \qquad \text{eqn (1)}.$$

where $TB_0$ is the transaction base represented by, $$ADV_0 - (M)TC_0 - (P)LS_0 = TB_0 \qquad \text{eqn (2)}$$

and $MRCc_0$ is the mandatory redemption criteria coefficient derived from equations that vary according to the particular commercial terms of an agreement generated, settled, managed and redeemed by an embodiment of the present invention and $HGA_i$ is the horizon gain allocation proportion at time=1 expressed in favour of the lender. The random coefficient, R, enables optimization of IP in relation to lender and borrower returns at year n and a variety of borrower selected variables. In equation (2), the asset division value at the generation date, $ADV_0$ is calculated from the equation $$AV_0 \times ADP = ADV_0 \qquad \text{eqn (3)}$$

where ADP is the asset division proportion assigned by the borrower to a particular agreement of the present invention by way of input to the AOVVS 100 and $AV_0$ is the whole of asset value at a time proximate to an agreement generation date in accordance with an approved valuation where such input has been entered. Transaction costs, $TC_0$ will generally consist of all those costs required to achieve settlement of the transaction excluding the first and any reserve IP payments made at settlement, whilst $LS_0$ represents the value of any lump sum payment (including any lump sum loading premium) entered into the database system as an input prior to optimisation of the system and subsequently paid by the lender at settlement. M is a coefficient chosen to weight the significance in value of $TC_0$ and P is a coefficient chosen to weight the significance in value of $LS_0$.

Solving for optimal ongoing principal (IP), requires that a lender's qualifying outgoings ("QO") value or horizon gain ("FIG") share value at time i be established by the database system, given $$(M)TC_i + (P)LS_0 + \Sigma OP_i = QO_i \qquad \text{eqn (4)}$$

where $\Sigma OP$ is the cumulative total of all, or those nominated amounts of ongoing principal and allowable administration charges and costs paid by a lender in direct relation to a particular agreement of the present invention (i.e. home annuation agreement). A lender's horizon gain allocation value at time i must also be established in order to run a "lender redemption value" ("LRV") algorithm which invokes the "greater of" rule in respect of qualifying outgoings and horizon gain. Using the equation $$(ADV_i - TB_i)HGA_i = HGAV_i \qquad \text{eqn (5)}$$

the lender redemption value algorithm is invoked by the PM 101 component of the database system to select between $HGAV_i$ and $QO_i$ and said lender redemption value algorithm may be invoked to apply further weighting to both or either $HGAV_i$ and $QO_i$ prior to selecting between the two, such weighting applied by way of a coefficient calculated in accordance with terms of each agreement of the present invention and entered into the database system and stored within AOVVS 100 at the time the agreement was priced by the database system.

$MRCc_0$ will vary based upon data input to AOVVS 100 at the outset, though it will be appreciated that the $MRCc_0$ is used by PM101 as a coefficient of $TB_0$ in equation (1) and thereafter are used by PM101 in any valuation, variation, redemption calculation or any other operation on the agreement subsequent to settlement. The equation used to determine $MRCc_0$ will vary upon the type of mandatory redemption criteria input to the system at the generation date. If initial AOVVS 100 input sets system parameters to solely "life expiry" criteria then $MRCc_0$ becomes a function of the borrower's life expectancy:

$$1/(D_t - D_0) * (xf) = MRCc_0 \qquad \text{eqn (6)}$$

where $D_t$ is a future point in time derived from relevant life expectancy tables and $D_0$ is a date proximate to the generation date for the HABOD and (xf) is a coefficient which may be set equal to one; or some other number chosen by the system operator to aid in defining a market segment of a particular embodiment. Alternate AOVVS 100 inputs may set the system parameters to "upper value" criteria for the asset, so that $MRCc_0$ becomes a function of both asset growth and time, where:

$$ADV_0(1+AAR)^n = UV(7), \text{ and } 1/n * (xf) = MRCc_0 \qquad \text{eqn (8)}$$

is solved for n and $MRCc_0$. The present invention may also invoke further algorithms based upon inputs to AOVVS representing borrower preferences so that $MRCc_0$ can be derived from a combination of mandatory redemption criteria. These algorithms for generating a $MRCc_0$, whether two stage or multistage, are a key determinant of $IP_0$ and can be; consistently applied where the embodiment of the present invention requires; or generated on a bespoke offer by offer basis by the system operator and variables subsequently disclosed in the home annuation offer document.

It will again be appreciated that, although limited where embodiments are used to form a regulated market, home annuation retains commerciality between borrower and lender and assists these counterpartles in entering into arrangements that may be in relation to detailed disclosure of the potential profit and wealth outcomes for both under a variety of combined macro and micro forecasts.

Description of an Overview of the Method and System Procedures

Figure 12:
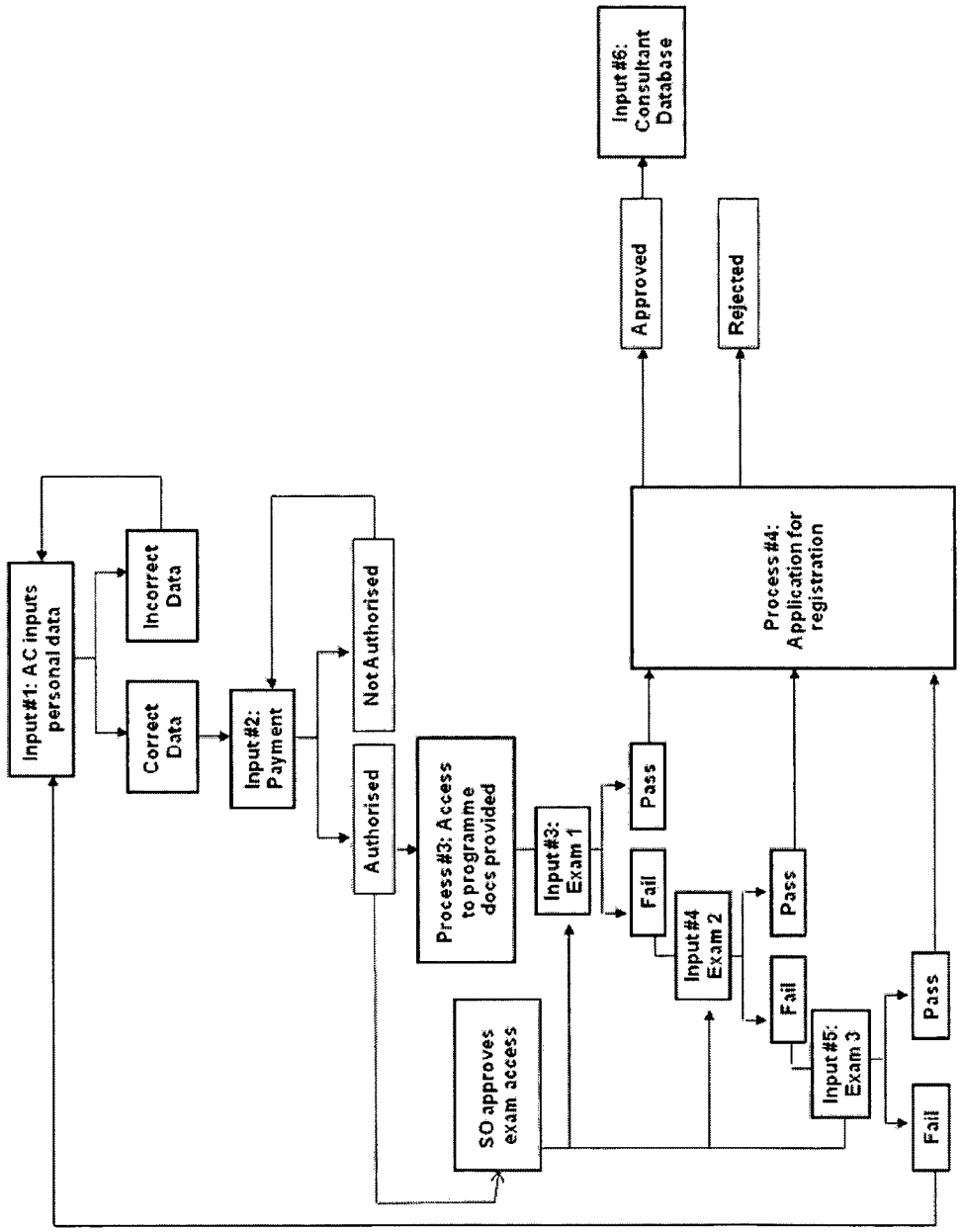
FIG. 12 is a schematic flow chart of a consultant application and approval process for the present invention.

The steps of consultant application and approval are described in the following paragraphs with reference to FIG. 12:

Input #1: An aspiring consultant ("AC") 105 (FIG. 2) who wishes to provide home annuation consulting services populates a form on website A ("WA") (FIG. 2) of the combined system 500 with data concerning: name, address, with all fields set as 'mandatory'

Process #1: validate fields of entry.
 If true proceed to next
 If false return to input #1

Input #2: AC Input of payment information

Process #2: validate 'payment information' fields of entry
 If true proceed to next
 If false return to input #2

Process #3: AC provided with access to certification program documents and registered for online examination with a username and login Input #3: AC inputs examination answers into examination questionnaire
 If result 'fall'=true, proceed to input #4
 If result 'pass'=true, proceed to process #4

Input #4: AC inputs examination answers into examination questionnaire
 If result 'fail'=true, proceed to input #5
 If result 'pass'=true, proceed to process #4

Input #5: AC inputs examination answers into examination questionnaire
 If result 'fall'=true, proceed to input #1, or end
 If result 'pass'=true, proceed to process #4

Figure 24:
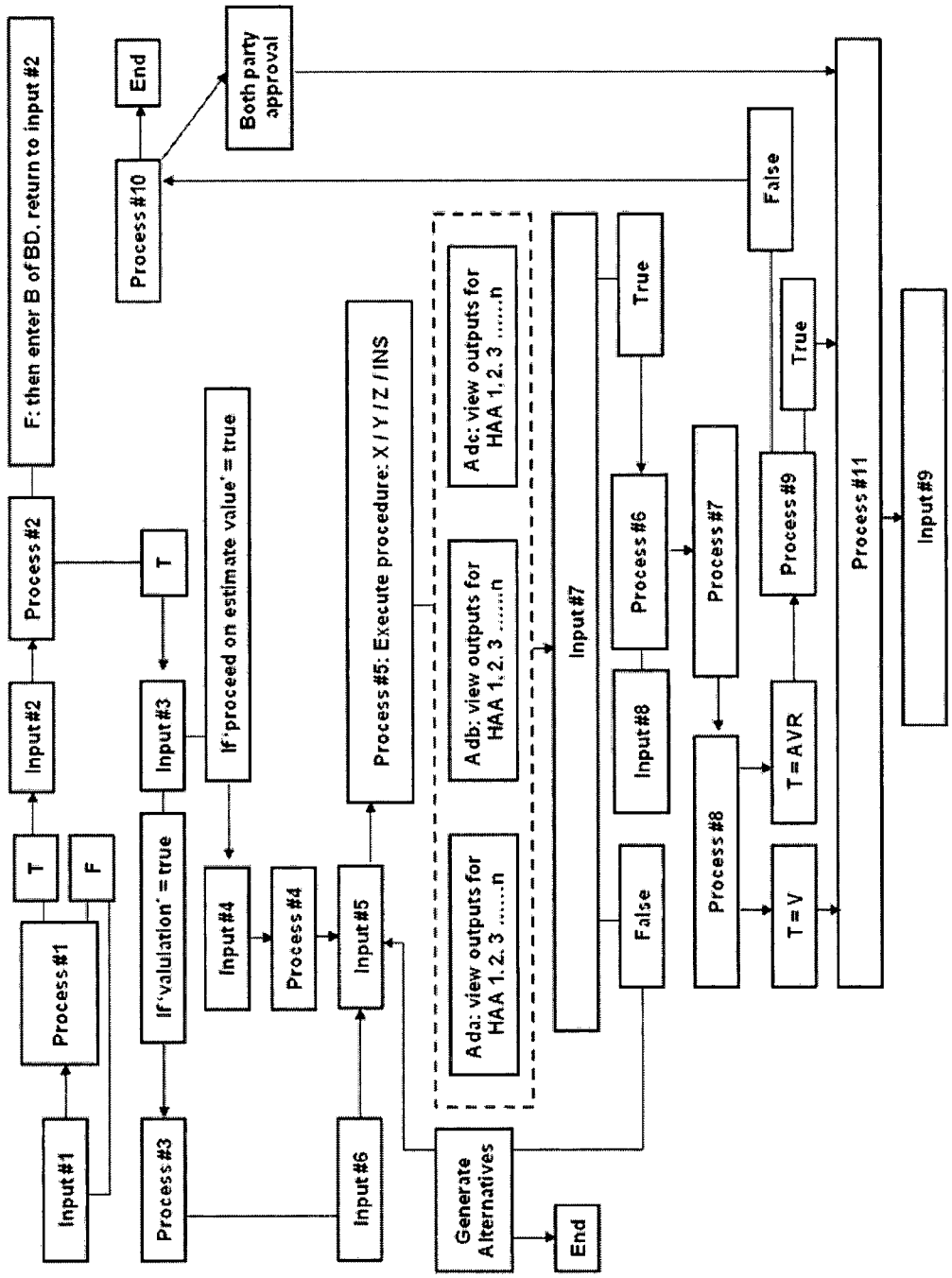
FIG. 24 is a schematic flow chart representing procedures for generating new offer documents pertaining to agreements which are executed throughout the overall combined system 500 (FIG. 2)

Process #4: AC applies for registration upon CD 102 (FIG. 2),
 If 'approved'=true, proceed to input #6
 If 'approved'=false, end process Input #6: AC details entered into CD
 CD provided with accreditation and registration that allows him to consult with consumers in relation to home annuation The new HABOD generation is described in the following paragraphs with reference to FIG. 24:

Input #1: consultant inputs data to AOVVS

Process #1: check fields of entry
 If true proceed to next
 If false return to input #1

System state. #1: consultant logged into AOVVS interface

Input #2: consultant input borrower details

Process #2: check fields of entry
 If true proceed to next
 If false—enter borrower ("B") on borrower database ("BD")—return to Input #2

Figure 13:
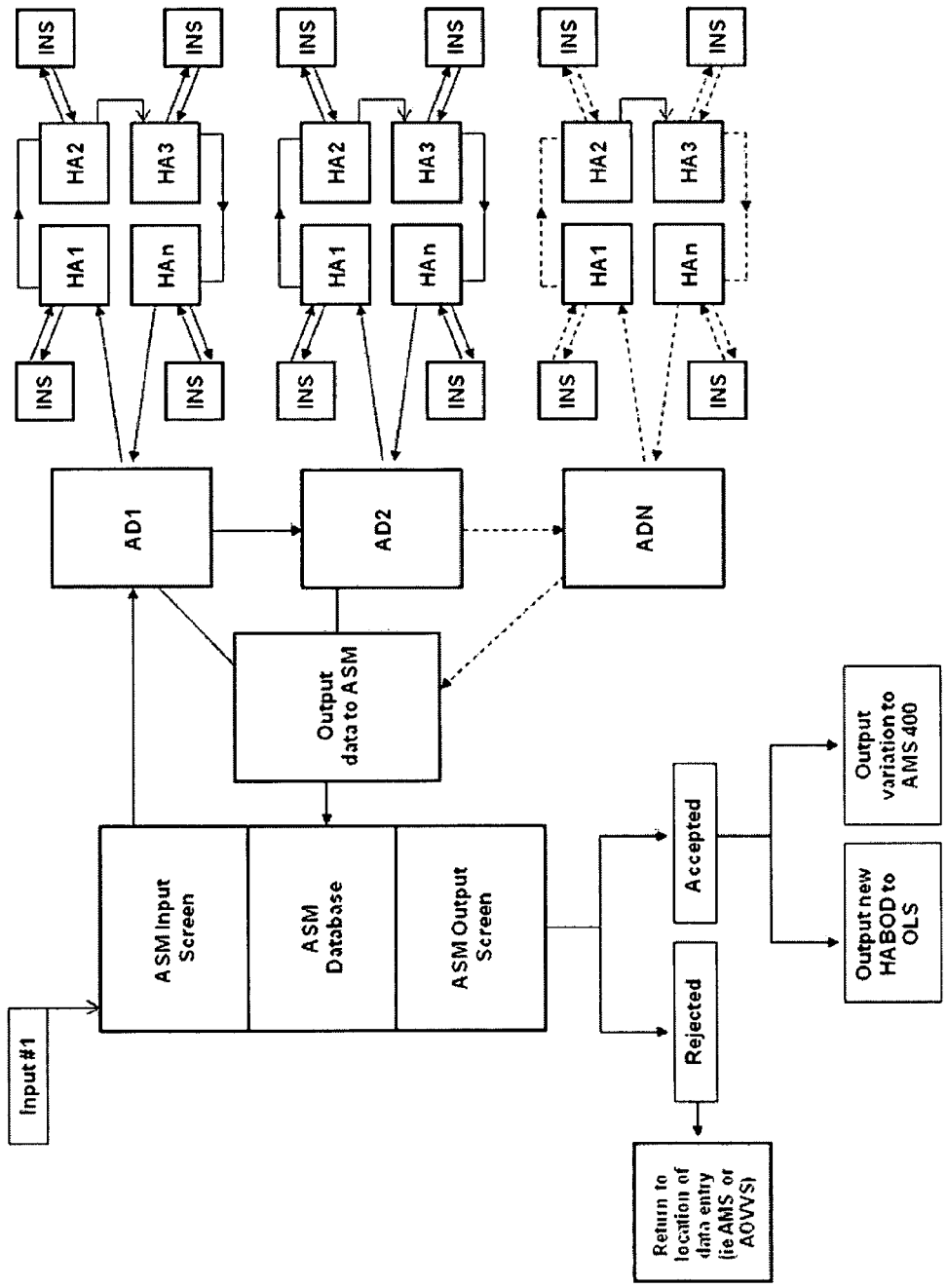
FIG. 13 is a schematic flow chart representing procedure X which takes place predominately within AOVVS 100 and PM 101 (FIG. 2) but with close interaction and feed forward and feed back electronic communication with other elements of the overall combined system 500 of the present invention.
Figure 16:
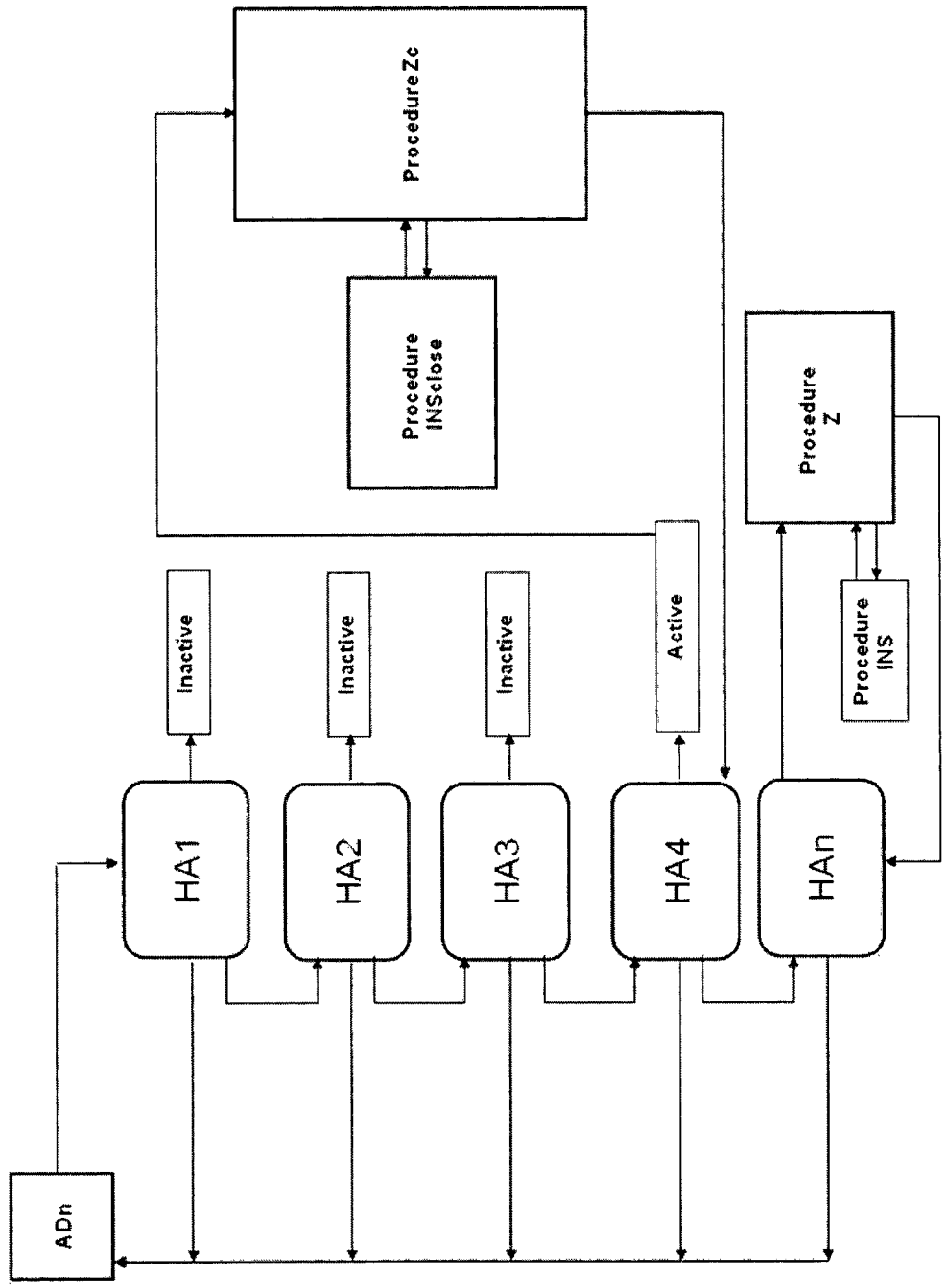
FIG. 16 is a schematic flow chart representing procedure Yvcn which is executed predominately from within AOVVS 100 and PM 101 (FIG. 2) and is a subordinate procedure to procedure W or procedure X.
Figure 17:
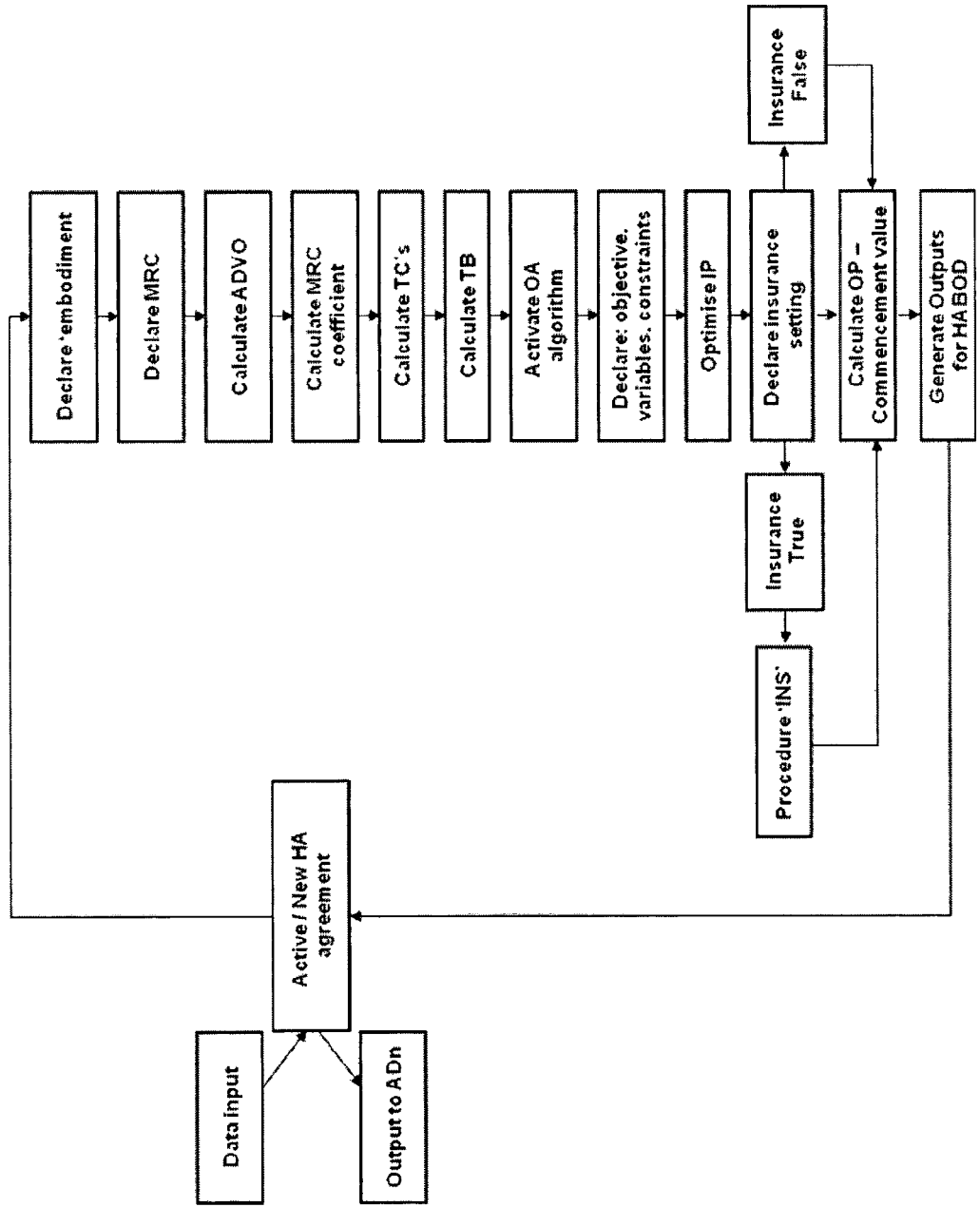
FIG. 17 is a schematic flow chart representing procedure Z which is executed predominately from within AOVVS 100 and PM 101 (FIG. 2) and is a subordinate procedure to procedure Y or procedure Yvcn.
Figure 18:
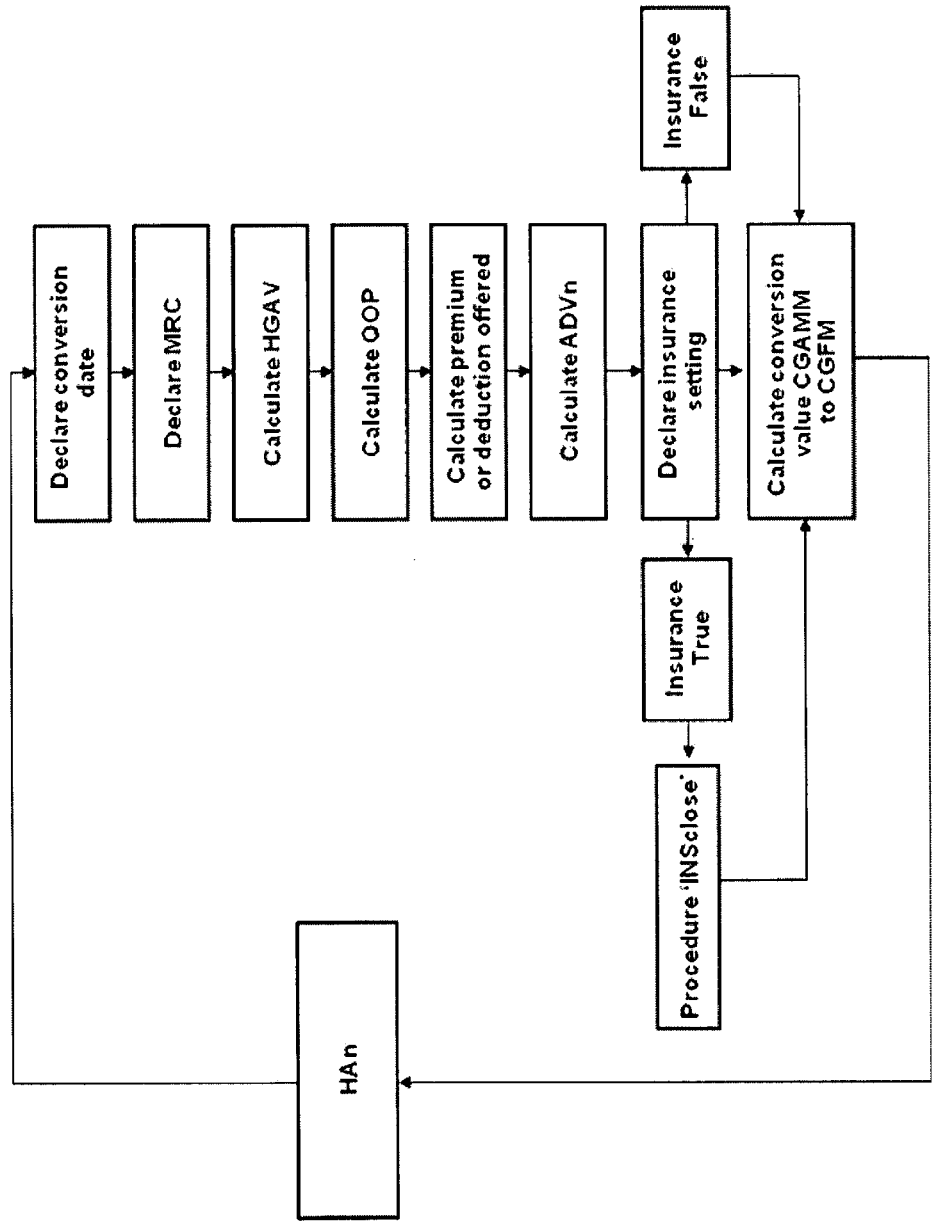
FIG. 18 is a schematic flow chart representing procedure Zc which is executed predominately from within AOVVS 100 and PM 101 (FIG. 2) and is a subordinate procedure to procedure Y or procedure Yvcn.
Figure 20:
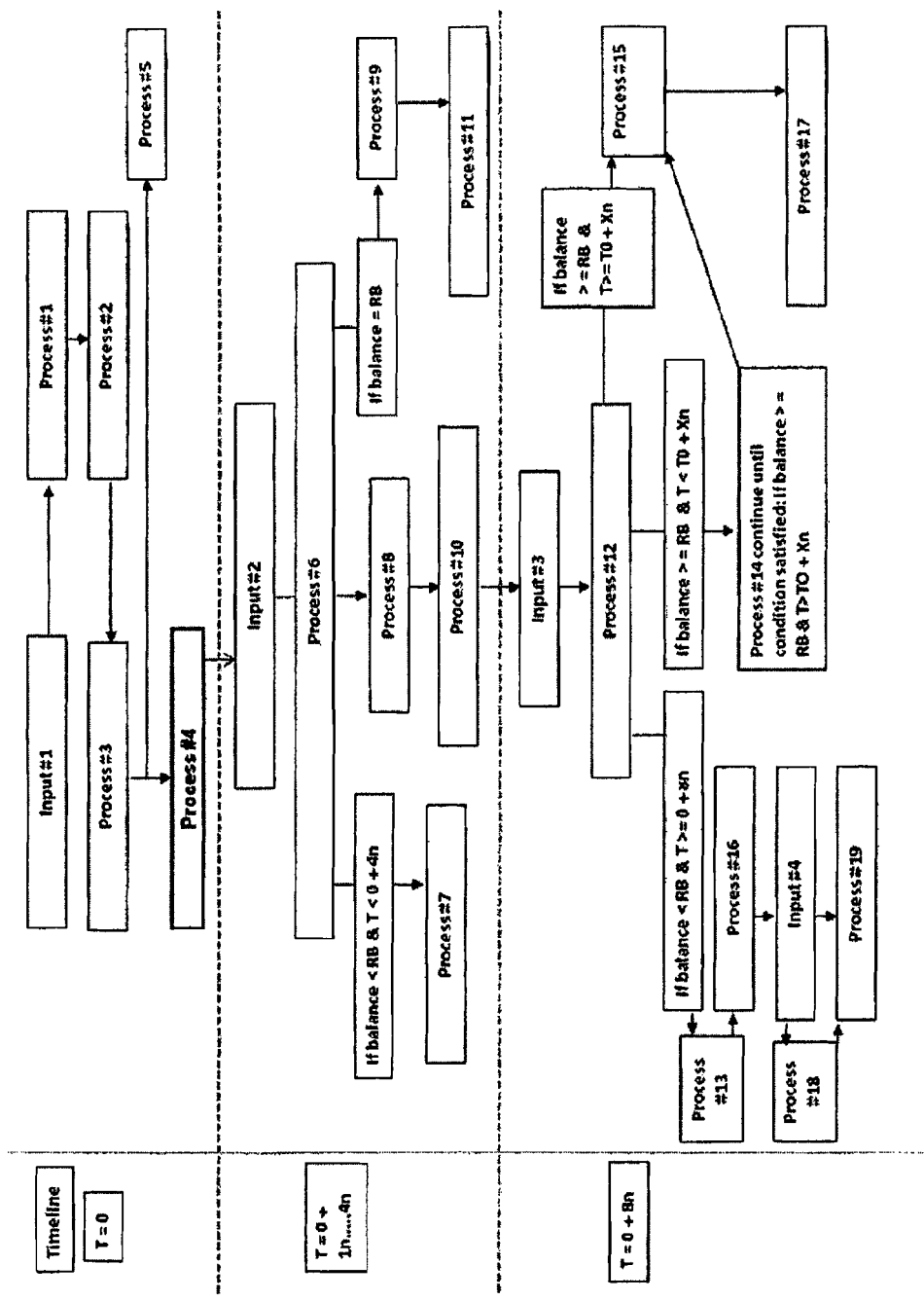
FIG. 20 is a schematic flow chart representing procedure D2 which is executed predominately from within AMS 400 in close electronic communication with AOVVS 100 and PM 101 (FIG. 2) and is a subordinate procedure to the monitoring procedure shown on FIG. 21.
Figure 21:
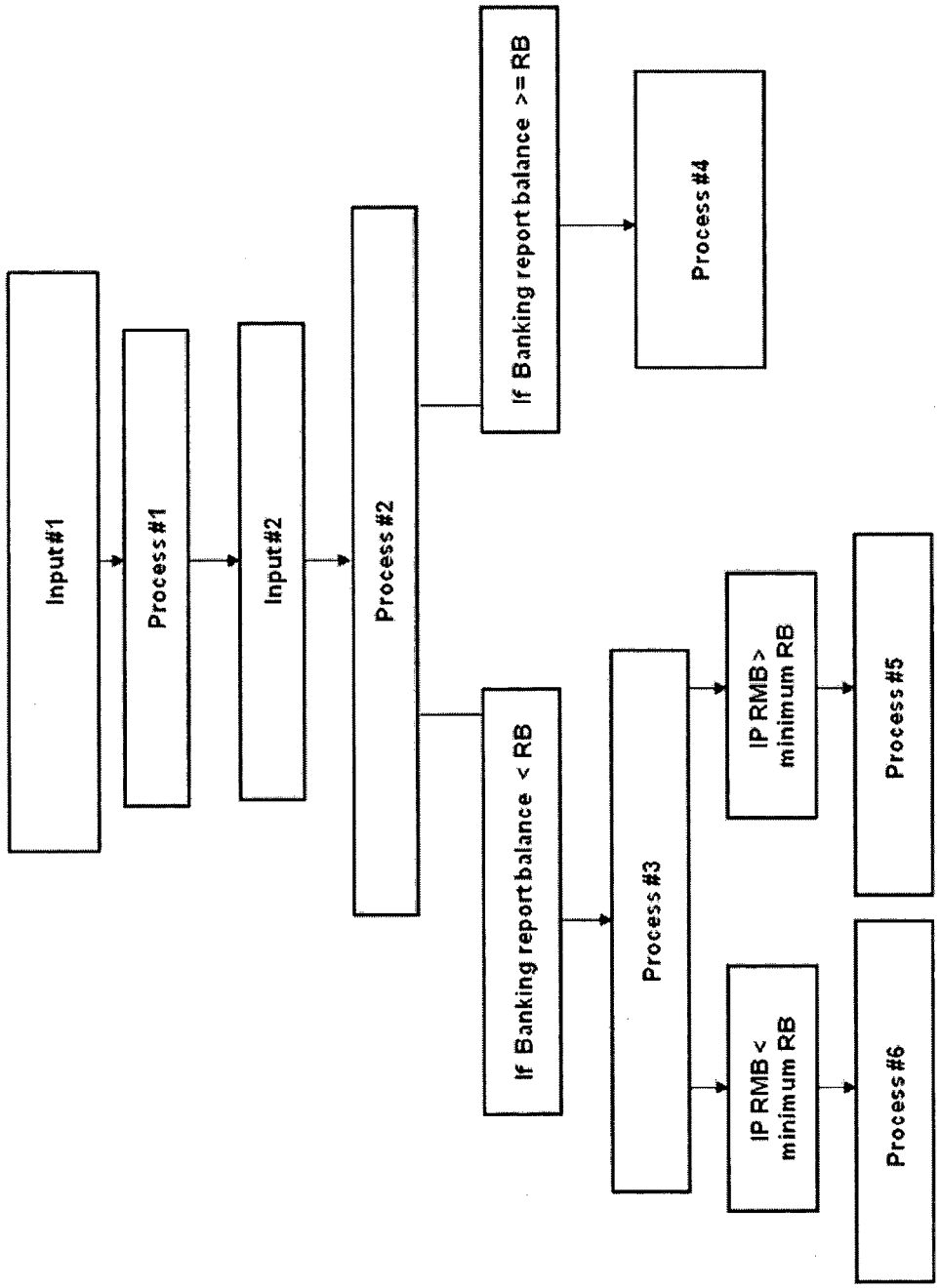
FIG. 21 is a schematic flow chart representing monitoring procedure which is executed predominately from within AMS 400 in close electronic communication with AOVVS 100 and PM 101 (FIG. 2)
Figure 22:
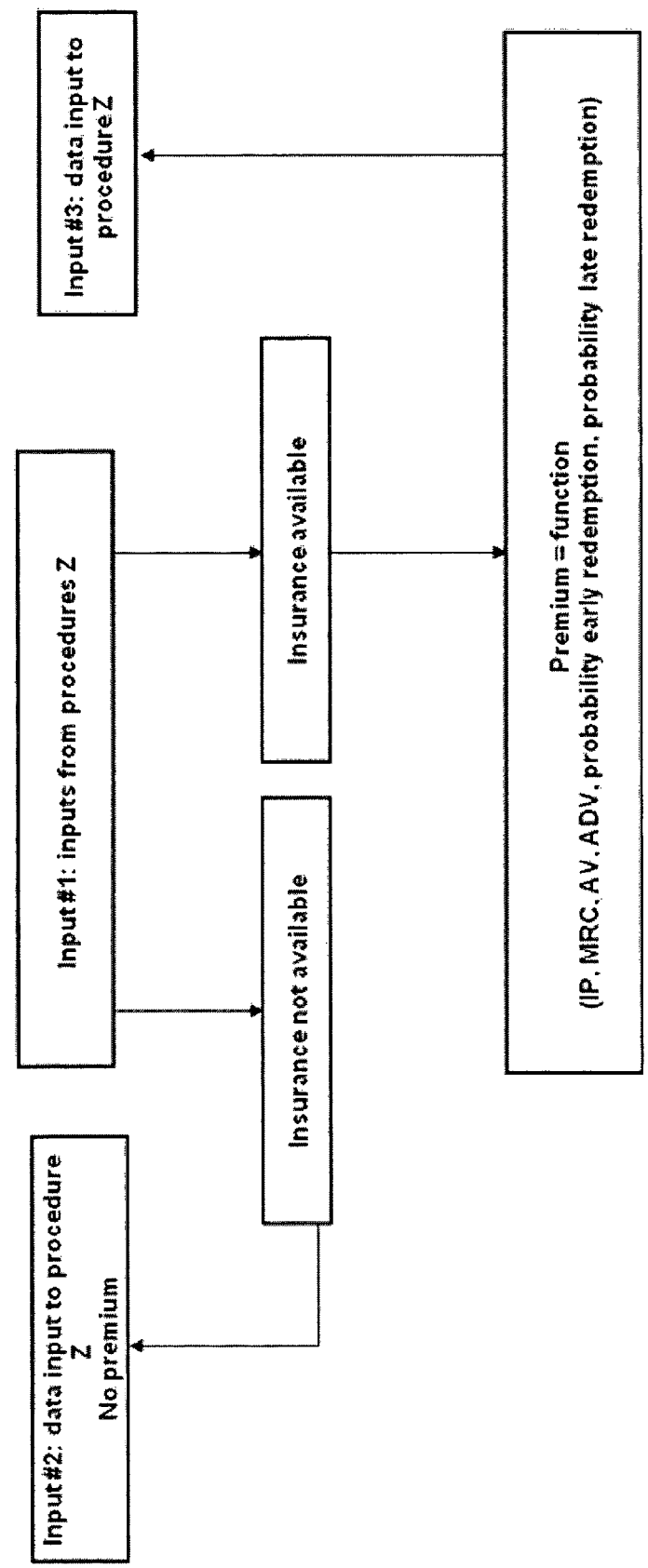
FIG. 22 is a schematic flow chart representing procedure INS which is executed predominately from within AOVVS 100 and PM 101 (FIG. 2) and is a subordinate procedure to procedure Z, procedure ZC, or procedure Zd.
Figure 25:
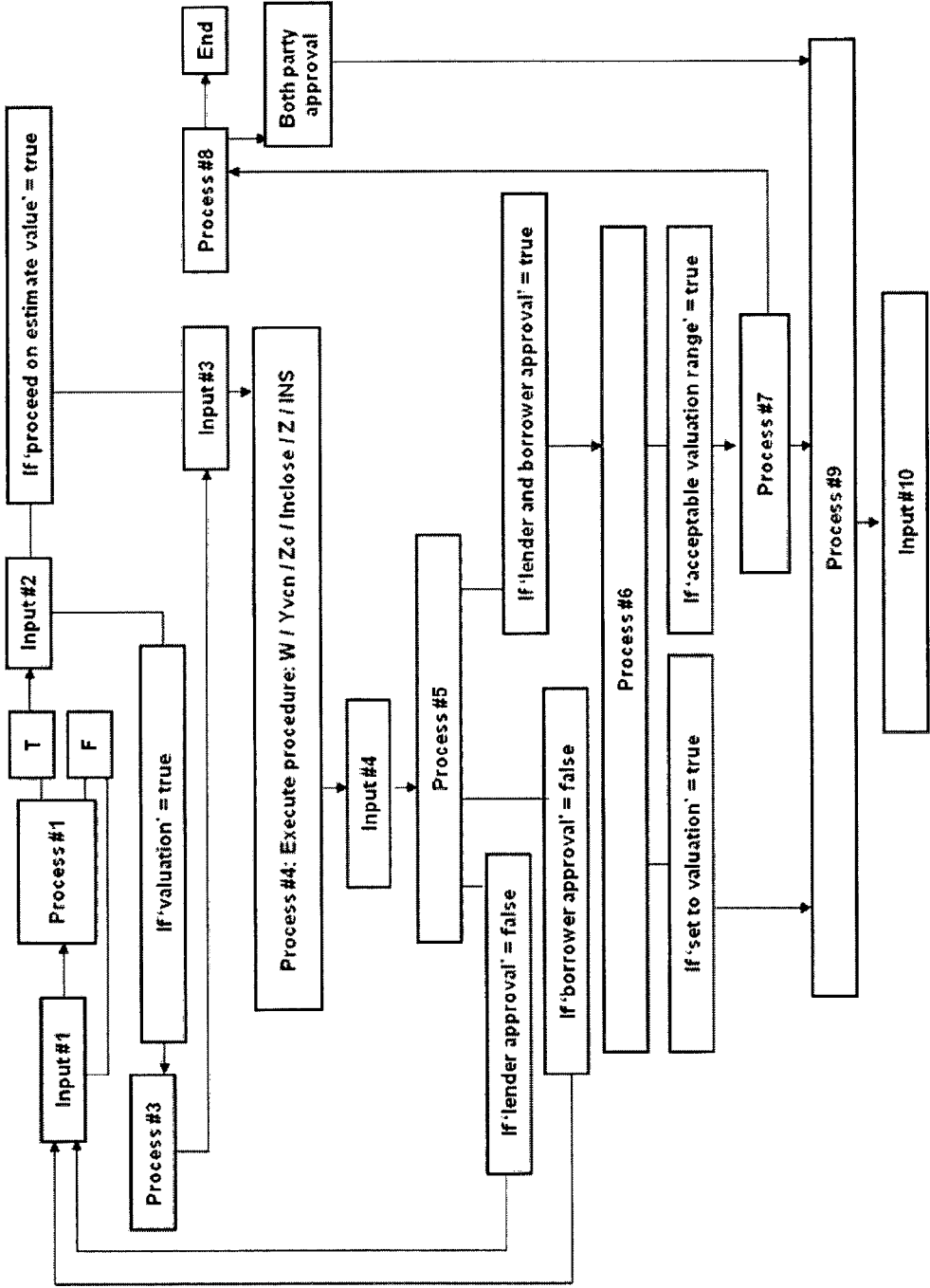
FIG. 25 is a schematic flow chart representing procedures for varying multiple agreements of the present invention between existing counterparties, which are executed throughout the overall combined system 500 (FIG. 2)

Input #3: asset details entered to AOVVS
  If 'set to valuation'=true, proceed to process #3
  If 'select proceed on estimate of value'=true, proceed to "Input #4"
Process #3: valuation workflow ("VW") routed via electronic signal to valuation platform
Input #4: enter 'acceptable valuation range'
System state #2: all required fields populated with data required to generate asset summary module ("ASM")
Process #4: execute procedure 'new ASM'
  Generate user interface of ASM
  Generate unique model for each HA agreement,
System state #3: ASM created to reflect inputs #1 to #4
Input #5: ADP's, HGA each asset division, MRC each HA agreement, indexation measure, rates for macro & micro comparison outputs (see annexure 1)
Input #6: if 'set to valuation'=true, input valuation data to ASM
Process #5: execute procedure "X"
  See further FIG. 13
  Procedure "X" in this instance subordinates sub-procedures; procedure "Y" see further FIG. 15; procedure "Z" see further FIG. 17; procedure "INS" see further FIG. 22.
System state #4: ASM output screen displays suggested configuration for acceptance by borrower
Input #7: borrower acceptance of "ASM state"
  If true proceed to process #6
  If false return to input #5
Process #6: submit "new" HABOD's to OLS 301 (FIG. 2)
Input #8: "ASM state" stored in AOVVS database
Process #7: Approved lender ("AL") accepts HABOD at OLS
  Deposit payment processed
Process #8: 'Accepted' and 'deposit receipted' HABOD routed to OAPM
  If 'set to valuation'=true, proceed to process 11
  If 'acceptable valuation range'=true, proceed to process #9
Process #9: execute VW and input valuation upon receipt
  If 'within valuation range'=true, proceed to process #11
  If 'within valuation range'=false, proceed to process #10
Process #10: Query borrower and lender for 'settlement to proceed at valuation outside of acceptable valuation range'
  If 'counterparty approval unanimous'=true, proceed to process #11
  If 'counterparty approval unanimous'=false, end
Process #11: execute legal settlement workflow
Input #9: settlement data input to AMS 400 by OAPM 300
Variation to the HA agreement between counterparties is described in the following paragraphs with reference to FIG. 25:
  Input #1: borrower or lender inputs variation request
  Process #1: check fields of entry valid
    If true proceed to next
    If false—return to input #1
  Input #2: AMS 400 transmits data to AOVVS 100
    If 'set to valuation'=true, proceed to process #3
    If 'Select proceed on estimate of value'=true, proceed to input #3
  Process #3: Valuation workflow ("VW") routed via electronic signal to valuation platform
  Input #3: enter 'acceptable valuation range', or results of VW (depending upon variable output of 'input #2')
  System state #2: all required fields populated with data required to generate proforma conversion and variation settlement statement ("PCVSS")
  Process #4: execute procedure "W/Yvcn/Zc/INSclose/Z/INS
    See further FIG. 14
    Procedure "W" may in this instance subordinate sub-procedures; procedure "$Y_{vcn}$" see further FIG. 16; procedure "$Z_c$" see further FIG. 18; procedure "$INS_{close}$" see further FIG. 27; procedure "Z" see further FIG. 17; procedure "INS" see further FIG. 22.
  Input #4: AOVVS 100 inputs data representing 'variation statement'("VS") to AMS 400 as well as pro form a HABOD for new HA agreement
  Process #5: VS and HABOD issued to borrower and lender for approval
    If 'lender and borrower approval'=true proceed to process #6
    If 'lender approval'=false, return to Input #1, or end
    If 'borrower approval'=false, return to Input #1, or End
  Process #6: 'accepted' variation and 'deposit receipted' HABOD processed at AMS 400
    If 'set to valuation'=true, proceed to process #9
    If 'acceptable valuation range'=true, proceed to process #7
  Process #7: execute VW and input valuation upon receipt
    If 'within valuation range'=true, proceed to process #9
    If 'within valuation range'=false, proceed to process #8
  Process #8: Query borrower and lender 'proceed at valuation outside of acceptable valuation range'
    If 'counterparty approval unanimous'=true, proceed to process #9
    If 'counterparty approval unanimous'=false, end
  Process #9: execute legal settlement workflow
  Process #10: execute procedure "U"
Monitoring (incorporating lender default management) will be described in the following paragraphs with reference to FIG. 21 and other figures as indicated:
  Input #1: upload electronic bank ledger report for TA 402 (FIG. 2) into PPS 401 (FIG. 2)
  Process #1: Query ledger report and 'match' with trust ledger in PPS 401
    'match' account names
    'match' account numbers
    'match' asset underlying
  Input #2: set 'ignore quarantined files'=true
  Process #2: 'match' PPS 401 required balance ("RB") with bank ledger report for TA 402
    If 'bank ledger report balance<RB'=true, proceed to process #3
    If 'bank ledger report balance<RB'=false, proceed to process #4
  Process #3: Query PPS 401 reserve monies balance ("RMB")
    If 'RMB>minimum closure costs'=true, proceed to process #5
    If 'RMB>minimum closure'costs'=false, proceed to process #6
  Process #4: expedite IP and OP
    IP payment to borrower (FIG. 3a-FIG. 11)
    OP payment to HAC 60 (FIG. 3a-FIG. 11)
  Process #5: expedite IP and OP and execute procedure D2
  Process #6: execute procedure Zc
Procedure D2 is described in the following paragraphs with reference to FIG. 20:
  For T=0
  Input #1: data input received from PPS 401 into quarantine database ("QD")

Process #1: extract data particular to each HAA
  Declare: tender default consultation period ("LDCP")= T0+8n (where n is period length for a particular HA agreement)
Process #2: extract data particular to each HAA
  Declare: next IP payment due to borrower ("IPD")=T0+ 4n (where n is period length for a particular HA agreement)
Process #3: extract data particular to each HAA
  Declare: reserve monies recuperation period ("RMRP")=T0+Xn (where n is period length for a particular HA agreement and X is disclosed in each-particular HA agreement)
Process #4: extract data particular to each HAA
  If 'insurance policy'=true, notify insurer
Process #5: execute lender default workflow ("LDW")
  Default recovery notice to lender.
For T=0+1n . . . 4n
Input #2: Upload trust account bank ledger report ("TABLR")
Process #6: Query TABLR for records matching QD
  If 'TABLR lender balance<RB & T<0+4n'=true, proceed to Process #7
  If 'TABLR lender balance<RB & T>=0+4n'=true proceed to Process #8
  If TABLR lender balance>=RB, proceed to process #9
Process #7: execute lender default workflow ("LOW")
  Default recovery notice to lender
Process #8: execute procedure: W/Y/$Z_D$, then proceed to process #10
Process #9: remove record from QD and restore record status at AMS 400/PPS 401
Process #10: execute LDW: revised OP
  Issue default recovery notice to lender stating revised OP sum inclusive of reserve monies premium ("RMP")
Process #11: execute quarantine report ("QR")
  Generate and archive quarantine report at location: ASM/$AD_n$/$HAA_n$
For T=0+8n
Input #3: upload TABLR
Process #12: Query TABLR for records matching QD
  If 'TABLR lender balance<$RB_i$ & T>=0+8n'=true, proceed to process #13
  If 'TABLR lender balance>=$RB_i$ & T<T0+Xn'=true, proceed to process #14
  If 'TABLR lender balance >=$RB_i$ & T>=T0+Xn'=true, proceed to process #15
Process #13: execute valuation workflow ("VW")
Process #14: execute 'do until' loop containing process #12 as Do
  Loop until 'TABLR>=$RB_i$ & T>=T0+Xn'=true, proceed to process #15
Process #15: remove record from QD and restore record status at AMS 400/PPS 401
Process #18: execute procedure W/Y/$Z_c$
Input #4: conversion statement input to AMS 400 by AOVVS 100 at completion of process #16
Process #17: execute quarantine report ("QR")
  Generate and archive quarantine report at location: ASM/$AD_n$/$HAA_n$
Process #18: if 'insurance policy'=true, inform insurer
Process #19: Query to BD and CD (via AOVVS) if new HABOD required.
Procedure "X" is described in the following paragraphs with reference to FIG. 13 and other figures as indicated:
Input #1: data input to ASM from AMS 400 or AOVVS 100
Process #1: execute head procedure from 'ASM input screen' with subordinate processes #2 to #11 below
Process #2: 'select' AD1
Process #3: execute procedure "Y" from AD1
  See further FIG. 15
  Procedure "Y" in this instance subordinates sub-procedures;
    Procedure "Z" see further FIG. 17; procedure "INS" see further FIG. 22
Input #2: AD1 returns data to ASM database
Process #4: 'select' AD2
Process #5: execute procedure "Y" from AD2
  See further FIG. 15
  Procedure "Y" in this instance subordinates sub-procedures;
    Procedure "Z" see further FIG. 17; procedure "INS" see further FIG. 22
Input #3: AD2 returns data to ASM database
Process #8: 'select' ADn
Process #7: execute procedure "Y" from ADn
  See further FIG. 15
  Procedure "Y" in this instance subordinates sub-procedures;
    procedure "Z" see further FIG. 17; procedure "INS" see further FIG. 22
System state #1: 'display' asset state at ASM output interface for user acceptance (viewed at AMS or AOVVS)
  'user acceptance'=true and 'new HABOD'=true proceed to process #8
  'user acceptance'=true and 'variation to existing HA'=true proceed to process #9
  'user acceptance'=false; proceed to process #11
Process #8: submit "new" HABOD to OLS 301 (FIG. 24)
Process #9: submit "variation" HA to AMS 400 (FIG. 2)
Process #10: "ASM state" stored in AOVVS database (FIG. 2)
Process #11: enter alternative data at user interface (viewed at AMS or AOVVS)
Note: Some combinations of procedures beginning with procedure X:

| | | | | |
|---|---|---|---|---|
| 1. | X→ | Y→ | Z→ | INS |
| 2. | X→ | Y→ | $Z_c$→ | $INS_{close}$ |

Figure 14:
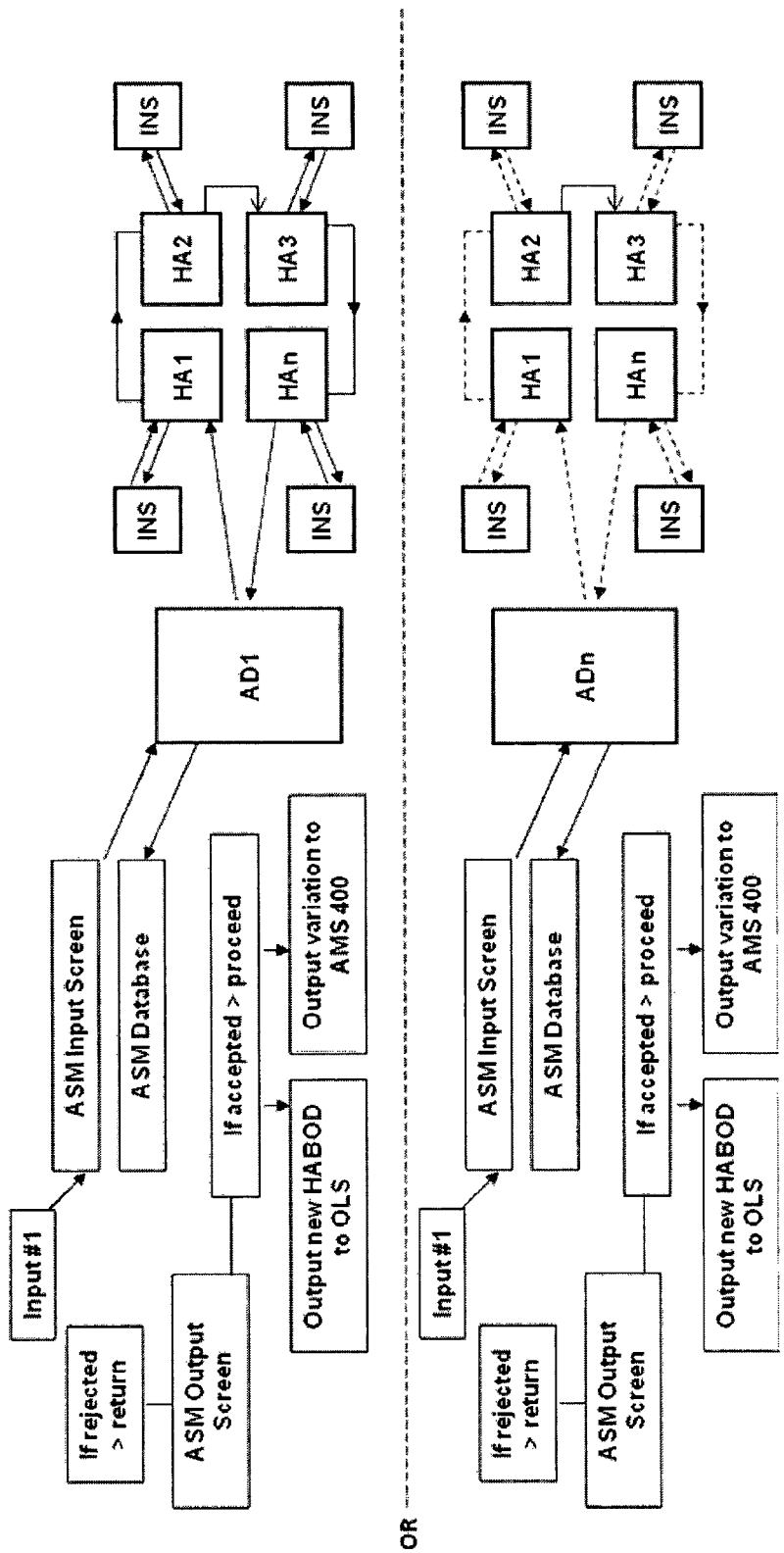
FIG. 14 is a schematic flow chart representing procedure W which takes place predominately within AOVVS 100 and PM 101 (FIG. 2) but with close interaction and feed forward and feed back electronic communication with other elements of the overall combined system 500 of the present invention.

Procedure W is described in the following paragraphs with reference to FIG. 14:
Input #1: data input to ASM from AMS 400 or AOVVS 100
Process #1: execute head procedure from 'ASM input screen' with subordinate processes and inputs below
Process #2: 'select' AD1 . . . n
Process #3: execute procedures "Y", "$Y_{vcn}$"; and subordinate procedures "Z", "$Z_c$", "$Z_d$", INS, $INS_{close}$ from AD1 . . . n
Input #2: AD1 . . . n returns data to ASM database
Note: Some combinations of procedures commencing with procedure W:

| | | | | |
|---|---|---|---|---|
| 1. | W→ | Y→ | Z→ | INS |
| 2. | W→ | Y→ | $Z_c$→ | $INS_{close}$ |
| 3. | W→ | Y→ | $Z_d$→ | $INS_{close}$ |
| 4. | W→ | $Y_{vcn}$→ | $Z_c$→ | $INS_{close}$ |
| 5. | W→ | $Y_{vcn}$→ | Z→ | $INS_{close}$ |
| 6. | W→ | $Y_{vcn}$→ | $Z_c$→ | $INS_{close}$ |

Figure 15:
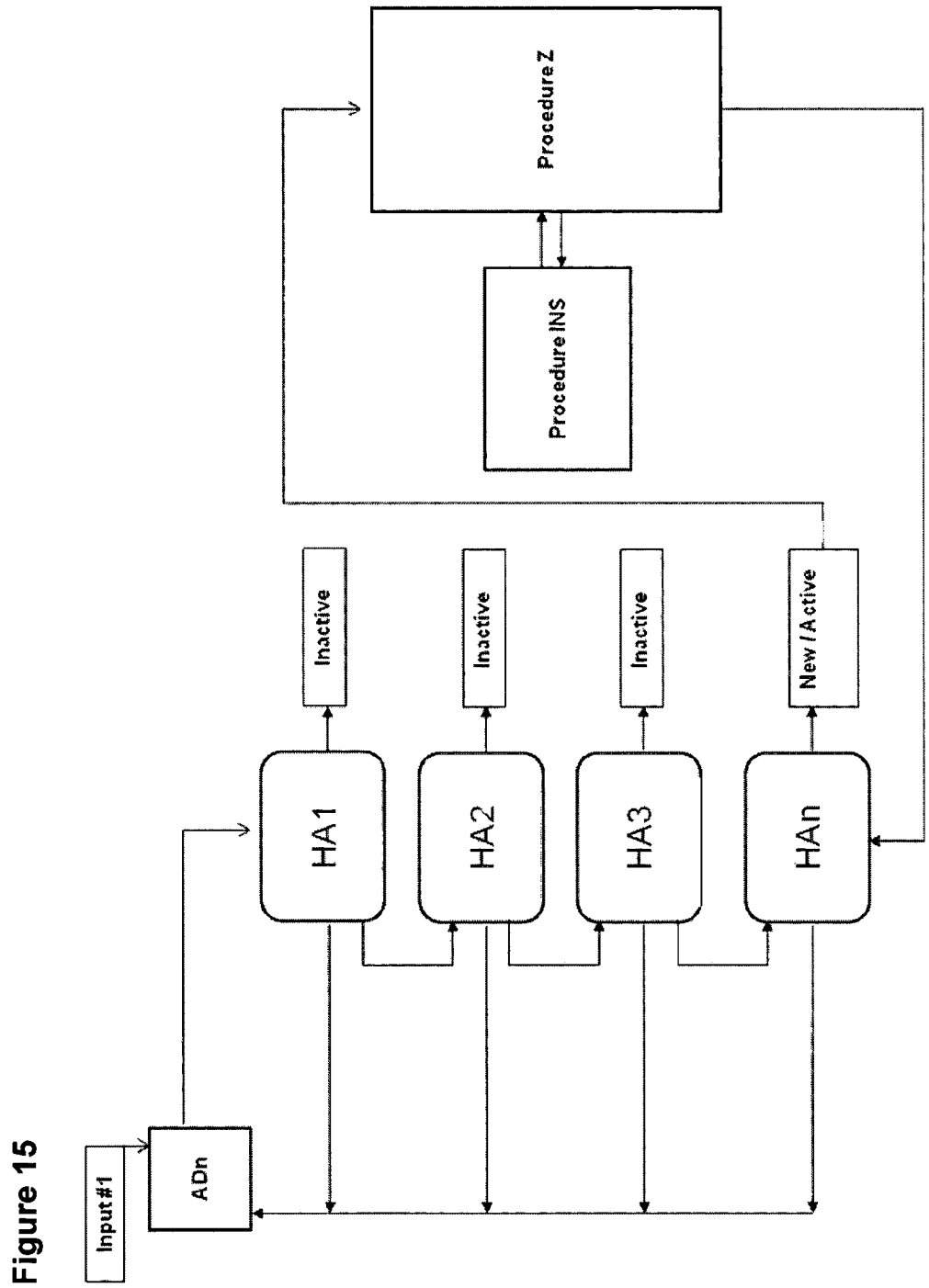
FIG. 15 is a schematic flow chart representing procedure Y which takes place predominately within AOVVS 100 and PM 101 (FIG. 2) and is a subordinate procedure to procedure W or procedure X.
Figure 19:
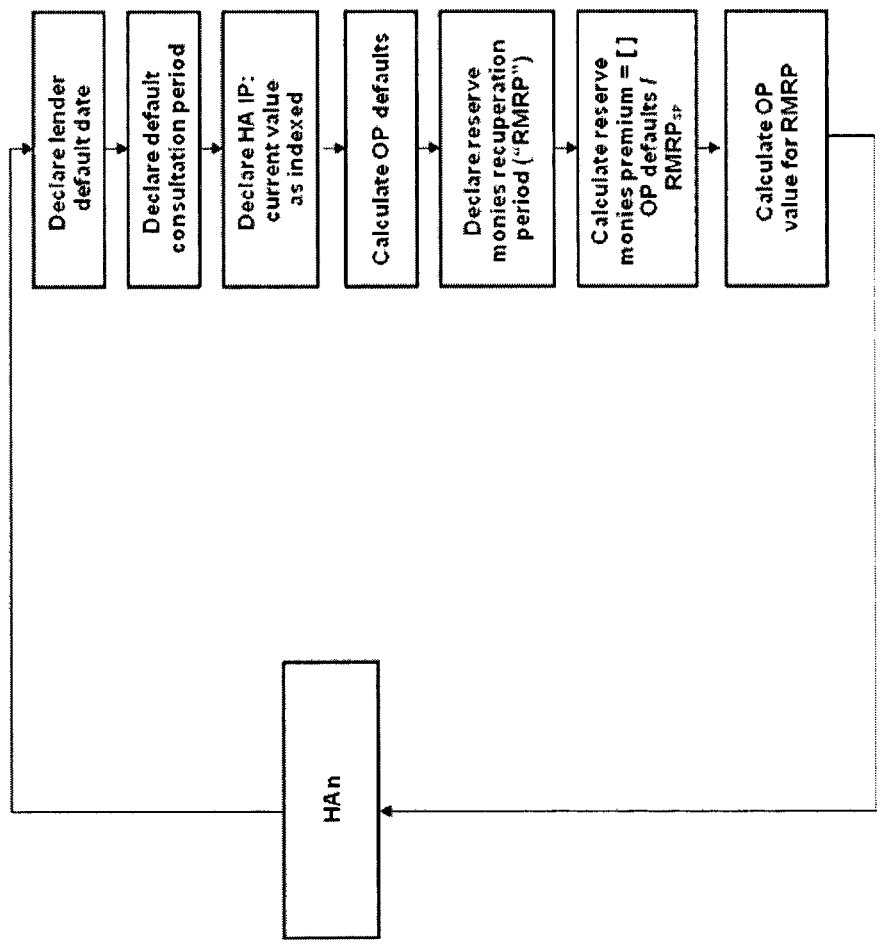
FIG. 19 is a schematic flow chart representing procedure Zd which is executed predominately from within AOVVS 100 and PM 101 (FIG. 2) and is a subordinate procedure to procedure Y or procedure Yvcn.
Figure 23:
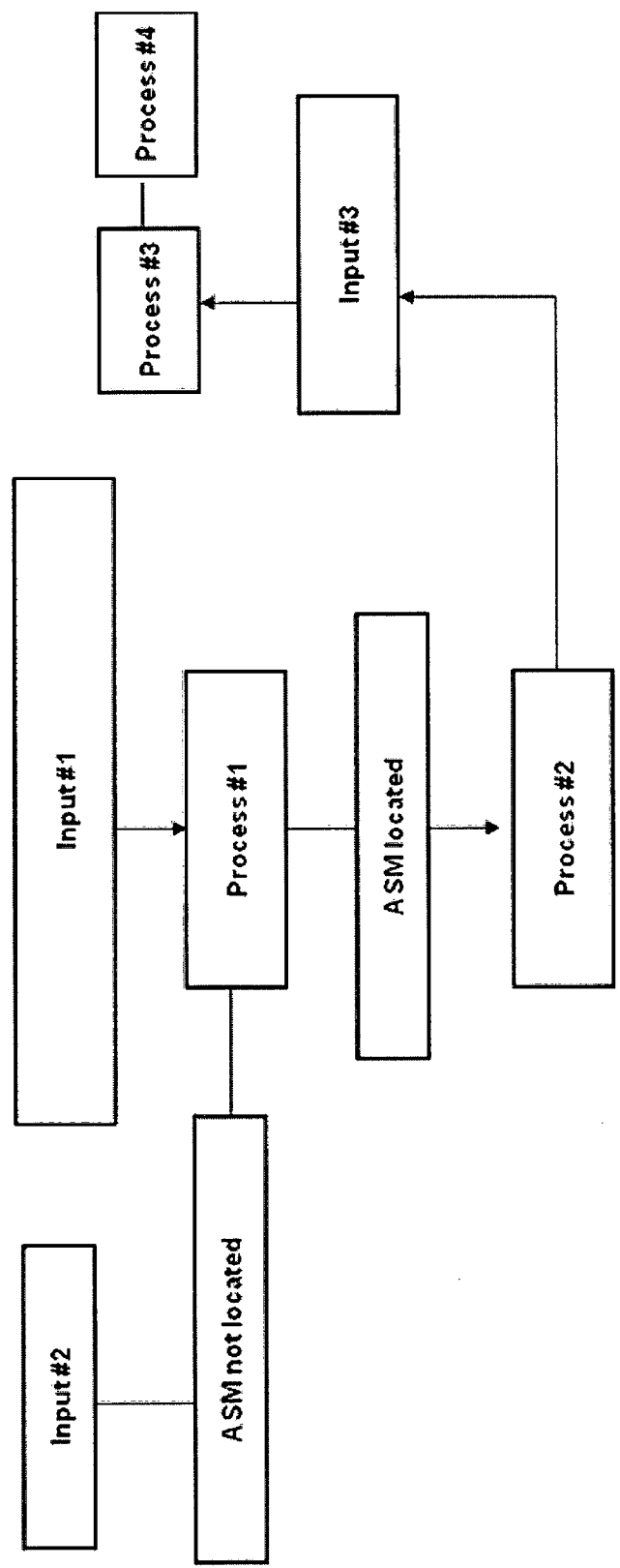
FIG. 23 is a schematic flow chart representing procedure U which is executed predominately from within AMS 400 in close electronic communication with the overall combined system 500 (FIG. 2)

Procedure Y is described in the following paragraphs with reference to FIG. 15:
Input #1: data input to ADn from asset summary module (ASM)
Process #1: evaluate HA1
  if 'active'=true, proceed to process #5
  if 'active'=false, proceed to process #2 and process #6
Process #2: evaluation HA2
  if 'active'=true, proceed to process #5
  if 'active'=false, proceed to process #3 and process #6
Process #3: evaluation HA3
  if 'active'=true, proceed to process #5
  if 'active'=false, proceed to process #4 and process #6
Process #4: evaluation HAn
  if 'active'=true, proceed to process #5
  if 'active'=false, proceed to process #6
Process #5: execute procedure "Z", "$Z_c$", "$Z_d$", then proceed to process #7
  See further FIG. 17, 18, 19
  Procedure "Z" in this instance can subordinate sub-procedures;
    procedure "INS", "$INS_{close}$" see further FIGS. 22 & 27
Process #6: return data on status of HA to ADn
Process #7: return HABOD data to ADn
Procedure $Y_{vcn}$ is described in the following paragraphs with reference to FIG. 16:
Input #1: data input to ADn from asset summary module ("ASM")
Process #1: evaluate HA1
  if 'active'=true, proceed to process #5
  if 'active'=false, proceed to process #2 and process #8
Process #2: evaluation HA2
  if 'active'=true, proceed to process #5
  if 'active'=false, proceed to process #3 and process #8
Process #3: evaluation HA3
  if 'active'=true, proceed to process #5
  if 'active'=false, proceed to process #4 and process #8
Process #4: evaluation HA4
  if 'active'=true, proceed to process #5
  if 'active'=false, proceed to process #8
Process #5: execute procedure "$Z_c$", then proceed to process #6
  See further FIG. 18
  Procedure "$Z_c$" in this instance subordinates sub-procedures;
    procedure "$INS_{close}$" see further FIG. 27
Process #6: evaluate HA$_n$
  if 'new/active'=true, proceed to process #7
  if 'new/active'=false, proceed to process #8
Process #7: execute procedure "Z"
  See further FIG. 17
  Procedure "Z" in this instance subordinates sub-procedures;
    procedure "INS" see further FIG. 22
Process #8: return data on status of HA to AD$_n$
Process #9: return HABOD data to AD$_n$
Input #2: data output from HA's received into AD$_n$
Procedure Z is described in the following paragraphs with reference to FIG. 17:
Input #1: data input received into new/active HAA module from ADn
Process #1: Declare embodiment
Process #2: Declare mandatory redemption criteria (MRC)
Process #3: Calculate asset division value at time=0 ($ADV_0$)
Process #4: Calculate MRC coefficient
Process #5: Calculate transaction costs (TCs)
Process #6: Calculate transaction base (TB)
Process #7: expedite optimisation algorithm (OA)
  Declare: objective, variables, constraints
Process #8: Optimise IP
  If 'insurance'=true, proceed to process #9
  If 'insurance'=false, proceed to process #10
Process #9: execute procedure "INS"
Process #10: calculate OP commencement value
Process #11: generate outputs for HABOD
Input #2: data input received into new/active HA module and subsequently output to ADn
Procedure Zc is described in the following paragraphs with reference to FIG. 18:
Input #1: data input received into active HAn module from ADn
Process #1: Declare conversion date
Process #2: Declare mandatory redemption criteria (MRC)
Process #3: Calculate horizon gain allocation value (HGAV)
Process #4: Calculate qualifying outgoings value (HGV)
Process #5: Calculate premium or deduction from either borrower or lender
Process #6: Calculate asset division value at time=n ($ADV_n$)
Process #7: Declare 'insurance setting'
  If 'insurance setting'=true, proceed to process #8
  If 'insurance setting'=false, proceed to process #9
Process #8: execute procedure $INS_{close}$
Process #9: calculate conversion value: CGAMM to CGFM
Input #2: data input received into $H_{an}$
Procedure $Z_d$ is described in the following paragraphs with reference to FIG. 19:
Input #1: data input received into active HAn module from ADn
Process #1: Declare lender default date (LDD)
Process #2: Declare default consultation period (DCP)
Process #3: Declare HA, IP: current value (as indexed)
Process #4: Calculate OP defaults (OPD)(number OP payments missed)
Process #5: Declare reserve monies recuperation period (RMRP)
Process #6: Calculate reserve monies premium (RMP) =OPD/$RMRP_{sub\ period}$
Process #7: Calculate OP for RMRP
Input #2: data input received into HAn
Procedure INS is described in the following paragraphs with reference to FIG. 22:
Input #1: Input received from procedure Z
  If 'insurance available'=true, proceed to process #1
  If 'insurance available'=false, proceed to Input #2
Process #1: calculate premium
  Premium=function (IP, MRC, AV, ADV, probability early redemption, probability late redemption)
Input #2: data input to procedure Z
  No premium
  Insurance not available
Input #3: data input to procedure Z
  Amount of premium
  Insurance available
Procedure U is described in the following paragraphs with reference to FIG. 23:
Input #1: data input from legal settlement provider to AMS 400
Process #1: match input data with existing HA file within ASM
  If 'ASM matched'=true, proceed to process #2
  If 'ASM matched'=false, proceed to Input #2

Process #2: HA data at ASM updated with data input from legal settlement provider
Input #2: data input from legal settlement provider quarantined in 'unallocated' database at AMS 400 and 'unallocated input' workflow executed
Input #3: post update status of ASM data, input to AMS 400 and monitoring rules disseminated to PPS 401
Process #3: confirmation of completed variation transmitted to borrower, lender (both assignee and assignor where relevant)

Figure 26:
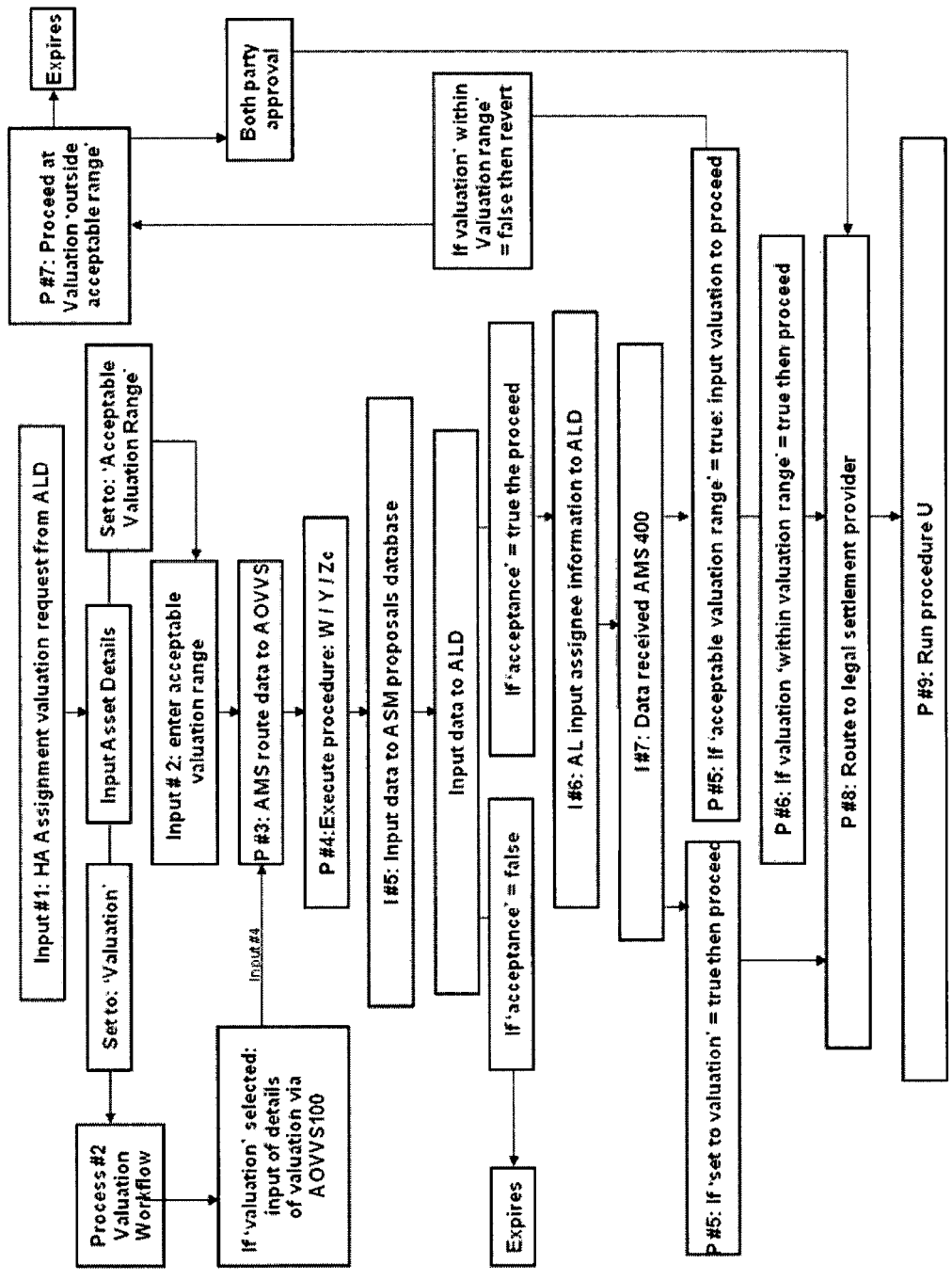
FIG. 26 is a schematic flow chart representing procedures for assignment of multiple agreements of the present invention in a secondary market, which are executed throughout the overall combined system 500 (FIG. 2)
Figure 27:
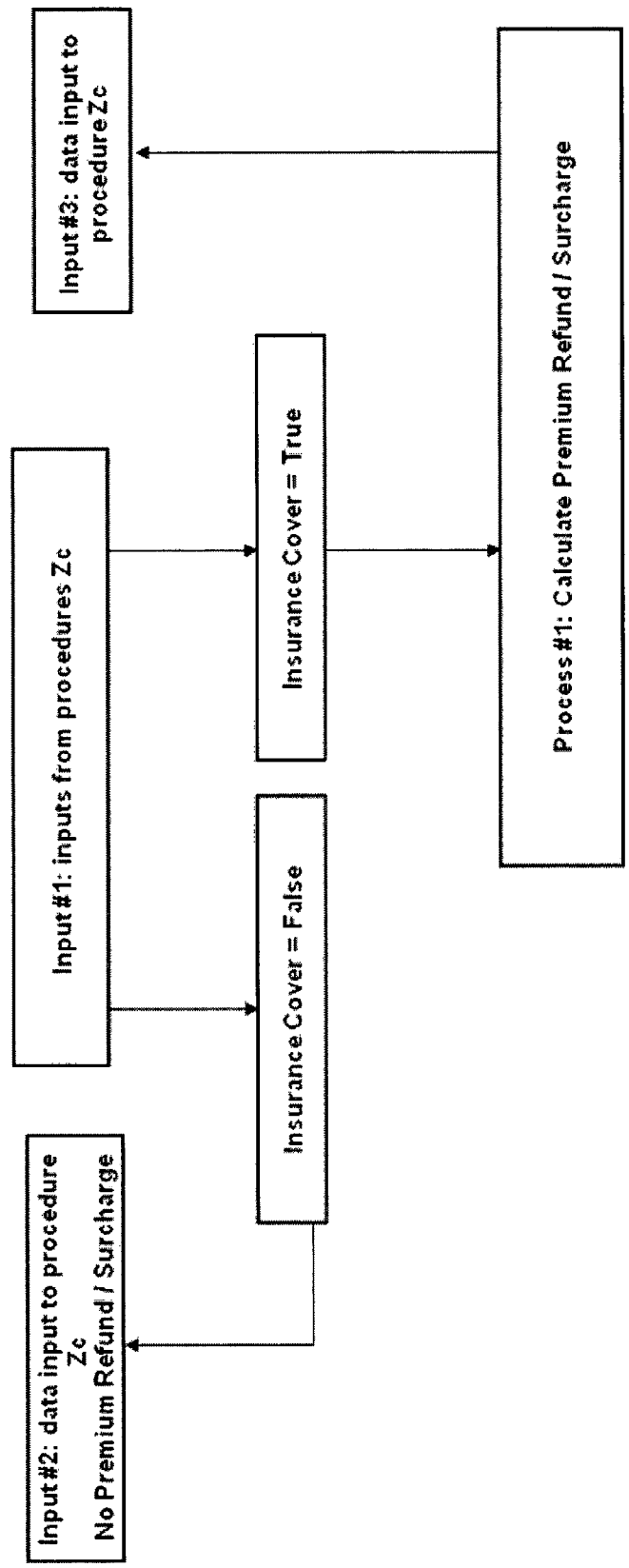
FIG. 27 is a schematic flow chart representing procedure INSclose which is executed predominately from within AOVVS 100 and PM 101 (FIG. 2) and is a subordinate procedure to procedure Z, procedure ZC, or procedure Zd.

Procedure $INS_{close}$ is described in the following paragraphs with reference to FIG. 27:
Input #1: Input received from Procedure 4
  If 'Insurance cover'=true, proceed to process #1
  If 'insurance cover'=false, proceed to input #2
Process #1: calculate premium refund or premium surcharge
Input #2: data Input to procedure Zc
  No insurance cover
  No premium or surcharge applicable
Input #3: data input to procedure $Z_c$
  Amount of premium refund or premium surcharge Assignment of a HA agreement by a lender is described in the following paragraphs with reference to FIG. 26:
Input #1: borrower makes assignment valuation request (AVR)
Process #1: check fields of entry
  If 'set to valuation'=true, proceed to process #2 and input #4
  If 'Select proceed on estimate of value'=true, proceed to input #2
Process #2: Valuation workflow (VW) routed via electronic signal to valuation platform
Input #2: enter 'acceptable valuation range'
Process #3: AMS 400 transmits data to AOVVS 100
Input #4: Input valuation workflow outcome if system set to 'valuation' at input #1 and Process #1 above
System state #2: all required fields populated with data required to generate assignment valuation statement (AVS)
Process #4: execute procedure "W/Y/Zc"
  See further FIG. 14
  Procedure "W" may in this instance subordinate sub-procedures;
    procedure "Y" see further FIG. 15; procedure "$Z_c$" see further FIG. 18
Input #5: Input assignment valuation statement into ASM (FIG. 2) proposals database
Input #6: Input AVS to ALD (FIG. 2)
  If lender assignment offer accepted by assignee=false, then AVS expires after prescribed time
  If lender assignment offer accepted by assignee=true, then proceed to input #7
Input #7: Input details of assignee lender and proposed assignment terms at AMS 400
Process #5: evaluate proposed assignment terms against system settings
  If 'set to valuation'=true (as set at input #1 above), then proceed to process #7
  If 'acceptable valuation range'=true (as set at input #1 above) then proceed to process #6
Process #6: execute VW and input valuation upon receipt
  If 'within valuation range'=true, proceed to process #8
  If 'within valuation range'=false, proceed to process #7
Process #7: Query borrower and lender 'proceed at valuation outside of acceptable valuation range'
  If 'counterparty approval unanimous'=true, proceed to process #8
  If 'counterparty approval unanimous'=false, end
Process #8: execute legal settlement workflow
Process #9: execute procedure "U".

Specific modules according to one embodiment of the invention are described in the following paragraphs and with reference to FIG. 2:

1. The "Lender Origination Approval Module" 200

Applications for registration as a prequalified lender are received at the "lender origination approval module" (LOAM) 200 only if they are in the required form, that is, required fields of information are satisfactorily completed. Applications received are then processed and where a lender is accepted for registration, LOAM 200 registers them to one or more registered lender categories within the "lender database" (LD) 201 which simultaneously provides them with access to specified listing categories within OLS 301.

2. The "Offer and Acceptance Processing Module" 300

All home annuation offer documents, once accepted by a registered lender via OLS 301, migrate to the "offer and acceptance processing module" (OAPM) 300 where various workflows integral to the OAPM 300 engage external service providers to perform such legal and valuation tasks and integrates stored information such as title searches and valuations where commissioned or supplied by borrowers at an earlier stage; all as are required to proceed to settlement of the home annuation agreement. The processes carried out in OAPM 300 involve methods that prepare the "agreement monitoring system" (AMS) 400 to accept the relevant data in relation to each particular home annuation agreement. Once settlement is achieved by OAPM 300, all data in relation to the home annuation agreement is transferred to the AMS 400. Only digital records that evidence the date of commencement, progress and completion up to settlement of each HA are stored within OAPM 300 as it has a primary processing application. The overall "combined system" (CS) 500 is not set by default to process, manage and pay ongoing commissions to consultants in accordance with the superior ethical and moral standards by which it is commissioned. Notwithstanding, should it be deemed by the SO that a particular embodiment requiring such commissions to be paid is within the ethical and moral standards set for the CS 500 then this setting can be activated by selection of a toggle within the programme. By default any remuneration paid by the CS 500 is on a flat fee for service basis or event driven basis and no percentage based commissions are hard programmed into the CS 500.

3. The "Agreement Monitoring System" 400

Digital representations transferred from the OAPM 300 are uploaded within the AMS 400, as an active home annuation agreement. Thereafter, the AMS 400 monitors the agreements under oversight of the SO. The AMS 400 further disseminates data into databases and sub-systems which are integrated to operate together in order to monitor the home annuation agreements and implement predetermined workflows where toggles within the workflows are activated. On a monthly, or other regular basis as prescribed in each particular HA agreement the "payment processing system" (PPS) 401 monitors each lender registered on the "active lender database" (ALD) 405 for compliance with his ongoing payment obligations (including "ongoing payment" contributions) as well as compliance with other terms and conditions of his home annuation agreement/(s). The PPS 401 utilizes the "trust account" (TA) 402 as a tool for processing cash flows under each HA agreement and advancing ongoing principal payments to a borrower under each particular HA agreement. The AMS 400 detects the operation of conditions precedent to variation of the HA agreements and sets in motion predetermined workflows in response to each event, in most cases requesting via digital signal, calculations from the AOVVS 100.

It will be appreciated that each element of the "combined system" 500 is integrated and capable of working with one another on a multi-directional basis, and that the individual elements can also be deployed on a stand-alone basis which effectively enables the present invention to be operated in part or be built upon in further modules. In its present configuration, the "combined system" 500 is unique in comparison to prior art technologies and data processing structures within its field of invention, as without limitation:

On a first account, it provides a method and platform for consumers to provide lending services to one another, combining free leverage with capital guarantee and return secured by way of mortgage over real assets; and for a borrower it is the first such invention that accurately calculates and administers agreements which comprise an ongoing principal (IP) which, in various embodiments, transpires to a zero interest rate and borrowers cost of finance which is dependent upon not just asset appreciation but also their cumulative level of ongoing principal borrowed which accrues as a function of time and thereby weights lender returns (or borrowers cost of finance) by time as well as asset appreciation (or state of asset value).

Secondly, the combined system 500 combines origination, processing, management and monitoring systems capable of generating and administering financing arrangements that are fundamentally different to prior art financing arrangements. In one embodiment of the present invention, investors such as pension funds and superannuation funds (including smsf's) have the option of self selection upon the assets in which they invest and therefore the option of operating their own internal diversification and pooling systems combined with a capital guarantee upon all amounts lent and costs directly attributable to such lending (i.e. qualifying outgoings) secured directly upon real assets. In other words, access to the potential capital growth of real assets on a debt free leverage basis without the cost of, or exposure to, existing prior art mortgage origination and securitisation systems. Similar embodiments further enable institutional investors, consumers, or other investor entities, to assign their interests in home annuation agreements to other entities. It will be appreciated that the application of home annuation is not restricted to residential dwellings, as may be implied from the reference to "home", but may equally be applied to any real asset or other asset classes (such as equities) that may reasonably be expected to increase in value from time to time. It will be readily apparent to the person skilled in the art that this 'home annuation' embodiment of the invention can be adapted for the same or similar systems which may be known by terms such as 'estate annuation', 'land annuation', 'life annuation' or 'equity annuation'.

Thirdly, the present invention is the first system (excluding superannuation contributions and pension contributions by way of taxation) of data processing structures and methods to comprise a reversal of prior art financial industry to consumer lending systems; whereby, with CS 500 the financial institutions can borrow from the consumer such that the cost of capital is not linked to interest rates (or "interests worth") but rather the capital appreciation rates of the underlying real asset over which the consumers (lenders) qualifying outgoings are secured. In this embodiment, which finds particular application in intergenerational pension and affordable housing systems, institutions (or otherwise) can effectively borrow an inflation linked (or other indexing measure) cash flow secured over assets; quite the reverse to issuing inflation linked bonds which expose the issuer to inflation. Furthering this example, consumers or other investors entering into home annuation with Government, affordable housing funds, pension or other type funds, make payments on a regular basis that are indexed to a measure such as inflation (or house price index, or value of a particular asset) which are in turn secured by way of home annuation over an asset which has proven to be an effective hedge to inflation and where the payments are indexed to a house price index (or the agreement asset), they are secured over the indexing measure itself. Thereby, the horizon gain, free leverage and capital guarantee mechanisms within home annuation align the consumers (investors) wealth generation with the underlying indexation measure, effectively hedging their exposure to same. Rather than consumers relying upon Government guarantees over their deposits held with financial entities, consumer monies lent directly to financial institutions (or affordable housing funds, Government and the like) will be directly secured by way of mortgage over real assets, with access to the potential capital returns upon said assets on a free leverage and capital guaranteed basis with said home annuation agreements monitored by the "combined system" 500 custodian. In one embodiment, this finds particular application to an intergenerational asset backed pension system.

Fourthly, for life insurers who carry mortality risk in conjunction with the policies they issue, the combined system 500 comprises the systems, technologies and data processing capabilities to 'on-lend' the premiums they receive for holding mortality risk (into home annuation agreements where "mandatory redemption criteria" includes "life expiry") and thereby hedge their mortality risk with life extension risk without the need for direct ownership of viagers or securitised units in pools of same.

On a fifth account, the combined system 500 enables a heterogeneous property derivative comprising inbuilt "capital guarantee" and "free leverage" (if so constructed), capable of being traded at a single asset level, or "asset division" level thereof and capable of being pooled by, for example, Street or Suburb.

Description of Individual Aspects

Individual aspects of one embodiment of the present invention are described in the following paragraphs:

1. Ongoing Principal

Unique to one or more embodiments of the present invention is the ongoing principal that is generated by the combined system 500 described above. The AOVVS 100 in conjunction with PM 101 can divide the borrowers real asset into one, two, or more parts and then based, amongst other inputs, upon; the asset division value; proportional division size; and horizon gain allocations for each division, calculate an ongoing principal to be paid by a lender to a borrower.

An ongoing principal can comprise an amount to be paid on an ongoing basis or combination of an upfront lump sum payment and ongoing payment amount. In return for making the ongoing principal payments to the borrower on a, zero-interest basis the lender receives upon redemption by the borrower, in one embodiment; either the repayment of his qualifying outgoings; or payment equal to his percentage share of horizon gain, whichever is the greater.

It will be appreciated that a lenders "return" from home annuation is entirely unique and in contrast to existing prior art systems where a lenders return can be either time-dependent interest, or in the case of shared appreciation/depreciation systems a form of 'interests worth' that can be calculated ahead of time as a percentage of the principal sum for every potential dollar increase or decrease in the real asset value over which it is secured. Home annuation is by contrast a fluid agreement between lender and borrower in which the cumulative balance of ongoing principal changes on a regular basis as prescribed in each particular home annuation agreement but may typically adjust incrementally on a monthly basis. It will be further appreciated therefore that home annuation is uniquely free from both interest and "interests-worth" and presents a uniquely dynamic relationship between; the ever changing cumulative balance of ongoing principal (and infect each payment of IP itself where indexation is applied); the asset value; and furthermore the complexities of the "greater of" treatment of qualifying outgoings and horizon gain share. For example, it is of course possible to take a series of estimates upon the monthly cumulative balance of ongoing principal paid up to a point in time (although a guess would be required upon the future indexation rates and indexation measure used) and for every month generate an array of possible asset values in order to derive an expected rate of return for the lender (e.g. "interests worth"). However, depending upon the timing of any potential asset appreciation in combination with the "greater of" treatment of qualifying outgoings and horizon gain; a lenders repayment may not be a direct function of the asset value. If, within the first five years of a home annuation agreement there is significant asset appreciation, a lenders repayment may be based upon his percentage share of horizon gain. Asset appreciation may decline over the next 3 years so that in year eight a lender would be glad to receive a repayment of his qualifying outgoings. Notwithstanding, an acceleration in asset appreciation may result in a lenders pay-out in year fifteen being entirely based once again upon horizon gain share. The possibility that a borrower will not pay any interest or "interest's worth" where the asset over which the agreement is secured has appreciated, is entirely unique to home annuation. Prior art shared appreciation/depreciation mortgage systems always require that the principal is repaid in addition to any percentage share of appreciation in the asset value to which the lender is entitled. Due to home annuation's ongoing principal and "greater of" repayment rules it is the first disclosed loan system in the world that can be truly classified as free of interest or "interests worth" where a lenders returns are dependent upon appreciation in the underlying asset value. It will be appreciated that in suitable embodiments, variations of the "greater of" rule are possible so that, by way of non-limiting example; horizon gain share is subject to a further factor/(s) in calculation of its monetary value. This may be included within the original offer document and linked to measures such as levels of house price inflation in order that excessive lender gains as a result of excessive house price inflation can be regulated. In other variations additional factor/(s) applied to qualifying outgoings and capital guarantee calculations are included within the agreement so that, by way of non-limiting example; capital guarantee upon qualifying outgoings may be limited to the value of horizon gain accrued in the asset division (or lender share thereof), which can be a particularly useful mechanism where home annuation is used in conjunction with prior art debt finance.

2. Horizon Gain Share and Capital Guarantee

In one embodiment of the methods and systems used to determine the present inventions unique arrangement between lender and borrower the "combined system" 500 generates a home annuation offer document which states terms on which the borrowers offer can be accepted, including but not limited to:

(a) the starting value of the ongoing principal as well as the value of an up-front lump sum payment required where the borrower has' requested such;

(b) the percentage proportion of total asset applied to this transaction (i.e. division size as a percentage of whole asset);

(c) details of total asset value, size, description and photos (where available);

(d) details upon total number of divisions created in the asset, as well as number of current HA agreements (or other mortgages/charges) and respective divisions over which they are secured; or otherwise expressed, as the value of caps placed upon other superior, equally ranked or subordinate mortgages secured upon the asset;

(e) the percentage horizon gain share allocated to lender and borrower;

(f) corresponding depth (e.g. value) of capital guarantee provided and ratio for subsequent adjustment in relation to changes in the value of the agreement asset where applicable;

(g) "transaction base" for purpose of subsequent horizon gain calculations;

(h) methods and mechanisms for calculating capital guarantees and horizon gain share particular to each agreement.

(i) mandatory redemption criteria

In one embodiment, the 'combined system' 500 generates and administers agreements where a lender (e.g. saver, or investor as he may be otherwise known in various embodiments of the present invention) receives a capital assurance upon all qualifying outgoings (as previously defined) to the extent expressed in the home annuation offer document, the extent of which is usually calculated by multiplying: the lenders horizon gain share allocation by the "division value" of the asset over which the agreement is secured. For sake of clarity, the "division value" is calculated by multiplying the total asset value by the percentage proportion of an asset applied to a particular HA agreement.

The capital guarantee is steadfast even in the event of saver (investor/lender) default upon his obligations under the agreement, including default upon payment of the ongoing principal. In one embodiment of the present invention, this provides an excellent mechanism for retirement saving as the saver (investor/lender) is entitled to a percentage share of horizon gain whilst at the same time protected by a capital assurance upon all of his qualifying outgoings. These systems, methods and technologies that enable a combination of exposure to real asset values and a capital guarantee upon all qualifying outgoings, made available at a consumer level (or otherwise) and combining to provide debt free leveraged returns with a capital guarantee, are unique to the present invention on a universal level.

Upon receipt of the required input data, the PM 101 in conjunction with AOVVS 100, can in one embodiment generate home annuation offer documents for each of the divisions created in an asset using horizon gain share allocations of between zero percent and 100%. The value of the ongoing principal at settlement is directly affected by the horizon gain share allocations selected within an "asset division" and it follows that a HG share allocation equal to zero percent (always quoted in favour of the lender) will result in PM 101 generating an ongoing principal equal to zero and a corresponding capital guarantee (using the formula expressed above) equal to zero. Notwithstanding, a separate division of the same asset could have a HG share allocation of eighty percent, in which case PM 101 will generate a value for the capital guarantee at settlement equal to eighty percent of the divisional asset value, and a corresponding value for the ongoing principal to be applied from settlement onwards. It will be appreciated that whilst the relationship between horizon gain share, capital guarantee and ongoing principal is expressed herein as linear to aid in explanation, various embodiments of the present invention herein disclosed may comprise relationships between horizon gain share, capital guarantee and ongoing principal that are exponential or otherwise, A lenders horizon gain share can be subject to caps, floors, proportioning and the like in certain embodiments of the present invention. The combined system 500 will process, calculate and output new or variation data according to the instructions contained within the input data. Therefore, calculations performed in relation to redemption values or conversion values (in event of lender default) may include various allowances for caps, floors, proportioning and the like; as were programmed into the individual architecture of each home annuation agreement when the PM 101 and AOVVS 100 generated the borrowers home annuation offer document.

Other embodiments, or variations to embodiments, of the present invention will comprise variations to the 'all-or-nothing' treatment of horizon gain in respect of the "greater of" rule in determining whether the lender pay-out is a repayment of qualifying outgoings or the horizon gain share to which they are entitled. (see formula expressed below)

Another variation to the treatment of horizon gain, in particular where a lender is in default upon one or more aspects of an agreement that would in one embodiment of the 'combined system' 500 settings result in total loss of rights to horizon gain share, is to apply a predetermined factor to reductions in horizon gain share. This enables lenders, whose all monies mortgage is converted to a fixed value mortgage in the event of default upon their ongoing payment obligations (or breach of other warranty, term or condition that constitute default) to be credited with a proportion of the horizon gain share they may have accrued under their home annuation agreement prior to default. This can be expressed as:

$$HGAVfd = (Vf - Tb)(HGA \times HGdp)$$

where:
HGAVfd=horizon gain allocation value as adjusted by predetermined factor (prior to applying 'greater of' rule)
Vf=asset valuation at default date
Tb=transaction base valuation
HGA=horizon gain share (as per home annuation agreement)
HGdp=horizon gain default proportioning Certain embodiments of the present invention settings may be secured over assets where superior forms of security are in place; or in fact, a home annuation agreement may be issued in conjunction with interest bearing or prior art shared appreciation mortgage loans. In these embodiments, the combined system 500 calculates caps to be place upon priority security by way of priority agreement before settlement of the home annuation agreement as well as caps to the capital guarantee provided by the borrower to the lenders under a home annuation agreement, where QO's are not covered by HG.

The present inventions novel "greater of" redemption rules with respect to HG share and qualifying outgoings, notwithstanding the adaptability of such rules to suit various embodiments, combined with ongoing principal and indefinite (or definite as the case may be) length of loan term (which prior art sets as a number of years) enables the present invention to process and output a unique balance between lender and borrower. In one embodiment the data input to the combined system 500 configures the system to process, calculate and then output home annuation offer documents that display and summarise not only the cost and benefits to a borrower but also the cost and benefits to a lender under a variety of forecast economic conditions.

3. Debt Free Leverage

Especially novel is the debt free leverage created by the 'combined system' 500 and presented through the elements of each home annuation agreement, or similar embodiments thereof; named as such to reflect the lenders zero debt requirement to obtain highly leveraged exposure to potential gains over an entire capital assets value or percentage share thereof. Exemplified by example, a home annuation agreement providing income for a retired couple (borrower) and capital guaranteed leveraged saving (investment/lending) for a retirement saver (lender), depending upon variable elements such as HG share, asset division size and proportioning of default calculations, may cause a lender to contribute between $10,000.00 and $30,000.00 per annum to a home annuation agreement as regular monthly payments. Whilst the borrower (retiree) receives their monthly payments subject to a zero-interest rate, the lender is entitled to his share of horizon gain (akin to capital appreciation) on a capital asset of far greater value than his annual contribution, in this example $500,000.00. Without the risk of debt or the interest rate risk associated with such and with his qualifying outgoings protected by a capital guarantee, a lender (or lenders, as the case may be) with HG share entitlements of 65% would in this example accrue gains based upon $325,000.00 of the $500,000.00 total asset value. Alternatively, this can be expressed as 65% of any HG beyond the transaction base which in this example is $500,000.00. It follows that a 5% appreciation in the asset value will accrue gains for the lender of $16,250.00 ($325,000.00×5%, or $500,000.00×5% x 65%), whilst his qualifying outgoings will have, in this example, totalled approximately $10,000.00 (depending upon certain inputs to PM 101 and AOVVS 100). Correspondingly, over an example year the borrower has enjoyed an income of $10,000.00 plus the return upon $175,000.00 of the $500,000.00 total asset value. At the 5% asset appreciation rate stated above this accrues the borrower $8,750.00 in additional wealth (on top of the preserved estate value of the asset). Added to the payments received through the home annuation agreement, the borrower's wealth gains for the year total $18,750.00. The equality of lender and borrower in the various embodiments of the 'combined system' 500 configurations of this previously un-disclosed invention, are testament to the potential for the present invention to bring about social re-alignment.

Extending the same example out over the course of say 20 years, with 3% annual indexation of the ongoing principal, the 'combined system' 500 determines that a borrower will have received approximately $270,000.00 in receipts and where the asset has appreciated annually at say 3.5% to an approximate value of $1,000,000.00, the borrower (or owner of the property) will have accrued horizon gain of $175,000.00—a total wealth increment of $445,000.00. Correspondingly, the lender will have accrued HG share of $325,000.00 which is the total amount the borrower would be obliged to redeem. Repayments equal to approximately 1.2 times the sum borrowed.

To contrast this with prior art lending practices, an unsophisticated shared appreciation mortgage which offers loans up to 20% of the asset value at commencement in return for 40% of any capital appreciation and an offset of 20% of any asset depreciation (i.e. simplistic 1:2:1 ratio), will have lent $100,000.00 at the outset and require the borrower to repay $300,000.00. Repayments equal to 3 times the initial loan value. If it were possible under prior art for the borrower to have received the $270,000.00 sum advanced under the HA scenario, it would have represented an advance of 54% of the initial property value of $500,000.00.

Applying the prior art lending: repayment ratio, a borrower would be required to repay 108% of any future appreciation in asset value—clearly not tenable—and demonstrating how the newly disclosed invention combines systems, data processing methods and technologies to achieve beneficial outcomes that are not tenable for prior art systems that derive lender returns from the state of asset value.

4. Unique General Benefits

Other unique benefits to a lender can be drawn by comparison to existing prior art saving (investment/lending) options available. Using an example of a retirement saver (lender) who is a trustee of his self managed super fund and desires exposure to the potential capital gains of a real residential property asset, a home annuation agreement provides leveraged access to the capital appreciation of the residential property; without the need to take on debt to create the leverage; without direct exposure to interest rates or interest rate risk; and, with the assurance of a capital guarantee upon his qualifying outgoings contributed to the agreement.

Potential for social re-alignment is again displayed through the use of home annuation whereby a retirement saver (lender/investor) is making his money available for immediate use by retirees or working families/individuals at zero-interest, whilst at the same time engaging in what has proven to be an effective retirement saving strategy; that is, accessing the potential capital gains of residential property, only with home annuation it can be done without the capital and interest c rate risks that plague prior art methods.

Lenders also benefit from not taking ownership of the asset, upon which capital gain they are entitled, eliminating costs such as stamp duty or the need to source and manage tenants in order to cover the ongoing cost of debt finance. Purchasing a property for investment purposes also requires a deposit as it is often not possible on any universal scale to obtain debt funding for the entire purchase of a residential property. This requirement to first save a deposit is a barrier to accessing the potential capital gains of residential property. The costs of entry to home annuation and thereby access to the potential capital gains of residential real estate, are unique as they pertain simply to administration costs and fees associated with the settlement of a home annuation agreement. The nearest prior art system available (to access asset appreciation without ownership) offers derivatives based upon House Price indices (Halifax house price index) but it will be appreciated that these derivatives are unable to combine occupation rights over the asset, inbuilt capital guarantee, nor do they enable heterogeneous property investment. The advent of consumer to consumer lending, in such respects brought about by the previously undisclosed art herein described, engage consumers in financing activities that return gains (but with protection from losses) of a well established real asset class that also provides immediate use of the retirement savers (lenders) money, in the above example, by more senior citizens or working families/Individuals, notwithstanding these same monies will be available to fund the retirement savers own retirement.

5. Superior Liquidity

Another key feature of home annuation is the superior liquidity it presents to savers (lenders/investors) in contrast to prior art systems involving direct ownership of sorts. The systems, technologies and data processing capabilities inherent to the combined system 500 enable the real asset returns (in a preferred embodiment real property assets), available to investors through home annuation to be assigned (on-sold). It will be appreciated that the right to and process involved in assignment of a home annuation home annuation agreement is materially different to on-selling of units in a securitised pool of shared appreciation (or interest bearing) mortgages. Prior art mortgage securitisation systems take a pool of mortgages and split it into many units. In practice an investor has no direct relationship with a particular property over which a mortgage is held. By contrast, the present invention enables investors to purchase an agreement (home annuation agreement) secured over a particular property of their choice, which connects them directly to the capital appreciation of the particular asset they have chosen (but with capital assurance). The 'combined system' 500 enables infinite trading (assignment) of Home Annuation agreements whether active (with rights to horizon gain share and obligations of ongoing principal payments), or inactive (that is, in state of default where rights and obligations have expired and the agreement has been converted to a fixed value secured upon the asset). Active HA agreements which have accrued rights to horizon gain share are likely to trade at a significant premium to the investor's contributions due to the uniquely inherent "free leverage" and perhaps even at a premium to the value of horizon gain rights accrued where further gains are forecast for the residential property market. An innovative and unique feature of the present invention also enables investors, who have chosen to access potential capital gains of residential property by means other than direct ownership, to benefit from heterogeneous aspects of each individual property, or street, or suburb, or district; becoming more homogenous as an investors criteria expands. Inactive HA agreements will likely trade at a premium to 'zero coupon bonds' as there is a possibility that the borrower under the agreement will redeem earlier than the total forecast term for the agreement providing the investor with a windfall gain. In relation to FIG. 38, which provides an example of home annuation agreements generated under one embodiment of the present invention, which requires lenders to make payments for a given term only, a borrower owns a residential property with a borrowers traditional main mortgage ("BTMM") 10100 secured thereon with a total term of 20 years. In this embodiment, the 'combined system' 500 calculates a forecast term for the home annuation agreement 1 ("FTHAA1") 10400 in line with the years remaining on the borrowers main mortgage and accordingly calculates a forecast term for the home annuation agreement 2 ("FTHAA2") 10500 and any other subsequent home annuation agreements secured over the same or any other asset divisions in a similar manner. Typically the mandatory redemption criteria ("MRC") for this type of home annuation will be the redemption (or refinancing) or the BTMM 10100, sale of the borrowers property, or if the borrower ceases to occupy the property.

At "time=0+5 years", the borrower enters into home annuation agreement 1 "HAA1" 10200 which at the end of its 5 year term ("5YT"), has a redemption value calculated by the 'combined system' 500 in relation to the specific terms of HAA1 10200 which will ordinarily invoke the 'greater of rule'. The fixed value of HAA1 10200 at expiration of the 5YT is depicted as home annuation agreement 1.1 ("HAA1.1") 10201. The 'combined system' 500 calculates the value of HAA1.1 on the secondary market by discounting its fixed value by a user input discount rate and in reference to the number of years until mandatory redemption at expiration of FTHAAI, expressed as:

$$(FTHAA1)-(5YT)=FTHAA1.1$$

and may further adjust its price in relation to the probability of early redemption by the borrower, but will likely allow this aspect to influence the actual price paid by the purchaser of HAA1.1. The 'combined system' ("CS") 500 assembles this actual sale price data to quote a market premium at any given time which represents the difference between the value calculated by CS 500 using zero coupon bond methodology and the actual price being paid for fixed value home annuation agreements on the secondary market.

Figure 38:
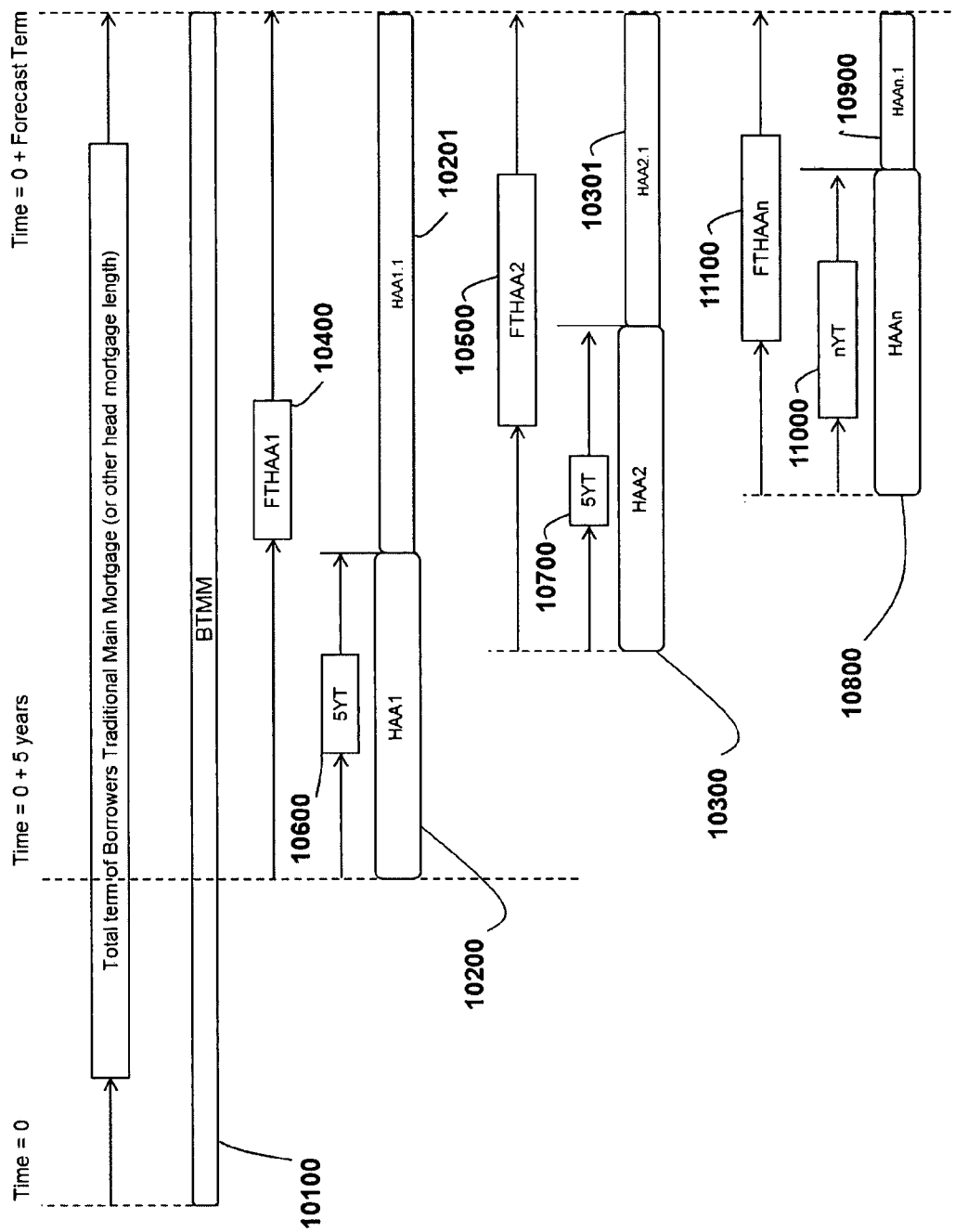
FIG. 38 is a schematic flowchart of agreements generated and managed by one embodiment of the present invention which have a fixed initial term combined with a forecast term for each asset division.

It will be appreciated from FIG. 38 that the 'combined system' 500 can divide a borrower's asset into numerous divisions in order that the borrower can enter into numerous home annuation agreements of this type simultaneously. It will be further appreciated that whilst not shown in FIG. 38, where a home annuation agreement is redeemed before expiration of BTMM 10100, the 'combined system' 500 can perform the necessary calculations to settle a subsequent active HAA over that particular asset division.

6. Heterogeneous Derivative

It will be appreciated that the present invention is the first in the world to enable investors (in particular consumers as "Retail investors"), to the obvious exclusion of those in the business of lending, to access the potential gains of residential property assets at a heterogeneous level without direct ownership. That is, the present invention, in one embodiment, comprises the systems, technologies, data processing capabilities and methods to construct/structure residential property derivatives at a heterogeneous level starting from a single home, to a particular street, to a particular suburb. In one variation, these derivatives have a built in capital guarantee upon borrower redemption whether "active" or "default" contracts as well as in-built "free leverage". Prior art residential property derivatives are available but only at a regional index level, an example being the widely traded Halifax House Price Index in the UK. Whilst a combination of zero coupon bond and at-the-money call option can be used in combination to construct a capital guarantee at maturity, these features come at a cost and so does the integral debt of some products based upon residential house price indexes.

7. Loan to Value Ratio

No maximum or minimum loan-to-value ratio applies to the agreements constructed by the CS 500, yet by nature the LTV may be below 30%, notwithstanding leverage is substantial at between 30 and 50 times a lenders qualifying outgoings at any point in time. This innovation pertaining to debt free leverage is unique to the present invention at a consumer level. By way of non-limiting example, $10,000.00 in annual payments indexed at 3%, paid into a home annuation home annuatlon agreement where the underlying asset value (or division thereof) is $500,000.00, provides a LTV at end year one of two percent and it would take approximately 30 years for a LTV of 100% to be reached. Under this same agreement and without any debt, the lender obtains returns upon a sum fifty times greater than his investment and with a capital guarantee, hence the expression "debt free leverage".

8. Interest & Standard Appreciation Share

The combined system 500 in one embodiment is capable of incorporating interest charges into home annuatlon or other embodiments of the present invention should it be deemed a beneficial addition to the system at a future time and within bounds of the ethical and moral standards established by the SO custodian from time to time in respect of various embodiments of the present invention which may be commercialised. Interest may be applied, if so nominated at the outset of an agreement or, where an agreement allows, applied as a charge if a borrower has in anyway defaulted.

The combined system 500 will in some embodiments, in particular those with a fixed term and run-on period as shown in FIG. 38, apply a straight appreciation share in favour of the lender calculated to provide an annual indexation of the fixed value of the HAA (i.e. HAA1 & HAA1.1 in FIG. 38), but only where the agreement asset appreciates at a benchmark rate so that appreciation rates below the benchmark rate will result in a lower or zero indexation of the fixed sum and so that appreciation rates higher than the benchmark rates will result in a higher rate of indexation.

9. Improvements by Borrower

In the preferred embodiment, where a borrower wishes to carry out renovations or improvements to the property, he may request that the custodian instruct a valuation be carried out before improvement works, followed by a valuation subsequent to completion of such works. Where the valuation report can directly attribute any potential gains directly to the improvement works then the 'combined system' 500 adds the value of this increment to the "transaction base" of the home annuation home annuation agreement, upon which the horizon gain calculation is based.

10. "In Occupation" and "Life" Variations

"In occupation" ("IO") home annuation; contains terms and conditions within the HA agreement which are precondition to complete redemption (mandatory redemption criteria) by the borrower of all HA agreements secured over the occupied dwelling and which operate when the borrower ceases to occupy the dwelling for any period greater than that specified in the individual HA agreement but typically six months and given that any two periods separated by less than 30 days (or some other period specifically identified in a HA agreement) are treated as adjoining and thereby aggregate to total length of one period. Often this will be as a result of owner occupiers (borrowers) wishing to sell their home and relocate but can be as a result of death or relocation to a care home. It will be appreciated that redemption does not mean that the property must be sold, but merely the value of any HA agreements as secured by corresponding CGAMM's or CGFM's be redeemed.

"Life" ("L") home annuation; applies to HA agreements secured over un-occupied real property, or that which is not the owners principal place of residence where terms and conditions within each HA agreement, that are precondition to complete redemption by the borrower of all HA agreements secured over the occupied dwelling, operate upon the death of the borrower/(s).

11. Specified Event Variations

Specified event ("SE") home annuation; contains terms and conditions within the HA agreement which are precondition to complete (or in part subject to part prepayment criteria described hereafter) redemption (mandatory redemption criteria) by the borrower of one, more than one, or all HA agreements secured over the real asset which operate when a specified event occurs (or fails to occur by a given time). Examples of specified events may include, without limitation and not to the exclusion of IO and L criteria; a future point in time; a specific or value range regarding the real asset value; occurrence or non-occurrence of a nominated event. Specified events may be adjoined in combinations so that, for example, both must occur to qualify as a precondition to mandatory redemption. The methods, systems and technologies of the present invention enable the specified events to be included as an input to AOVVS 100 and thereby taken into account in the generation of outputs from the module, in particular the home annuation Offer document. These constants within the model can be weighted to a particular borrowers requirements before outputs are generated. The 'combined system' 500 monitors MRC, especially combinations thereof, via user input borrower returns submitted on a regular basis.

12. Borrower Assignment

Where mandatory redemption criteria is a specified event (in lieu of say "in occupation" HA agreements), it will be common for the borrower to assign the home annuation agreement by either, sale of the real asset over which HA agreement/(s) are secured; or, independent assignment of home annuation agreement/(s) without sale of the real asset.

In both applications, the mandatory redemption criteria, as a condition precedent to redemption, will determine when the HA agreement/(s) must be redeemed. Failure to redeem once these conditions have been met, whether or not a HA agreement has been assigned, provides for rights of possession or repossession for the lender/(s). It will be appreciated that assignment by a borrower/(s) does not impact the rights of lender/(s) to assign nor place any limit upon how many times lender/(s) or borrower/(s) may assign.

13. Micro and Macro

It will be appreciated that the present invention can be calibrated and operated to establish and administer home annuation in a regulated, monitored and consistently priced fashion so that outputs are consistent and expected, in line with variable inputs. Alternatively, home annuation offer documents can be generated by CS 500 to satisfy particular borrower parameters on an individual basis. This flexibility allows the present invention to establish and administer numerous markets and sub-markets defined at macro level. Rather than providing generic disclosure information as found in prior art systems and methods, the present invention can produce home annuation offer documents which allow consumer's who may not be expert in the art of finance, investment, lending, to assess the borrowers offer against other prior art products, as can be seen in FIGS. 32 to 35. A consumer (or otherwise) lender is also able to measure their wealth gain from entering into the agreement against the wealth gain of the borrower from entering into the agreement; based upon the various time and appreciation scenarios modelled and presented by CS 500 and where appropriate, included within the home annuation offer document. Whilst a borrower may thereby exert significant influence over the terms and conditions of his borrowing (within the macro HA framework, as it applies from time to time and as administered by HAC60), he may, depending on the embodiment of CS 500, be constrained by substantial commercial disclosure as well as comparison to prior art systems; which may allow comparison of his potential gains to those of a lender.

14. Taxation

Various embodiments of the present invention can generate and administer agreements which find application in residential property investors (landlords) who may wish to receive income from tenants who pay rent, as well as further yield, in the form of borrowings from a home annuation lender. It will be appreciated by those who are expert in the art that typically "income" is taxed whilst "borrowings" are untaxed in the hands of the recipient. For investors (landlords), the present invention enables total yield from an asset to be received as partly income (rent) and partly borrowing (or some ratio between 0 and 100), where to compare the two on an after taxation basis, the borrowing receipts (ongoing principal) would need to be "grossed up" by a factor of:

$$t/(1-t)$$

where: t=the borrowers marginal tax rate.

The taxation treatment of the ongoing principal (IP) or borrowing receipts described directly above also extends potential benefits to further embodiments of the present invention that increase the divisibility and affordability of housing. Consumers who under prior art systems pay interest charges with post-tax earnings, benefit from ongoing principal received via home annuation (where classified as borrowings by an applicable taxation authority), as a non-taxable amount. Hence, to compare ongoing principal (or borrowing receipts) to pre-tax earnings, the ongoing principal would again need to be "grossed up".

15. Priority Agreements

For embodiments of the present invention that generate and administer HA agreements in relation to and secured over real assets which contain superior debt or other security, priority agreements may be a mandatory element of home annuation. This is to ensure that an investor's qualifying outgoings under the HA agreement, in so far as the capital guarantee applies, are sufficiently covered by the existing equity in the real asset. In one embodiment (and variations thereof) of the present invention which combines interest bearing debt provided by prior art bank or non-bank lenders, the capital guarantee may only be recoverable (underwritten) by horizon gain that has accrued. That is, the value of any capital guarantee will be zero if the real asset (or division thereof) over which the home annuation agreement is secured has not increased in value or has decreased in value. Where the asset value has increased, any capital guarantee may be limited to the value of horizon gain that has accrued, regardless of the qualifying outgoings value at that point in time, or where no horizon gain has accrued, a stated cap upon capital guarantee may be given that would typically limit the value of security over the agreement asset at the current asset value. As the value of the asset appreciates, so the value of the capital guarantee increases and may subsequently decrease again should the agreement asset later depreciate in value; these calculations are performed automatically by CS 500 each time a system operator inputs updated asset values directly or directs CS 500 to calculate updated asset values in relation to an index value input by the system operator. The effect of this variation is to enable lenders of interest bearing debt to obtain security over the real asset in relation to; the sum loaned and existing equity, whilst enabling the consumer (home owner) to engage in home annuation arrangements pertaining to the future value of their real property asset, thereby deriving "additional income" (borrowing receipts) to enhance their ability to meet interest payments on debt and accordingly influence the affordability of housing. It will again be appreciated that home annuation principal (subject to tax jurisdiction) may be received net of taxation and would thereby require a "grossing up" for accurate comparison with a consumers pre-tax income derived from other sources and applied to interest bearing debt repayments on an after taxation basis.

16. Hedge to Mortality Risk

Notwithstanding that a lenders contributions to a home annuation agreement are capital guaranteed (in so far as each particular agreement provides for), those agreements where mandatory redemption criteria is based upon life expectancy of the borrower, expose the lender to life extension risk. The longer a borrower lives, the longer ongoing payments from a lender may be required. For lenders who also hold mortality risk (i.e. life insurers), the present invention provides a capital guaranteed opportunity to balance, or hedge, said mortality risk.

17. Insurance Provision

Any payouts by an insurer (as underwriter of home annuation agreements) subsequent to lender default may be covered by a capital guarantee all monies mortgage ("CGAMM") which will be subsequently converted to a capital guarantee fixed mortgage ("CGFM") once a final insurance payout has been made to the borrower under a particular agreement. The value of the CGFM in favour of an insurer may be partly or fully offset against a lenders CGFM when a borrower redeems said CGFM's, so that, it will be a lender bearing the cost of insurer reimbursement rather than a borrower.

One effect of this insurer reimbursement provision is to establish a payout cost to the insurer which is simply equal to the 'time value of money'. It will also be appreciated that the insurer's payout value may be further offset against lenders CGFM or borrowers PEV (or other security) so that the insurer receives a return upon the monies it has paid out. Such return could be in the form of; indexation of the monies by a house price inflation measure or perhaps the Consumer Price Index; a share of horizon gain (whether or not the greater of rule is applied in this case), or a straight percentage share of house price appreciation; or a simple or compounding interest measure. It can therefore be appreciated that insurers who underwrite home annuation agreements may enter into arrangements that position themselves more as a substitute lender than an insurer.

Commercialization

To aid in explanation of the systems, technologies, methods and data processing capabilities of the present invention, examples have been used above that demonstrate some aspects of commercial application of various embodiments and how home annuation may be employed in a wide variety of uses. For further explanation upon the innovative combined system 500 that creates and manages; the allocation of assets into divisions, ongoing principal, horizon gain share, qualifying outgoings, free leverage and capital guarantee, FIG. 3a, FIG. 3b, FIG. 4a, FIG. 4b, FIG. 5a, FIG. 5b, FIG. 6a and FIG. 6b are referred to in sequence, in relation to a preferred embodiment and with reference to elements of the combined system 500 (FIG. 2) as required:

A. Retirement Income (Borrowing) and Saving (Lending)

A "borrower" ("B") 40 engages with a consultant from CD 102 who inputs data to AOVVS 100 in order that a home annuation offer document be produced, such input data including, but not limited by; value of "real asset" ("RA") 50; age of B40; number and proportion of "asset divisions" ("AD") 20a and 20b to be created in RA 50; percentage allocation of "horizon gain" ("HG"). After listing on OLS 301, acceptance by LD 201 and settlement at OAPM 300 (FIG. 2), the "ongoing payments" ("OP") 33 commence. "saver" ("S") 30 benefits from "free leverage" ("FL") 32 generated by the ratio between cumulative value of OP 33 and market value of "asset division" ("AD") 20a at any point in time. (It will be noted that AD 20a and AD 20b are analogous to mortgages established over the property title rather than subdivisions of the title). In accordance with the terms and conditions of "borne annuation agreement" ("HAA") 1, the "home annuation custodian" ("HAC") 60 monitors that S 30 and B 40 comply with their respective obligations and process payments "ongoing principal" ("IP") 35 and CP 34 once OP 33 has been received. The greater of horizon gain transfer ("HGT") 21 or OP 33 is secured over RA 50 by way of "capital guarantee all monies mortgage" ("CGAMM") 31. The HA depicted in FIG. 3a can remain in force until either redemption by B 40 or default by S 30 or B 40, notwithstanding that the entity attached to S 30 can vary as the interest (with obligations) is assignable.

Figure 3A:
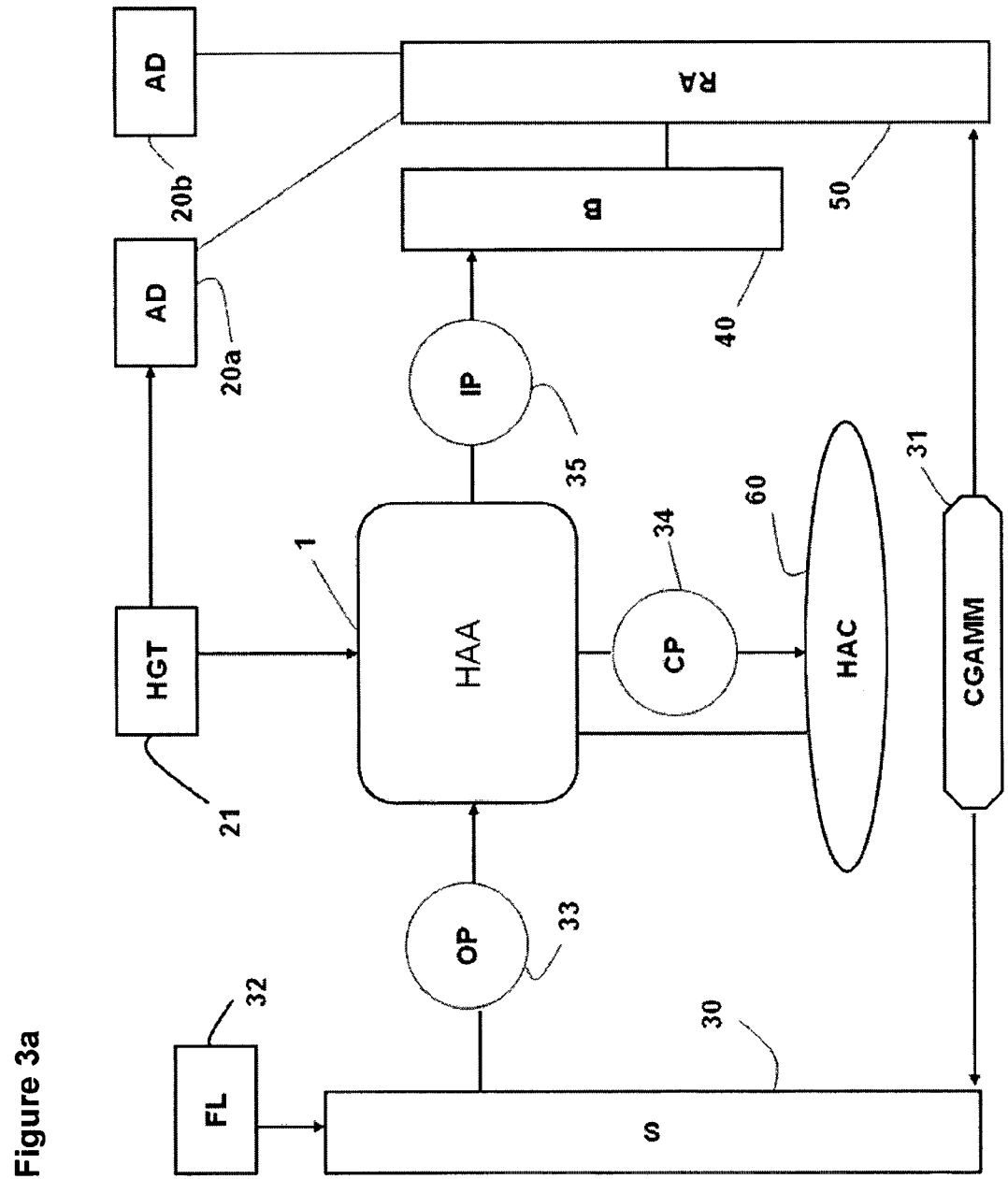
FIG. 3a is a schematic flow chart of a divided asset with multiple agreements secured thereon and single saver (lender/investor) counterparty; figure is representative of settlement and throughout.
Figure 3B:
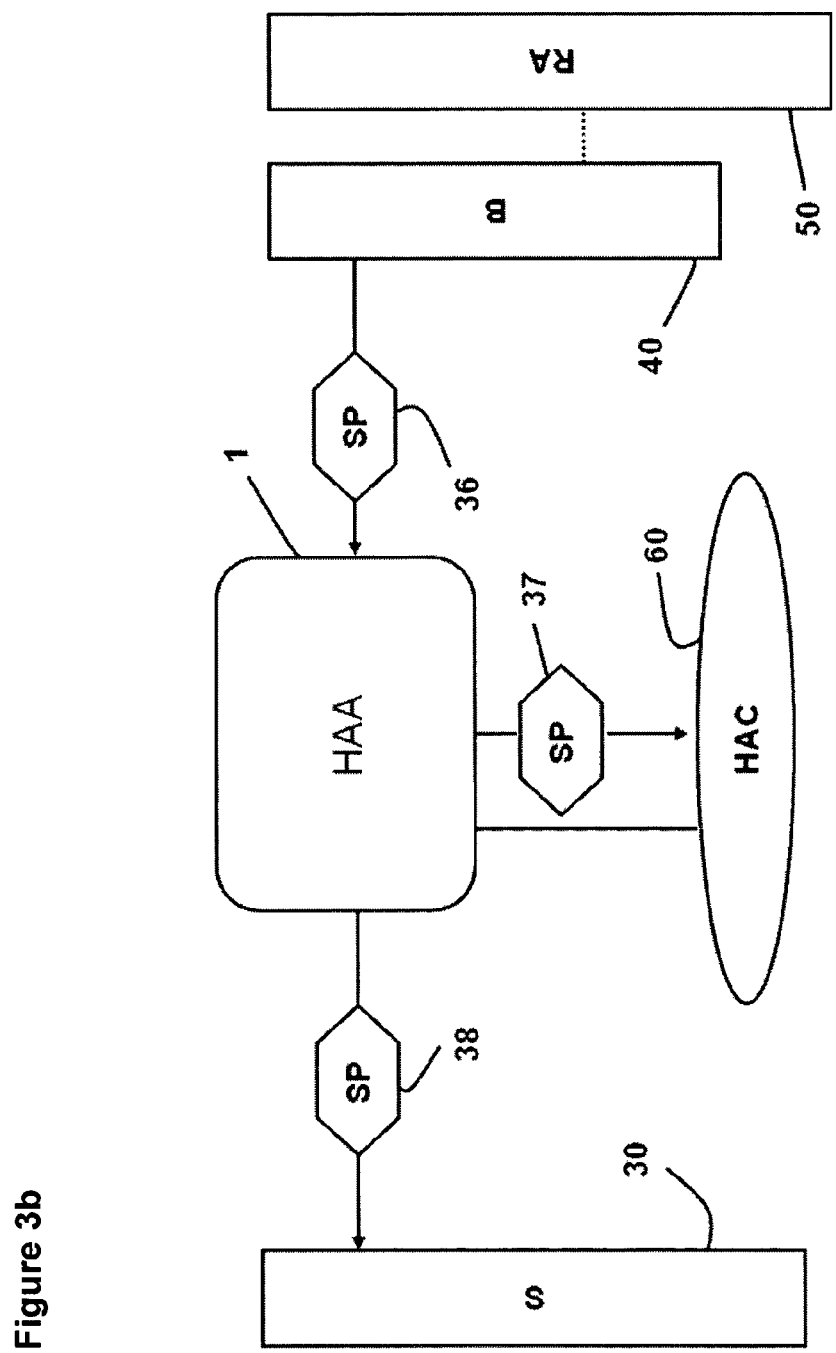
FIG. 3b is a schematic flow chart of a divided asset and multiple agreements secured thereon and single saver (lender/investor) counterparty, as depicted in FIG. 3a; but rather, figure depicts redemption at completion of multiple agreements.

FIG. 3b depicts redemption of HAA 1 by B 40 who applies to redeem, at which point OP 33 is suspended, via the AMS 400 (FIG. 2) that in turn generates a redemption workflow. The redemption workflow requires one valuation, or maximum two where an average of two valuations is required by the HAA terms and conditions, to be carried out and required data input to AOVVS 100 (FIG. 2) in order that a redemption settlement statement and instructions to be routed back to AMS 400 (FIG. 2). Redemption of HAA 1 is processed at AMS 400 where the necessary workflows are generated. Single payment ("SP") 36 is made by B 40's solicitor, potentially in conjunction with the settlement upon sale of RA 50 on the open market; for a price not below the redemption valuation contained within the redemption settlement statement generated by AOVVS 100 (unless unanimously agreed by counterparties). Payment SP 37 is made in settlement of professional fees and charges incurred by the HAC 60 in association with the redemption process and payment SP 38 is made via the custodian in settlement of CGAMM 31. The value of SP 38 will be the greater of Qualify outgoings or horizon gain share and as set out in the redemption settlement statement.

Figure 4A:
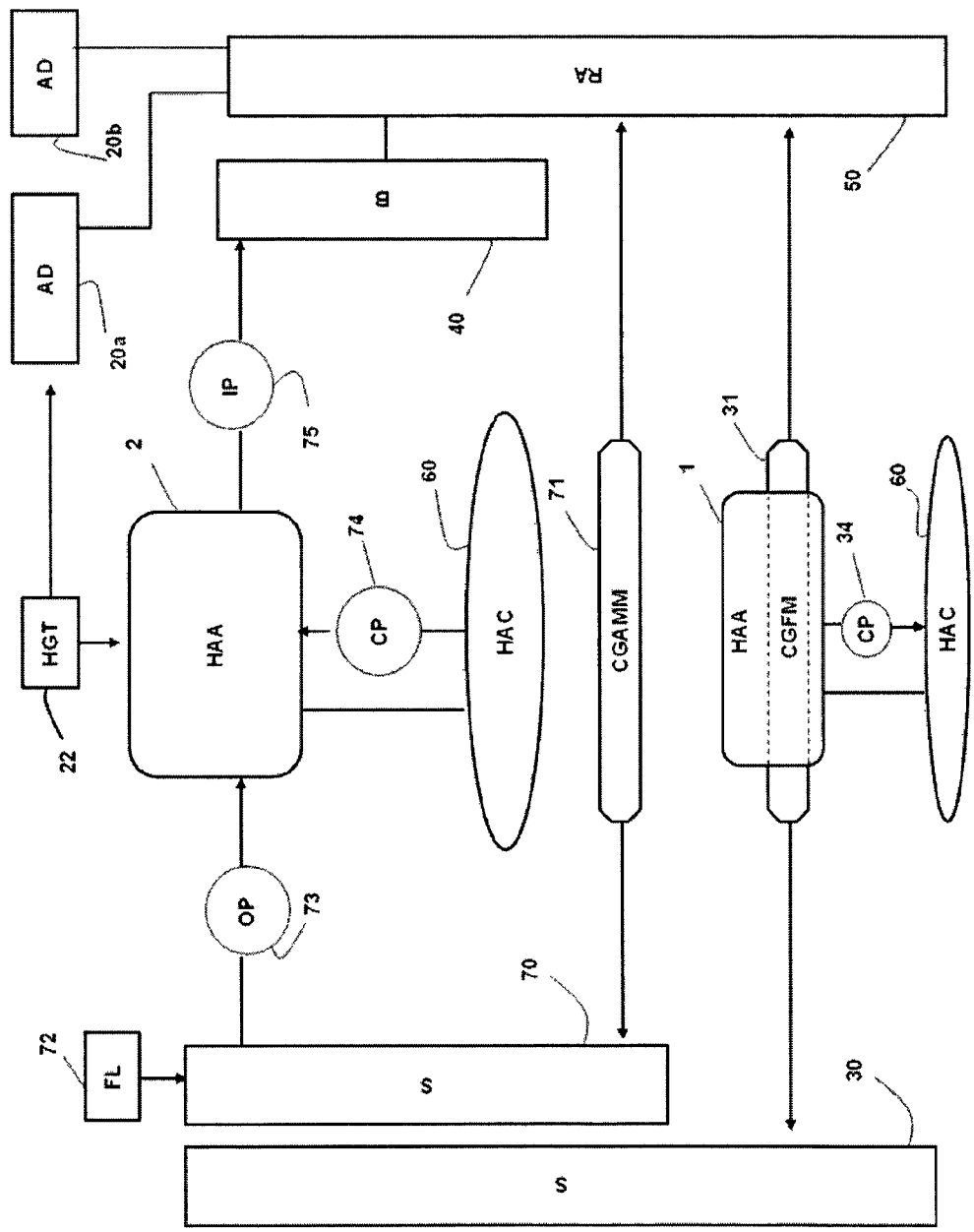
FIG. 4a is a schematic flow chart of a divided asset as depicted in FIG. 3a and FIG. 3b but with subordinate saver (lender/investor) in place and secured thereon; figure is representative of settlement and throughout.

Should the opposite of that depicted in FIG. 3b occur, whereby the lender S 30 defaults upon the regular payments (or some other breach), the HA may be adjusted to reflect FIG. 4a. A "default workflow" is generated at AMS 400 when the system detects that S 30 is in breach of a condition of HAA 1. In case of default on monthly payments, the workflow contains consultative provisions that extend for as long as the period stated in HAA 1, which will generally match one third of the period covered by the number of monthly payments held in reserve by the custodian which are paid upfront upon settlement of HAA 1 (or any other HAA). These provisions are originally set out in the home annuation borrowers offer document and referred to as reserve monies. Should S 30 recommence payments within the default consultation period, AOVVS 100 calculates a premium applied to regular payments until the balance of monies held in reserve by the custodian (equivalent to a given number of regular payments) are replenished to the pre-default balance. Technically S 30 is still classified in default until the balance of the reserve monies is fully replenished. This mechanism ensures that a series of defaults which could deplete the reserve monies (as the ongoing principal continues to be advanced to B 40 from the reserve) does not result in a sudden cessation of ongoing principal receipts for B 40.

Upon expiration of the consultation process (and where S 30 has not recommenced payments), AMS 400 communicates same with AOVVS 100 and a valuation is instructed (or two valuations where HAA states an average of two valuations is required). Once valuation data input to AOVVS 100 is complete the calculation of a default conversion statement takes place, the CGAMM 31 is converted from an all monies mortgage to a fixed value mortgage CGFM 31 over RA 50 as shown in FIG. 4a. For explanation purposes it will be assumed that one hundred percent of S 30's horizon gain value is transferred back out of the HAA 1 via "horizon gain transfer" ("HGT") 21 (FIG. 3a) upon expiration of the default consultation period (where S 30 has not recommenced regular payments plus premium), although it will be appreciated that in practice the percentage of HG transferred out of the agreement may be less than one-hundred percent and such percentage will be set from the outset and stated within the home annuation offer document. For explanation purposes it will also be assumed that conversion of CGAMM 31 to CGFM 31 is made at one-hundred percent of the qualifying outgoings value at time of lender (S 30) default, when in practice the conversion value of CGAMM 31 to CGFM 31 may be calculated in relation to a percentage less than one-hundred, such percentage used in said calculations will be stated in the home annuation offer document. AOVVS 100 also utilises the input data to generate a new home annuation offer document for listing at OLS 301 (FIG. 2). From LD 201 (FIG. 2), "saver" ("S") 70 accepts the HA offer. It will be appreciated that CGFM 31 securing HAA1 are independent of any subsequent HAA's such that HAA 2 as shown on FIG. 4a, could very well be based upon substantially different asset divisions (or a single division) in lieu of those depicted as AD 20a and AD 20b. To aid explanation it is assumed that AD 20a and AD 20b remain consistent throughout FIGS. 3a to 6b.

The new HAA 2 is settled through OAPM 300 (FIG. 2) and routed to AMS 400 (FIG. 2) for ongoing monitoring and administration. The terms, conditions, processes and administration of HAA 2 will be substantially similar to HAA 1 yet it will be appreciated that FL 72, OP 73, CP 74, IP 75, CGAMM 71 will be unique to HAA 2 as inputs to AOVVS 100 will have at least varied by the changes in AD 20*a* that occurred between the time of generating the offer document for HAA1 and generating the offer document for HAA2. The HA depicted in FIG. 4*a* can remain in force until either redemption by B 40 or default by S 70 or B 40, notwithstanding that the entity attached to S 70 can vary as the interest is assignable.

Figure 4B:
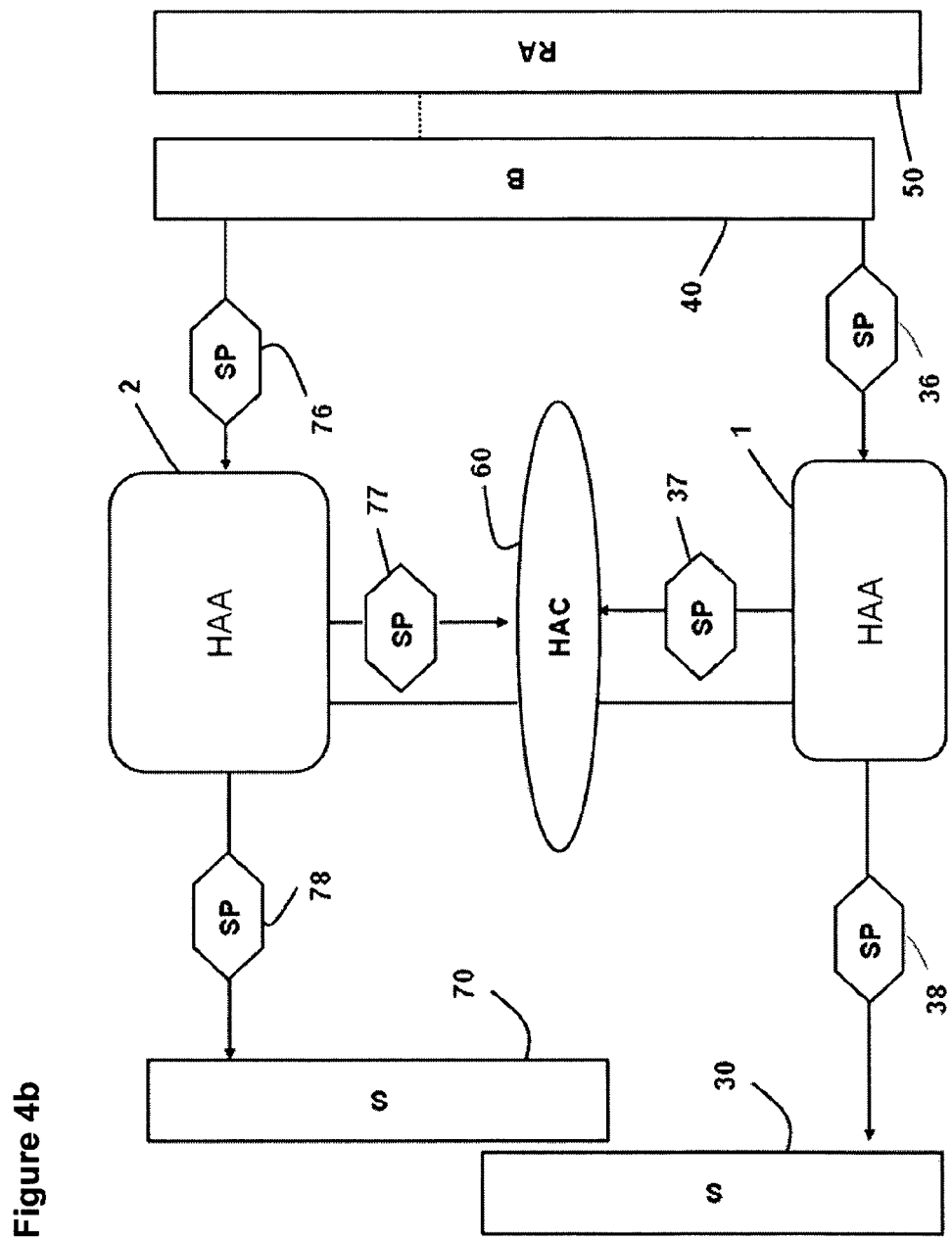
FIG. 4b is a schematic flow chart of a divided asset under multiple agreements as represented in FIG. 4a; but rather, figure depicts redemption at completion of multiple agreement/(s)

FIG. 4*b* depicts redemption of HM 2 and HAA 1 by B 40 who, as previously described, applies to redeem via the AMS 400 (FIG. 2) that in turn generates a redemption workflow, or alternately the custodian invokes redemption workflows where AMS 400 detects operation of conditions precedent (i.e. ceasing to occupy). It will be noted that, if prior to operation of conditions precedent requiring mandatory redemption in full of all HAA's by B 40 (such as ceasing to occupy for 'in occupation' HAA's, or death for 'fife' HAA's), one or more HAA's can be redeemed at the discretion of B 40 and with no priority given to one HAA over another. That is, HAA 1 could be redeemed leaving only HAA 2 in place or contrariwise. In respect of part prepayment, where a HAA is not fully redeemed but a prepayment is made by B 40 to the lender (depicted as S 30 or S 70 so far), whilst the prepayment is immediately and fully passed on in cash terms, said prepayment is recorded within AMS 400 as an offset to be applied after the "greater of" calculation between qualifying Outgoing's and horizon gain share has been applied by AOVVS 100 in generating a subsequent redemption statement. Part prepayments may carry an inducement premium expressed as either; a total percentage; or annual percentage (compounding or otherwise), of the prepayment amount such that, a prepayment of $50,000.00 with a stated total percentage premium of ten percent (said stated premium may be contained within the HAA and generated as an input to AOVVS 100 at outset) will be applied as an offset of $55,000.00 to the final redemption sum.

As previously expressed, FIG. 4*b* depicts redemption of HAA 2 and HAA 1 by B 40 who, as previously described, applies to redeem via the AMS 4.00 that in turn generates a redemption workflow. To aid in explanation of FIG. 4*b* to FIG. 6*b*, it will be assumed that all "Single Payment/(s)" ("SP") made are for full redemption and upon application by B 40. The 'dashed-line' between B 40 and RA 50 upon FIG. 3*b*, FIG. 4*b*, FIG. 5*b*, FIG. 6*b*, denote the option of B 40 to either sell or retain ownership of RA 50 in order to affect full redemption.

As for FIG. 3*b*, the redemption depicted in FIG. 4*b* is enabled by the redemption workflow initiated at AMS 400 that requires one valuation, or maximum two where an average of two valuations is required by either HAA 1 or HAA 2 terms and conditions, to be carried out and required data input to AOVVS 100 in order for a redemption settlement statement and instructions to be routed back to AMS 400 via digital signal. Redemption of HAA 1 and HAA 2 is processed at AMS 400 where the necessary workflows are generated. SP 36 and SP 76 are made by B 40's solicitor, potentially in conjunction with the settlement upon sale of RA 50 on the open market; for a price not below the redemption valuation contained within the redemption settlement statement generated by AOVVS 100 (except where S 30, S 70 & B 40 are unanimous on sale at a lower sum). Payments SP 37 and SP 77 are made in settlement of professional fees and charges incurred by the HAC 60 in association with the redemption process and payments SP 38 and SP 78 are made via the custodian (HAC 60) in settlement of CGFM 31 and CGAMM 71. The value of SP 78 will be the greater of qualifying outgoings or horizon gain share and as set out in the redemption settlement statement, whilst SP 38 will equal the value of CGFM 31 less SP 37.

Figure 5A:
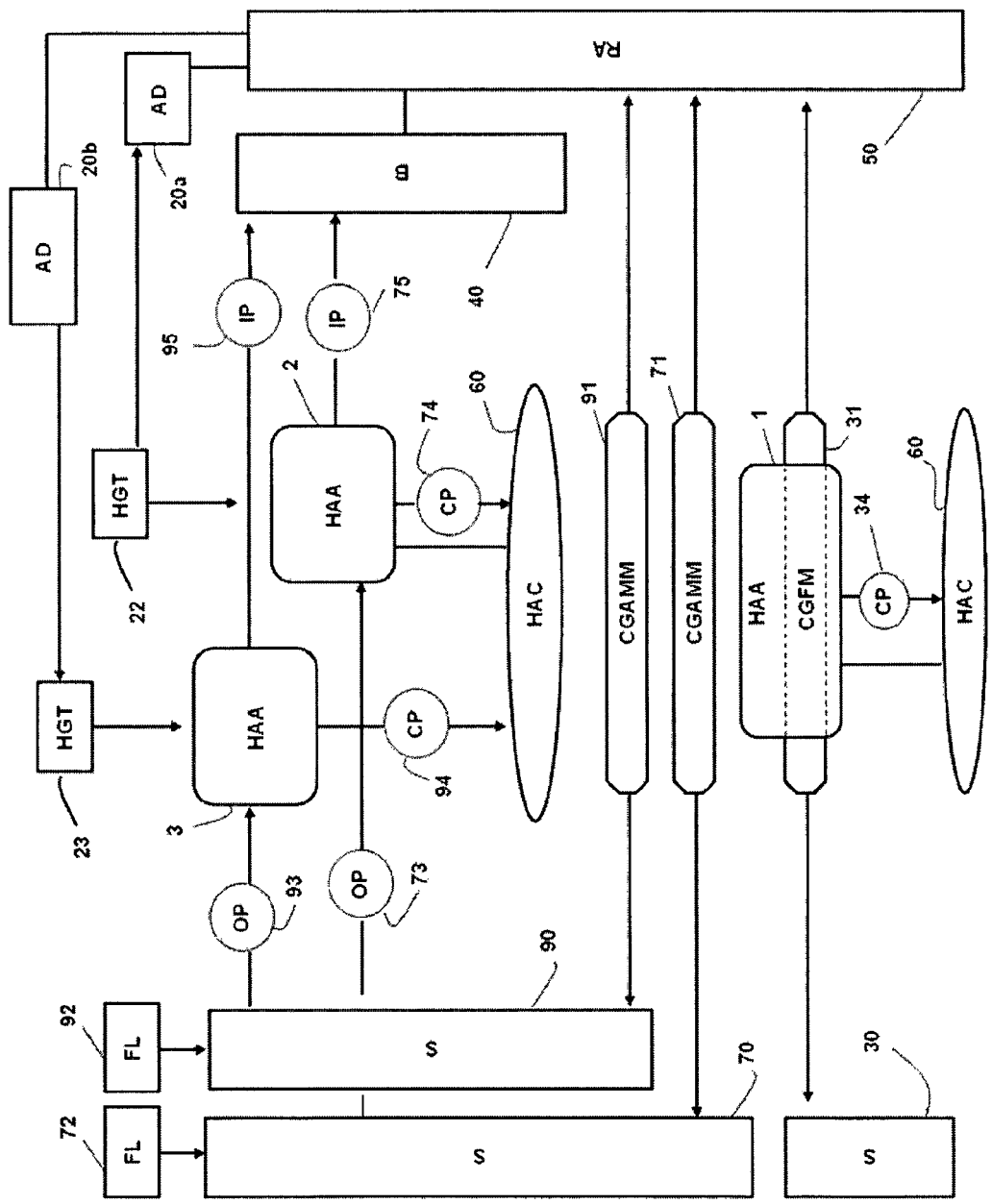
FIG. 5a is a schematic flow chart of a divided asset with division A agreements secured thereon, as well as division B single saver (lender/investor) counterparty; figure is representative of settlement and throughout.

FIG. 5*a* illustrates home annuation with two active agreements in place; HAA 2 and HAA 3, as well as HAA 1 as inactive. B 40 re-engages with CD 102 (FIG. 2) who inputs data to AOVVS 100. In order that a home annuation offer document be produced for HAA 3, such input data including, but not limited to; value of "real asset" ("RA") 50; age of B 40; number and proportion of "asset divisions" ("AD") 20*a* and 20*b* created in RA 50; percentage allocation of horizon gain ("HG") to be applied in 20*b*. After listing on OLS 301, acceptance by LD 201 and settlement at OAPM 300, the "ongoing payments" ("OP") 93 commence. "saver" ("S") 90 benefits from "free leverage" ("FL") 92 generated by the ratio between cumulative value of OP 93 and market value of "asset division" ("AD") 20*b* at any point in time. These methods and processes described in relation to HAA 3 are by now familiar and readily comprehensible, as will be the reader's comprehension of methods pertaining to redemption, prepayment, default and applying subsequent HAA's to asset divisions. Therefore, in relation to FIG. 5*b*, FIG. 6*a* and FIG. 6*b*, a high level description of the home annuation is provided.

Figure 5B:
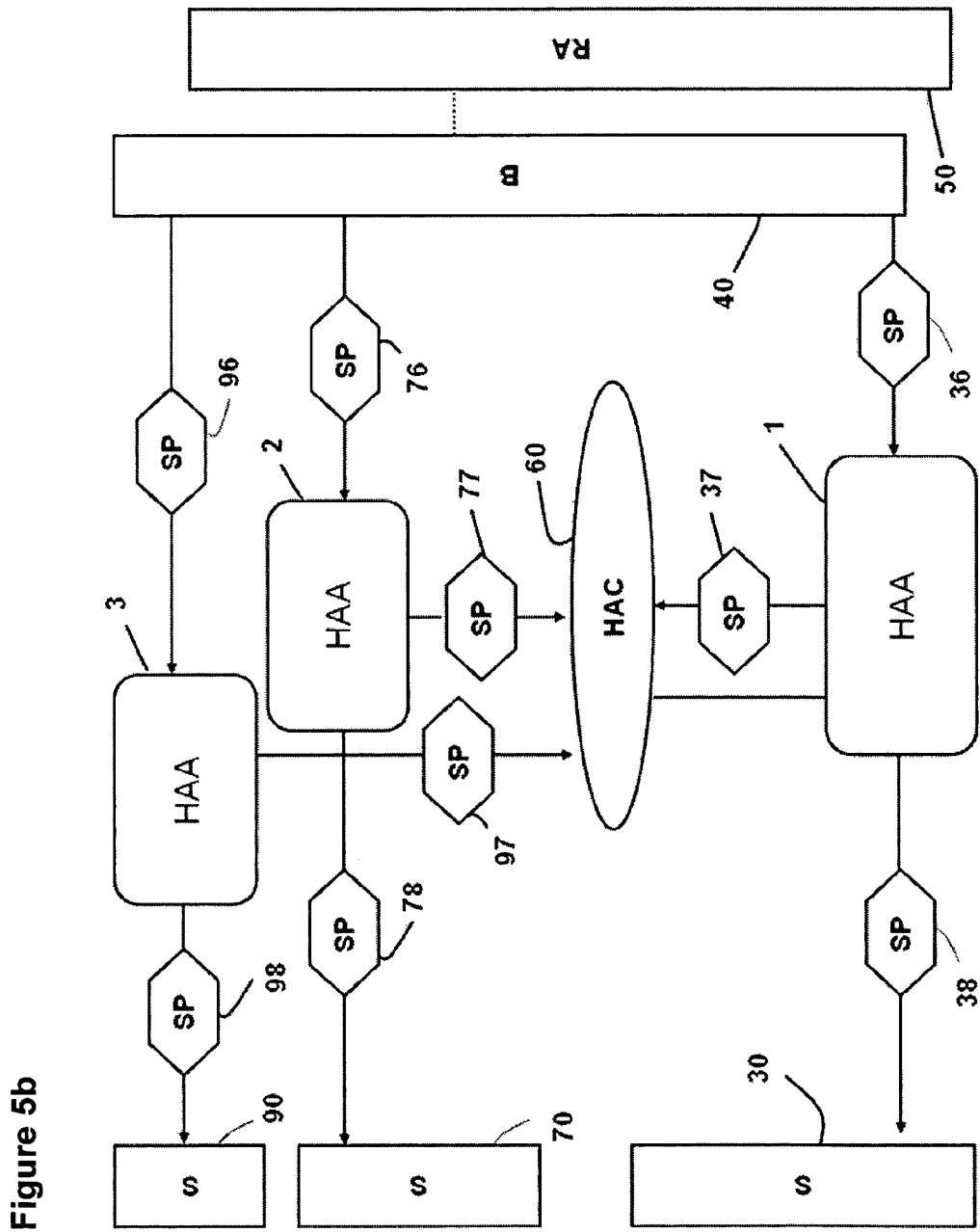
FIG. 5b is a schematic flow chart of a divided asset with division A and division B multiple agreements in place as shown in FIG. 5a; but rather, figure depicts redemption at completion of multiple agreements.
Figure 6A:
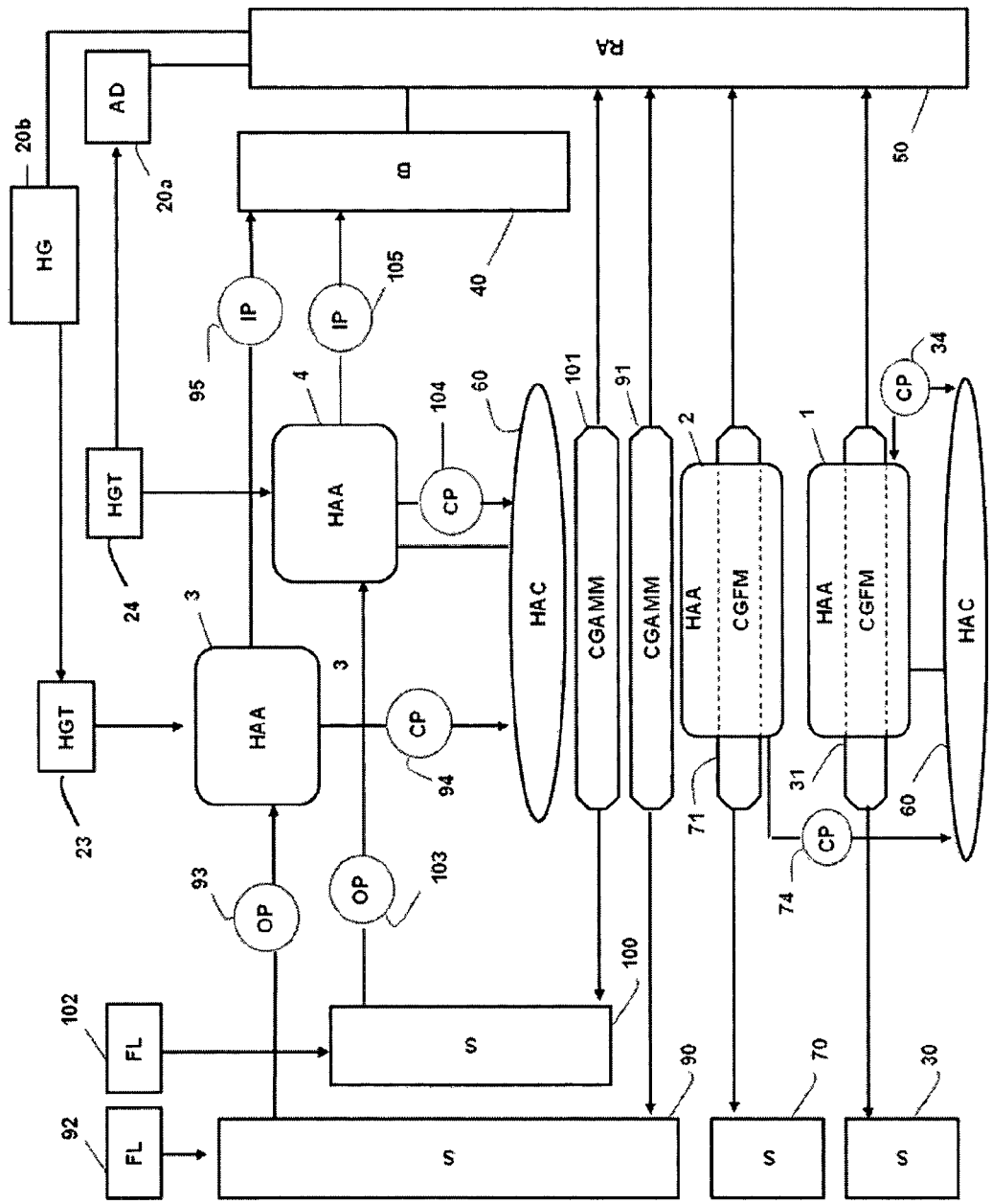
FIG. 6a is a schematic flow chart of a divided asset with division A agreements secured thereon, as well as division B multiple agreements secured thereon; figure is representative of settlement and throughout.
Figure 6B:
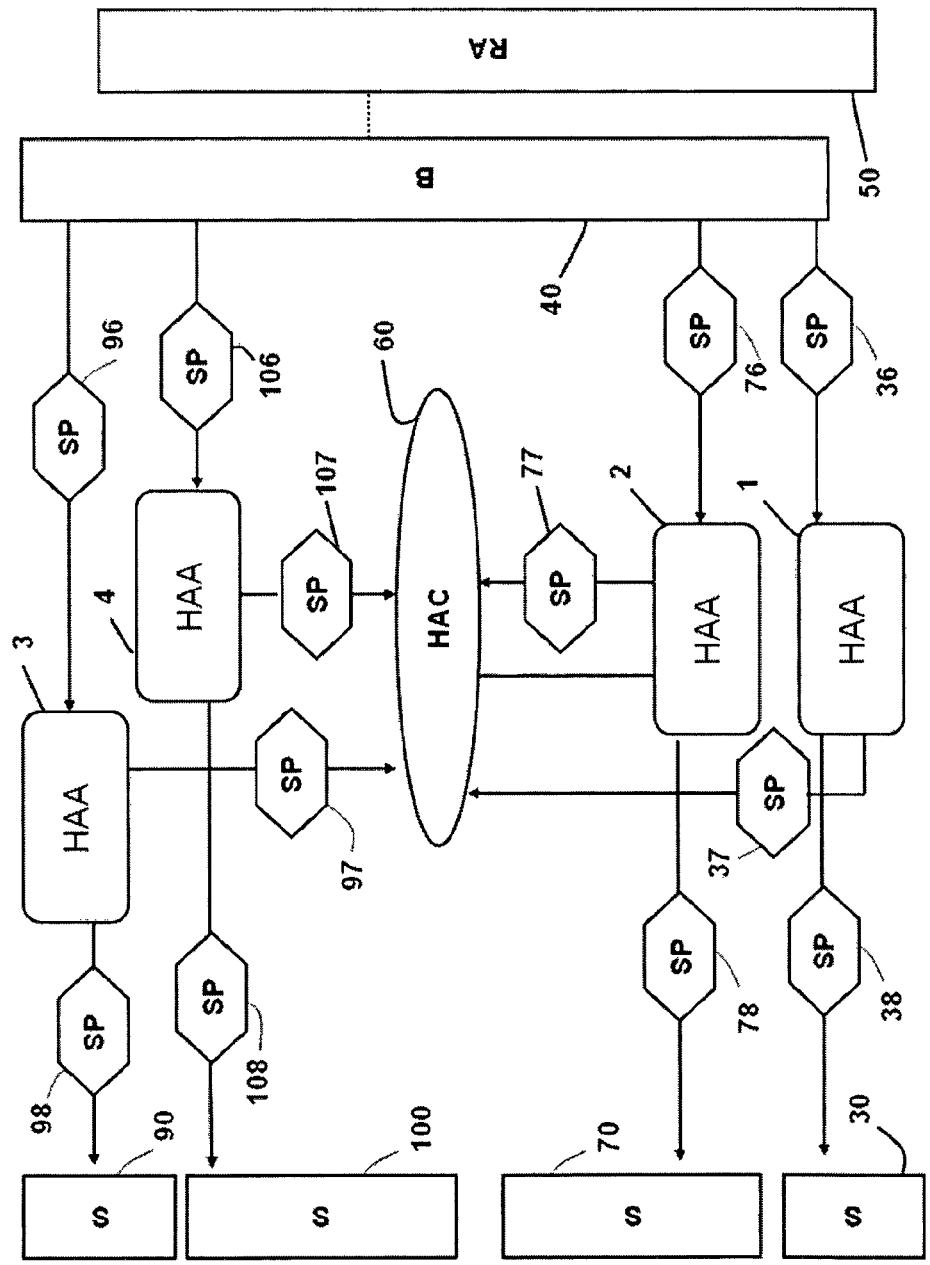
FIG. 6b is a schematic flow chart of a divided asset with division A and division B multiple agreements in place as shown in FIG. 6a; but rather, figure depicts redemption at completion of multiple agreements.

In FIG. 5*b*, the two active agreements HAA 2 and HAA 3 are redeemed along with the inactive agreement HAA 1. In FIG. 6*a*, rather than redemption taking place as depicted in FIG. 5*b*, HAA 2 is shown to default and is replaced by HAA 4. It will be noted that depending upon the percentage of S 70's horizon gain value transferred back out of the HAA 2 via "horizon gain transfer" ("MGT") 22 upon expiration of the default consultation period (where S 70 has not recommenced regular payments plus premium), B 40 can stand to benefit considerably. As with any default upon a HAA, between zero and one-hundred percent of the horizon gain value accrued by S 70 over the active period will not be included in the conversion calculation between CGAMM 71 and CGFM 71—this aspect is priced into and demonstrated within the home annuatIon offer document from the outset. Note that HAC 60 oversees all necessary procedures of the "combined system" 500, including but not limited to; pricing, administration, variation, consultant training, monitoring, settlement and redemption. FIG. 6*b* illustrates the full redemption of two active agreements HAA 3 and HAA 4, as well as two inactive agreements HAA 1 and HAA 2. The embodiment illustrated across FIG. 3*a* to FIG. 6*b*, may illustrate home annuation as a retirement income and retirement saving system under which, B 40 either chooses or is compelled to redeem all HAA's at some point. It will be appreciated that the entity behind S 30, S 70, S 90, S100 may have changed on numerous occasions through assignment of each HAA (and thereby the interests and obligations contained therein). It will further be appreciated that in alternate embodiments of the present invention, the "combined system" 500 will perform the necessary data processing and calculations at the outset to generate offer documents based upon "mandatory redemption criteria" (or conditions precedent to redemption) that may be unrelated to the borrower (and of course manage accepted offers to full completion). Mandatory redemption criteria which are unrelated to the borrower may without limitation include: upper values of the real asset; a future point in time; occurrence or non-occurrence of events external.

The methods and processes described above and below in relation to procedures and embodiments of the present invention may be implemented using a conventional general-purpose computer system 1000, such as that shown in FIG. 28 wherein the processes and procedures are implemented as software, such as an application program containing steps, processes and procedures as instructions in the software that can be executed within the computer system 1000. The software May be stored in a computer readable medium so that together they form a computer programme product which used in a computer effects an advantageous apparatus for implementing embodiments of the invention.

Figure 28:
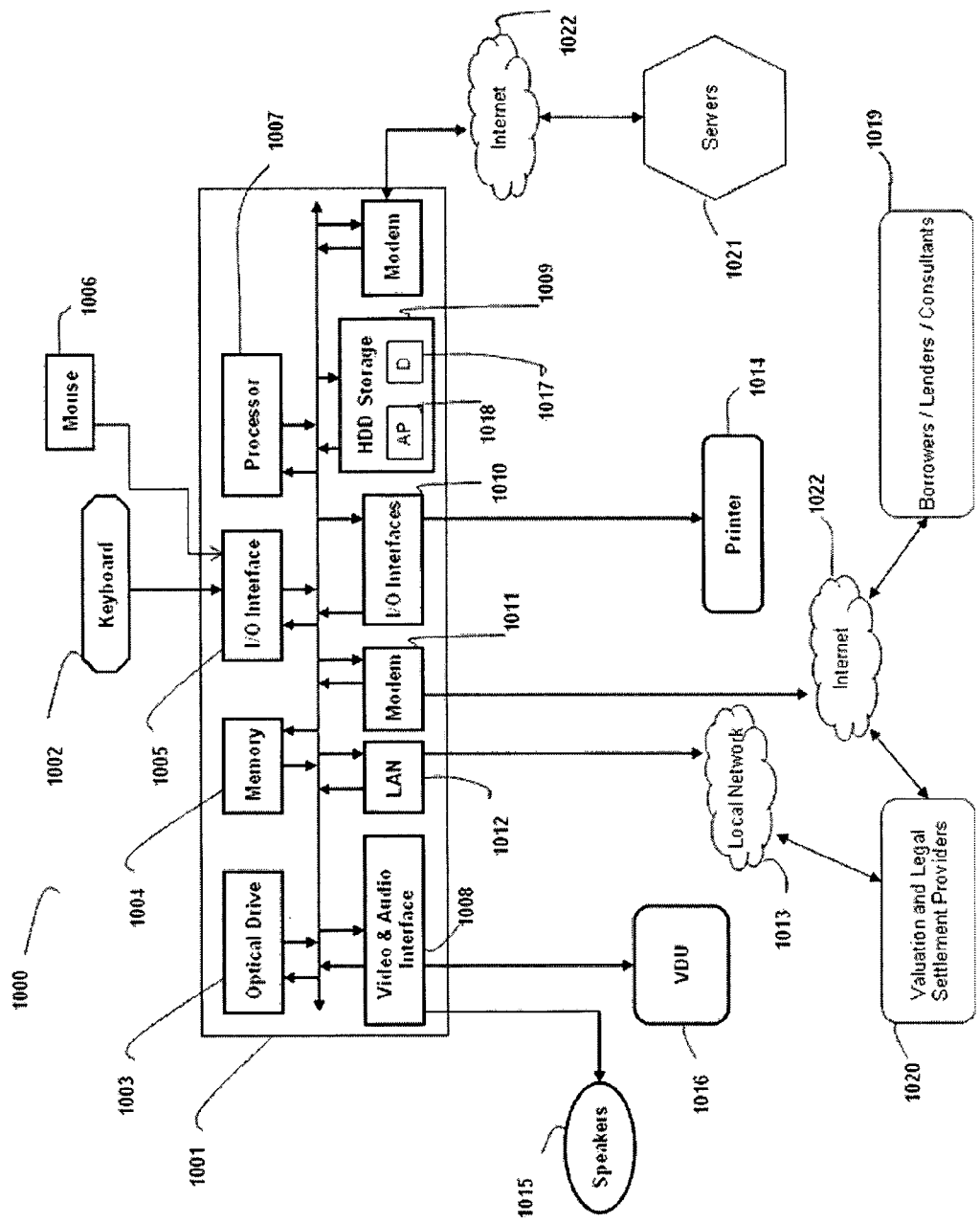
FIG. 28 is a computer system diagram which would enable the methods and systems of the preferred embodiments to be carried out.

As seen in FIG. 28, the computer system 1000 is formed by a computer module 1001, input devices such as a keyboard 1002 and mouse 1006, output devices including visual display unit ("VDU") 1016, speakers 1015 and printer 1014. The computer readable media 1009, stores software and application program/(s) ("AP") 1018 and data ("D") 1017. The modem 1011 may be used to obtain access to other networks, other computer and storage devices including web hosted services. For example, borrowers, lenders and consultants 1019 and valuation and legal settlement providers 1020, may access parts of the combined system 500 within their permission rights set by the system operator using the internet and other computers with their own corresponding modem. Data may also be transferred to and from the system via the optical drive ("OD") 1003. A computer module 1000 will also typically include at least one random access memory (RAM) unit 1004, processor unit 1007, input/output (I/O) interface 1005 & 1010, local area network (LAN) connection 1012 and audio and video interface 1008. The combined system 500 may also connect with external storage and processors such as servers 1021 over the Internet 1022 for web hosting, storage back up and execution of some software elements of the present, invention. External devices may also be connected to via USB, serial or LAN connections. The components 1002 to 1012 of the computer module 1001 typically utilise an interconnected bus to communicate and in a manner known to those in the relevant art as conventional mode. Embodiments of the present invention may be typically practiced on computers such as provided by Apple™, IBM-PC, or similar.

The systems, methods and embodiments of the present invention described above and below are non-limiting and modifications which are obvious to those skilled in the arts of finance and computing are included within the scope of the present invention.

Further Embodiments

In addition to the embodiments described with reference to FIG. 3a to FIG. 6b, further embodiments will be described in the following paragraphs:

A. Landlord Yield and Affordability Enhancement

Embodiments which do not comprise "occupation" conditions enable a borrower to on-sell the asset with the home annuation agreements (or alternate name/(s) by which these agreements of the present invention may be referred depending upon the embodiment employed) in place. In this respect, the present invention has a broader application to the general investment market, whereby a residential landlord in addition to leasing a property to tenants for a 4% yield may choose to also apply the present invention and create one or more home annuation agreement/(s) over all or just divisions of the asset. Should the agreement/(s) apply a far dated clause for redemption, then in some respects the home annuation agreements can be on-sold (assigned) by investors as for a long dated Government Bond—but significantly different in that (where the agreement remains active) the redemption value can go on until the parties decide to terminate but has a redemption floor equivalent to the capital guarantee. Inactive agreements (those agreements in default) would behave more closely to a zero coupon bond as they have a fixed redemption value, although depending upon the exact precondition to redemption, there may be no fixed redemption date to a HA agreement.

Accordingly, landlords who under prior art arrangement earn a 4% yield can, under a HA agreement, offer horizon gain share in return for ongoing principal payments in addition to the rental that a prior art tenant would pay. The 'mandatory redemption criteria' may be unrelated to 'life expiry' of the landlord (borrower). It can further be appreciated that the present invention can be applied to co-investment opportunities between consumers without invoking co-ownership or joint venturing type arrangements. It will be appreciated that to compare the value of home annuation borrowing receipts (IP) with that of rent received, it would be necessary to gross-up the IP using formula described earlier (i.e. t/(1−t)).

B. Home Annuation in Combination with Prior Art Interest Bearing Debt

Figure 11:
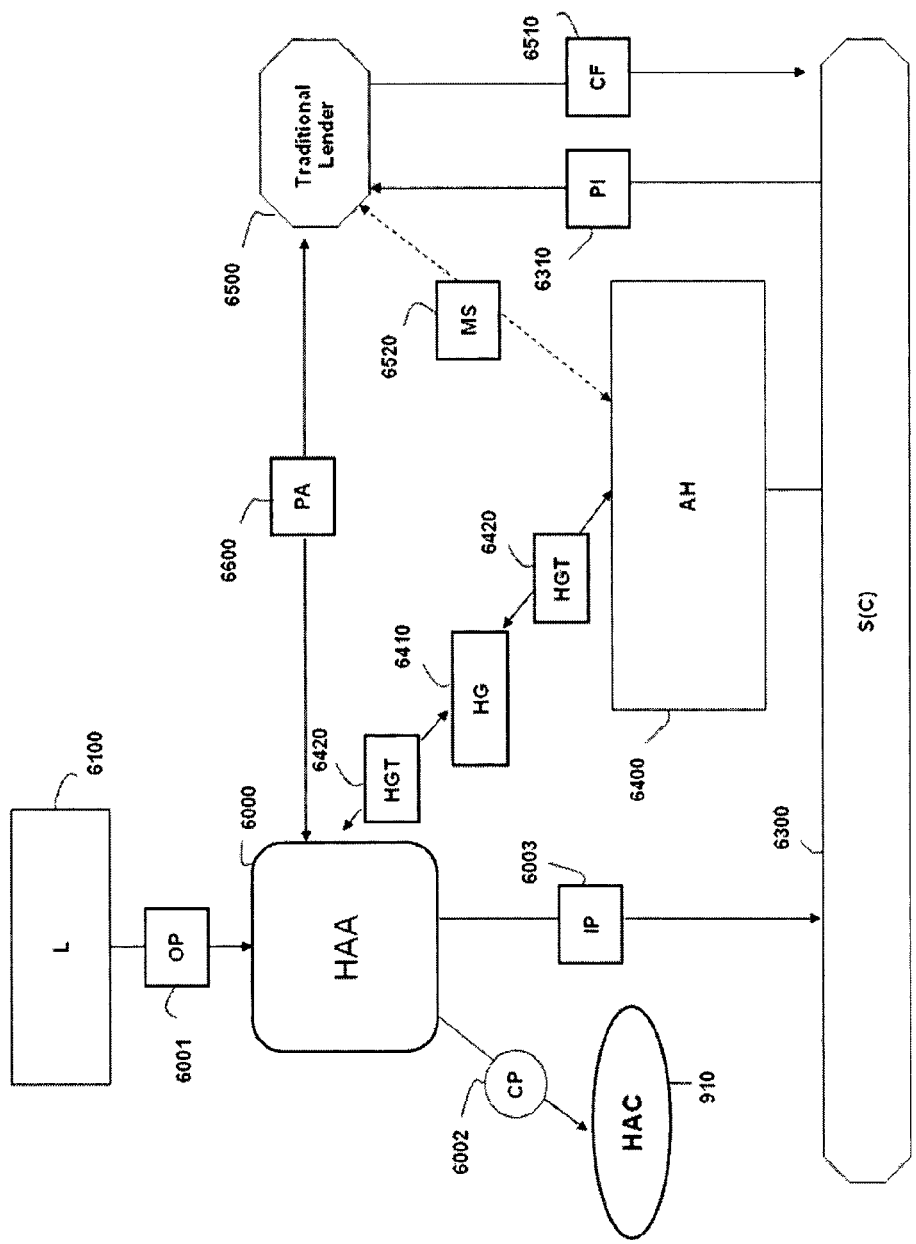
FIG. 11 is a schematic flow chart of a home annuation in combination with prior art debt finance.

One embodiment of the present invention enables the generation and administration of agreements which combine home annuation with prior art interest bearing debt as illustrated at FIG. 11. A saver (consumer) ("S(C)") 6300 purchases affordable home ("AH") 6400 using prior art interest bearing debt, or capital finance ("CF") 6510 which is secured over AN 6400 by mortgage security ("MS") 6520. As a result, S(C) 6300 is obliged to make payments of principal and interest ("PI") 6310 to traditional lender ("Tl") 6500, such payments made more affordable in this example by the present invention enabling home annuation agreement (HAA") 6000 to derive payments of ongoing principal ("IP") 6003 which can be used by S(C) 6300 to offset the cost of PI 6310 on an ongoing basis. For TL 6500, this conceivably reduces the risk of S(C) 6300 defaulting upon PI 6310 thereby reducing the inherent 'risk premium' (usually expressed in basis points) it needs to charge to lend CF 6510; again making AH 6400 more affordable.

A further element for this type embodiment is Priority agreement ("PA") 6600 which may limit the recourse of TL 6500 under MS 6520, to the value of CF 6510, so that increases in the value of AH 6400 can migrate as horizon gain ("HG") 6410 to HAA 8000. In contrast, the capital guarantee for this type embodiment may be limited; so that lender ("L") 6100 may receive a capital guarantee on his ongoing payments ("OP") 6001 (or otherwise calculated as qualifying outgoings), only to the extent that the sum total of said OP does not exceed that value of equity not prioritised under PA 6600 for the benefit of TL 6500, or his horizon gain allocation value ("HGAV"), whichever is the greatest. Further exemplified by way of example, if AH 6400 is purchased for a total cost of $500,000.00 and TL 6500 provided CF 6510 equal to 90% of the total purchase cost, then accordingly PA 6600 may limit the recourse of TL 6500 to $450,000.00. It follows that the initial limit of capital guarantee provided under HAA 6000 in favour of L 6100, may be limited to $50,000.00 until such time as the value of his HGA exceeds this amount, or more directly where all horizon gain is applied to increase the capital guarantee offered, on a 1:1 basis regardless of L6100's HGA As and when desired, L 6100 may assign his interest in HAA 6000; whether in default or active and it will be appreciated that L 6100 may represent a plurality of lenders. Likewise, IL 6500 may be representative of a plurality of prior art lenders, whose lending is redeemed as S(C) 6300 chooses to refinance from time to time. The MRC of HAA 8000 may be conveniently set to mirror any prior art finance redemptions, or when S(C) 6300 ceases to occupy AH 6400, or an upper value limit for AH6400 so that S(C) 6300 could potentially redeem HAA 6000 without sale by refinancing prior art debt that has become more affordable in relation to earnings of S(C) 6300. The combined system 500 can generate all such embodiments of the present invention, without limitation, as well as provide administration of said arrangements on an ongoing basis. In FIG. 11, said administration is carried out by the home annuation custodian ("HAC") 910, who receives remuneration and reimbursement via custodian Payment ("CP") 6002.

C. Combined Prior at Debt and Home Annuation Finance Fund

Figure 29:
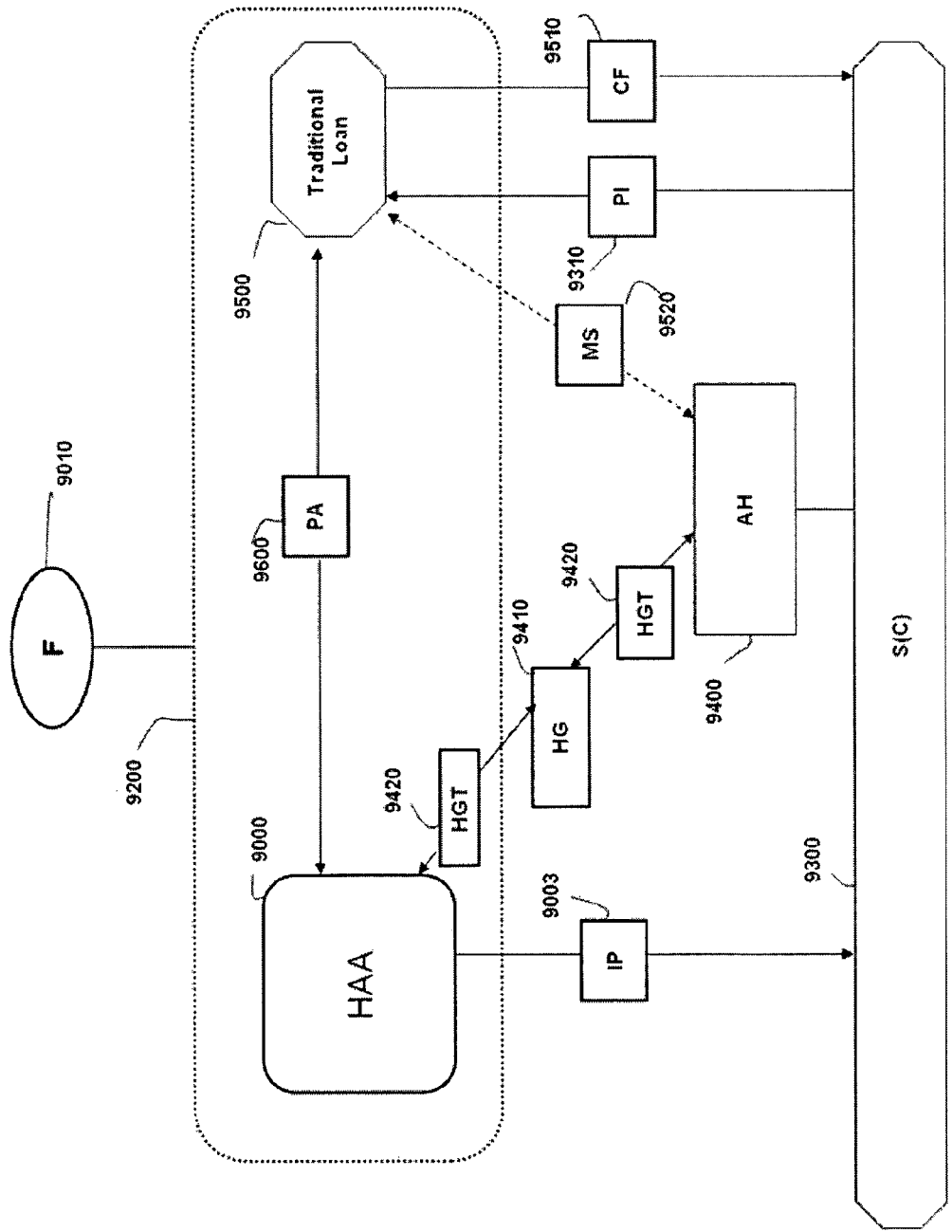
FIG. 29 is a schematic flow chart representing an embodiment which combines prior art interest bearing debt and multiple agreements of the present invention and pools resultant instruments.

The description of FIG. 11 directly above demonstrates a favourable net outcome for S(C) 6300, by operating HAA 6000 in conjunction with finance from a TL 6500. FIG. 29 depicts a home (or otherwise) finance fund that wraps both prior art debt finance and home annuation into one product for S(C) 9300. The resultant "Combination loan" ("CL") 9200 provides capital finance ("CF") 9510, secured over affordable home ("AH") 9400 via mortgage security. ("MS") 9520. The Priority agreement ("PA") 9600 may still be made internally within the fund ("F") 9010 and integral to the CL 9200 itself to maintain flexibility in funding for F 9010. The home annuation agreement ("HAA") 9000 accrues horizon gain ("HG") 9410 from AH 9400 via horizon gain transfer ("HGT") 9420 and pays ongoing principal ("IP") 9003 in return. As with other embodiments of the present invention, the lender under HAA 9000 will benefit from HG 9410 to the extent it has been allocated to him and depending upon particular application of the greater of rule. Under these arrangements that form CL 9200, S(C) 9300 pays principal and interest ("PI") 9310 and is entitled to IP 9003, although in effect PI 9310 may be reduced by the amount of IP 9003 so that only the net amount is paid by S(C) 9300. By way of example, suppose CF 9510 is issued at a LTV of 90% on AH 9400 with a market value of $500,000.00, PI 9310 represents interest only payments on the amount of $450,000.00 calculated at 8.5% per annum and HG allocation is set at 60% (in favour of lender) which derives an annual IP 9003 of $9,600.00. If the lender were to have only lent CF 9510 of $450,000.00 at an annual interest rate of 8.5%, then his Interest only return (PI 9310) would be $38,250.00, which also represents the cost to S(C) 9300 in obtaining CF 9510. Alternately, if traditional loan ("TL") 9500 is combined with HAA 9000 to form CL 9200, then after the first year (assuming asset appreciation of 5% per annum), total earnings for F 9010 generated by CL 9200 would equal cash income of $28,650.00 ($38,250.00-$9,600.00) plus 60% of HG 9410 equal to $15,000.00. Together, the cash and HG equal $43,650.00 which represents a further $5,400.00 of earnings for F 9010 in comparison to PI 9310 where derived from TL 9500 in isolation. This also translates to a reduced cost of housing for S(C) 9300 of $9,600.00 per annum, thereby reducing the risk to F 9010 of S(C) 9300 defaulting on repayments. Extending this scenario to year 10 and with an appreciation that no further capital was extended from F 9010 to S(C) 9300, but rather the return on PI 9310 was offset by IP 9003, the extent of free leverage available under the CL 9200 model results in additional annual earnings (In excess of TL 9500 used in isolation) growing from $5,400.00 in year 1 to $13,700.00.

The advantages of HAA 9000 combined with TL 9500 to form CL 9200 can be further demonstrated by comparison with a shared appreciation (i.e. equity finance) arrangement. Due to the fact that prior art shared appreciation systems advance a set principal or capital sum (or allocate such, where the principal is drawn down gradually by the borrower), F 9010 will have needed to advance $150,000.00 on a 1:2 ratio (loan to appreciation share) in order to achieve the rights to 60% of capital appreciation, as obtained under HAA 9000. As these prior art shared appreciation arrangements do not provide for an ongoing cash flow (i.e. such as IP 9003 under HAA 9000) that can potentially extend out to over 50 years or more, it is not possible to structure the offset arrangements seen with CL 9200 in relation to PI 9310 and IP 9003. This all translates to a simpler funding structure for F 9010 if implementing CL 9200, as the total effect of CL 9200 is that F 9010 is lending $450,000.00 at 6.4% (plus investment returns through HGA) rather than 8.5%, whereas a more complex funding structure arises for funds combining prior art shared appreciation with interest bearing debt. For example, to provide total funding of $450,000.00 a shared appreciation loan of $150,000.00 would need to be funded, which has zero cash flow for investors until redemption; along side a $300,000.00 loan earning investors to a fund 8.5% per annum.

In the context of the CL 9200 and F 9010 described directly above, an embodiment of the present invention is presented which may be described as a method for offsetting interest expense to consumers, or perhaps, a method for reducing the risk of borrower default under interest only lending, or perhaps, a method for obtaining investment returns from zero capital outlay in conjunction with interest bearing finance.

D. Affordable Housing and Intergenerational Pensions

A further embodiment of the present invention applies to existing pension funds that require cash flows to match their regular pension payments to members. By establishing affordable housing funds, which by way of home annuation, allow savers (consumers) to occupy the housing in return for IP (cash to the pension fund to meet its pension liabilities), the pension fund, rather than holding a Government bond which returns a yield with a fixed redemption value, holds real residential property (in the form of housing) that returns a yield and has a redemption value that continues as long as the parties need and want it to. Because the asset held by the pension fund (residential property combined with home annuation), has a potentially long term redemption value and no set redemption date, the present invention enables an "asset backed intergenerational system" to operate as part of an overall pension and retirement system. Unlike prior art systems (I.e. German system—$1^{st}$ pillar) an asset backed intergenerational system is capable of smoothing out the effects of population cycles. The population growth forecasts for Australia require expansion of existing housing stock; new (or existing) housing made available to "new workers" (i.e. immigrants or young entrants) at an affordable level by invoking home annuation to provide divisibility in housing and immediately engage "new workers" in a progressive retirement saving strategy, utilises consumer outgoings not previously redirected to retirement savings. Where consumers under prior art systems pay rent or interest on borrowings in order to afford housing, the present invention in one embodiment described herein allows for a consumers pre-retirement housing expense to be re-directed into asset backed retirement savings, as well as immediate use as an intergenerational transfer to present retirees. With the precondition to redemption of the home annuation (by the borrower—in this case pension fund) set to retirement of the lender, when said lender reaches retirement age, their "cost of housing" has accumulated to a retirement benefit at least equal to their qualifying outgoings (cost of housing) and potentially beyond depending upon horizon gain entitlements established at the outset of the agreement. Critical though, is the surety added to the intergenerational arrangement provided by the asset backing under the present invention, whereby a forecast increase in the dependency ratio resulting in less workers to support retirees, can be offset by leveraged growth in the value of ongoing principal (at constant "yield") in comparison to non-leveraged indexation of pension payments, combined with, redemption of potentially long term ongoing asset value (sale of properties). To illustrate:

(i) Based upon a dwelling of value equal to $500,000.00 at a prior art rental yield of say 4.5%, a consumer will pay $22,500.00 in annual rent. For explanation purposes, assume that this is equal to the payment made by a consumer under a home annuation intergenerational affordable housing arrangement. A capital appreciation in the property of 5% per annum over ten years will raise the capital asset value to $814,447.00 which translates to annual rental payments, or in this case IP, of $36,650.00. In this embodiment an increase in value of $14,150.00. By contrast the single pension benefit of $562.10 per fortnight (as at Jan. $1^{st}$ 2009), indexed at say 3% per annum, provides for an increase in annual pension benefits of approximately $5,000.00. To match the leveraged increases available through asset backed intergenerational transfer of the IP, the single benefit pension would have required an annual indexation rate of 7%.

(ii) In this embodiment of the present invention, retirement (from the workforce after reaching the Government prescribed age or other age where agreed between parties) of the lender operates as a condition precedent to redemption by the borrower under the agreement, although it will be appreciated that in most applications of this embodiment, redemption will not be a lump sum, but rather an intergenerational transfer from the subsequent housing occupier to the retiree. The previous occupier who is now the retiree will effectively receive an income (which may be classed as a housing supplement) based upon the qualifying outgoings accrued during time of occupancy plus an uplift for horizon gain entitlement. Payment of the "uplift" is possible due to the leveraged increase in IP (akin to prior art Rent) now paid by the present housing occupier. It is feasible to say that the retiree can re-direct the income (or housing supplement) directly to their cost of housing in retirement. At present those who own their own home outright or benefit from public rental housing in retirement do not suffer the particular stresses which avail those retirees who are exposed to the more expensive private rental market. It will be appreciated that this home annuation intergenerational embodiment of the present invention can alleviate poor retirement outcomes which presently result from the described housing constraints. Striving for home ownership in order to secure good outcomes in retirement has contributed to the "asset rich—cash poor" retiree. A predicament in itself that can be alleviated by the present invention, or for which the present invention poses a solution via a preferred embodiment described in relation to FIG. 3a to FIG. 6b.

It has been demonstrated that alternate embodiments of the present invention can be employed to address several aspects of a consumers saving and retirement lifecycle, including but not limited to; providing income for retirees as occupiers of their owned home whilst concurrently ensuring growth in personal wealth; enabling prior art "cost of housing" to be redirected to retirement saving through intergeneration arrangements leveraged upon affordable housing; and, offset the cost of home ownership or cost of housing generally by invoking an embodiment of the present invention which provides IP by way of borrowing receipts. It will also be appreciated that the scale of divisibility in housing enabled by the present invention brings a new definition to affordable housing in the sense that workers in essential services (i.e. teaching, nursing, police) can be provided with access to rights (akin to ownership) over the capital appreciation in housing in otherwise unaffordable locations.

(iii) With underlying asset backing to an intergenerational system, not only is it possible to redirect a consumers "cost of housing" for immediate use by current retirees, with benefits from leveraged growth in these costs when compared to pension indexing; short shocks in the dependency ratio can be overcome by 'asset sales', whilst long term trend increases in the dependency ratio can be combated by increased investment in affordable home annuation housing thereby increasing IP injected into the intergenerational system.

Figure 10:
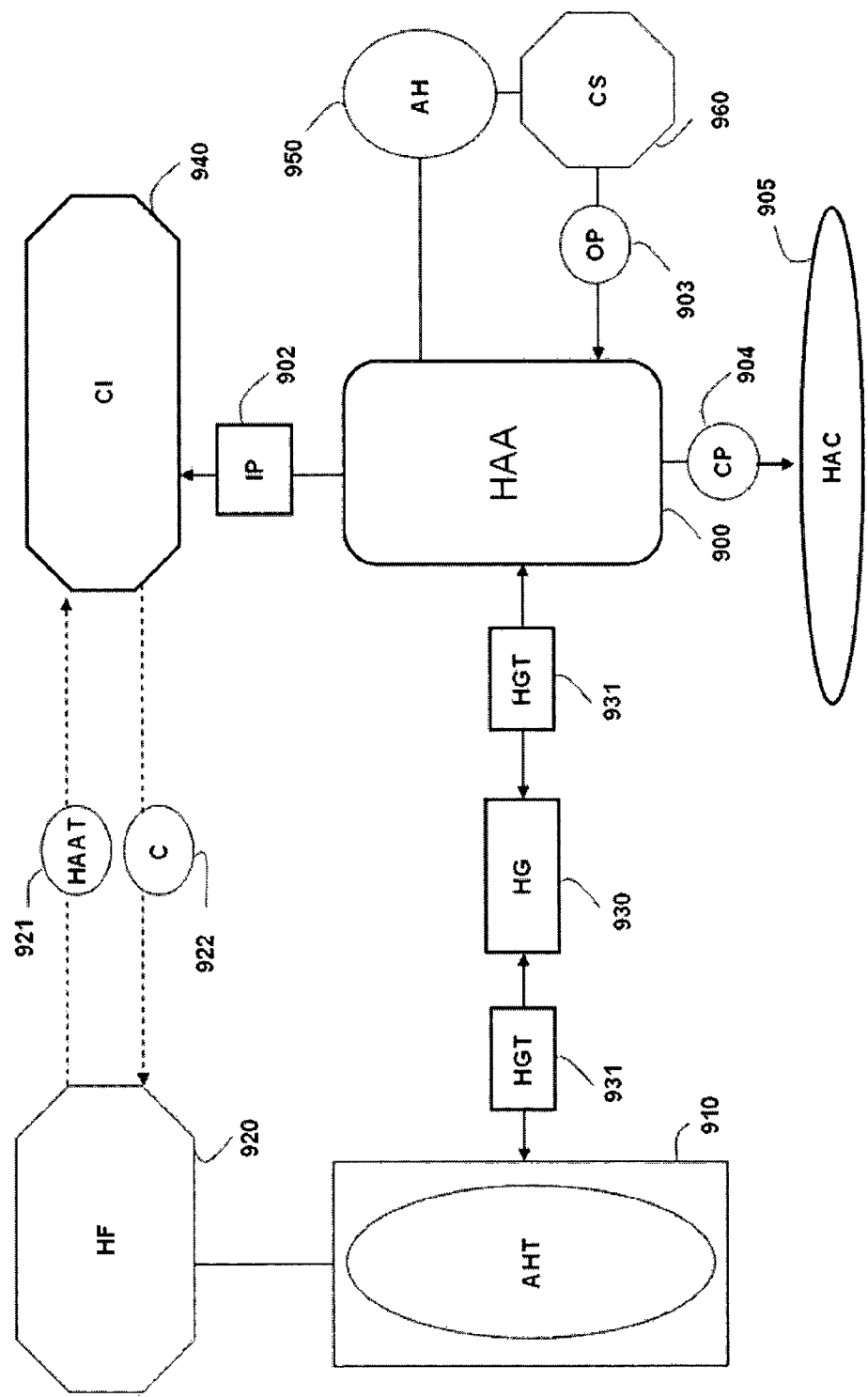
FIG. 10 is a schematic flow chart of an affordable housing fund assignment of home annuation agreement (borrower end) to a consumer (or other) HAAT investor.

The 'asset sales' described directly above may take the form of home annuation agreement transfer ("HAAT") rather than a transfer of title. With reference to FIG. 10, the housing fund ("HF") 920 retains full ownership of the affordable home title ("AHT") 910 over which the home annuation agreement ("HAA") 900 is secured and makes HAAT 921 in exchange for capital ("C") 922. Under the terms of said HAAT, a consumer investor ("CI") 940 (or otherwise) may obtain the rights to payments of "IP" 902 derived from HAA 900, under which, consumer saver ("CS") 960 makes ongoing payments ("OP") 903 and occupies affordable home ("AH") 950 (owned by HF 920 in possession of AHT 910). The extent to which horizon gain ("HG") 930 is transferred into HAA 900 may be adjusted to suit the level of capital HF 920 is looking to obtain immediately versus long term forecasts for capital requirement. By way of example, a HAAT 921 made in relation to a HAA 900 where horizon gain horizon gain transfer ("HGT") 931 is zero, may be made from HF 920 to CI 940 at C 922 of $250,000.00, where the open market value of AHT 910 may be $500,000.00. In relation to prior art rental yields on residential property, CS 960 may expect to pay an annualised rent of $22,500.00 representing a yield of 4.5%. If for the purpose of this example, OP 903 is set just above so that IP 902 equals $22,500.00 (taking into account CP 904 paid to HAC 905), CI 940 would be receiving a 9% annual yield on his investment of $250,000.00. Extending the above example (at (i) above) of 5% per annum asset appreciation over ten years; if the prior art rental yield remains constant at 4.5% (or now $36,650.00) and OP 903 is again set Just above this level so that IP 902 equals $36,650.00, Ci 940 would be receiving an annual yield of 14.6% on his investment of $250,000.00. Conceivably then, CI 940 could assign his rights and obligations under HAA 900 at a 9% yield for approximately $407,223.00, representing a capital gain of approximately $157,223.00 (less of course any loss to redemption). Conversely, where CS 960 is only paying rent of $12,500.00 per annum, representing a yield of 2.5% upon the initial open market value of AHT 910, HAAT 921 could be issued at a C 922 of $138,888.00 and still represent a 9% yield for CI 940, or is still issued at $250,000.00 for a yield to CI 940 of 5%. The assignment value of HAAT 921 may also be affected by external economic conditions such as Government bond yields. Under the terms of HAAT 921, or HAA 900 (as the case may be), there may be provision for HF 920 to redeem a HAAT 921 instrument at a discount to C 922; where growth in the value of IP 902 has effectively increased the value of the rights to receive said IP 902 as bestowed upon CI 940 via HAAT 921. Furthermore, in variations to this embodiment, HAAT 921 may contain provisions that fix or place a ceiling upon the value of annual payments to CI 940, so that, as the value of IP 902 increases via whatever form of indexation applied (or other measure), monies in excess of the fixed amount or ceiling would be paid to HF 920. In addition to such returns and redemption offsets, HF 920, having issued HAAT 921, can measure any capital gains in the value of AHT 910 against capital outstanding of $250,000.00 (where HF 920 originally invested $500,000.00 in AHT 910). Using the above appreciation rates of 5% per annum for 10 years, AHT 910 will have an open market value of $814,447.00; a capital gain of $314,447.00 over the starting capital value and a return on capital invested ($250,000.00) equal to approximately 8.5% per annum compounding. (adding to this of course, any portion of IP 902 received by HF 920 whilst HMT 921 was in issue as well as any redemption offset applied to the value of C 922 when HMT 921 is redeemed by HF 920). When the need for capital that caused HF 920 to issue HMT 921 subsides, redemption by HF 920 may typically cause the whole of IP 902 to once again be paid directly to HF 920.

For CS 960, the terms of HAA 900 may provide them with a proportion of HGA so that a lump sum is payable upon retirement (or other point in time as the case may be), or perhaps a further premium to the asset backed intergenerational pension that CS 960 may receive. It will be appreciated that CS 960 may occupy AH 950 as a lender under HAA 900 and accordingly may choose to cease OP 903 at any time. In respect of this embodiment, default by CS 960 upon OP 903 may result in cessation of the right to occupy AH 950 and loss of some proportion of HG or qualifying outgoings that may have been allocated or subject to capital guarantee, whether payable at retirement or some other nominated point in time.

Importantly, embodiments of the present invention such as that described directly above, redefine affordable housing, so that the affordability need not be in direct relation to the value (or location) of, a home. It can be appreciated that a more expensive home in a more expensive location can transpire to be 'more affordable' to both HF 920 and CS 960, than a cheaper and less conveniently located home.

The affordable, divisible, home annuation housing embodiment of the present invention described directly above is further unique in that it introduces an element of capitalism to "affordable housing", or alternately expressed, retains capitalist benefits within a social democratic, combined; saving, retirement income, affordable housing and intergenerational system. Furthermore, these embodiments can be accessed and employed by consumers at a personal level or embraced by Government and institutional funds at a macro level. The practical application or effect of this is that introducing this type of divisibility and affordability to housing does not remove incentive for individuals to strive for "better housing" in "better locations" as the home annuation mechanisms employed ensure that the more an individual pays into housing throughout their working life, the greater the retirement benefit they may receive from this source. For example, paying a higher ongoing principal (IP) to live in "better housing" transpires to greater free leverage due to higher capital values and thereby greater horizon gain potential. When the worker (lender/saver) retires, they may thereby have, through higher ongoing principal contributions and potentially higher horizon gain returns due to increased free leverage, built up a greater entitlement (to be paid as an ongoing sum somewhat equivalent to an annuity). Essentially, the arrangements created by the present invention are a windfall gain to consumers who would under prior art housing systems have paid rent or interest expense in order to afford housing, without direct recompense. It should be appreciated that retirees in receipt of benefits from an asset backed intergenerational arrangement are not precluded from owning and occupying their own home and that said benefits may be in addition to other investments, superannuation or pension income that they have accrued over time. The present invention comprises an innovative system for generating and maintaining consumer wealth, enabling divisibility in real assets (particularly housing), transforming its usability and access to it from a wider social demographic, as well as raising its status and purpose as a retirement saving and income asset class.

Figure 7:
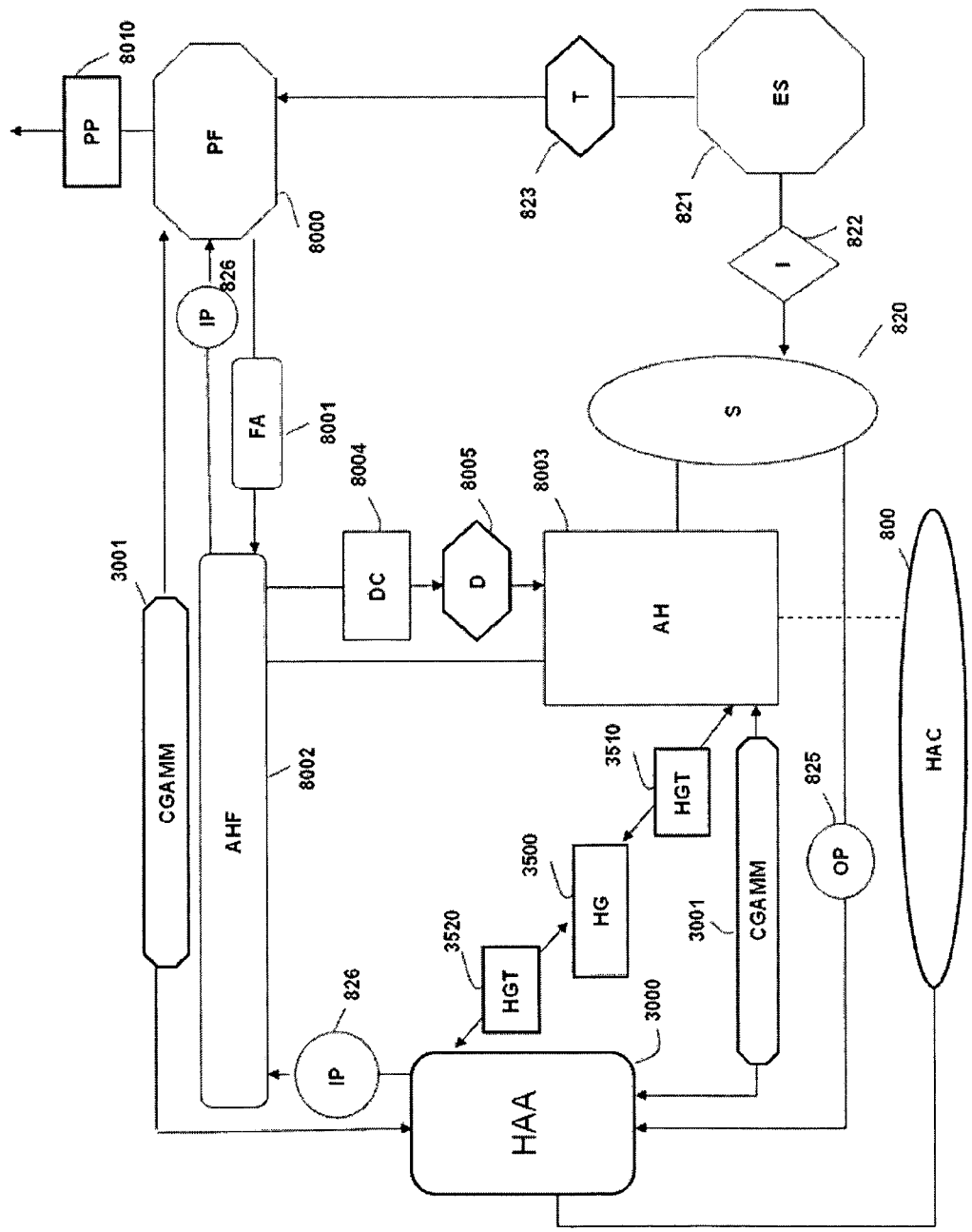
FIG. 7 is a schematic flow chart of an affordable housing home annuation intergenerational retirement saving and retirement income embodiment of the present invention.
Figure 8:
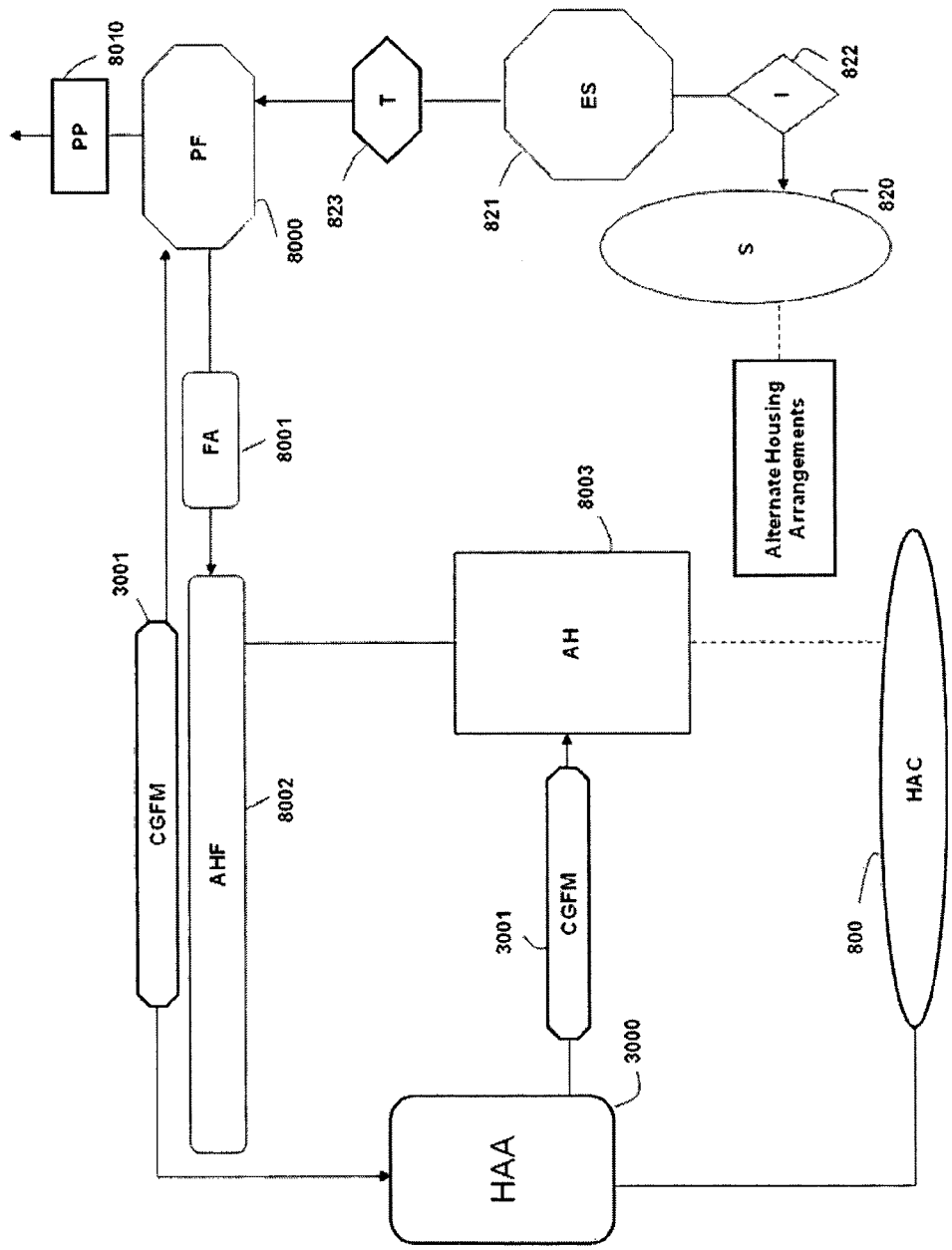
FIG. 8 is a schematic flow chart of an affordable housing home annuation intergenerational retirement saving and retirement income embodiment of the present invention, where the first home occupier has vacated or defaulted.
Figure 9:
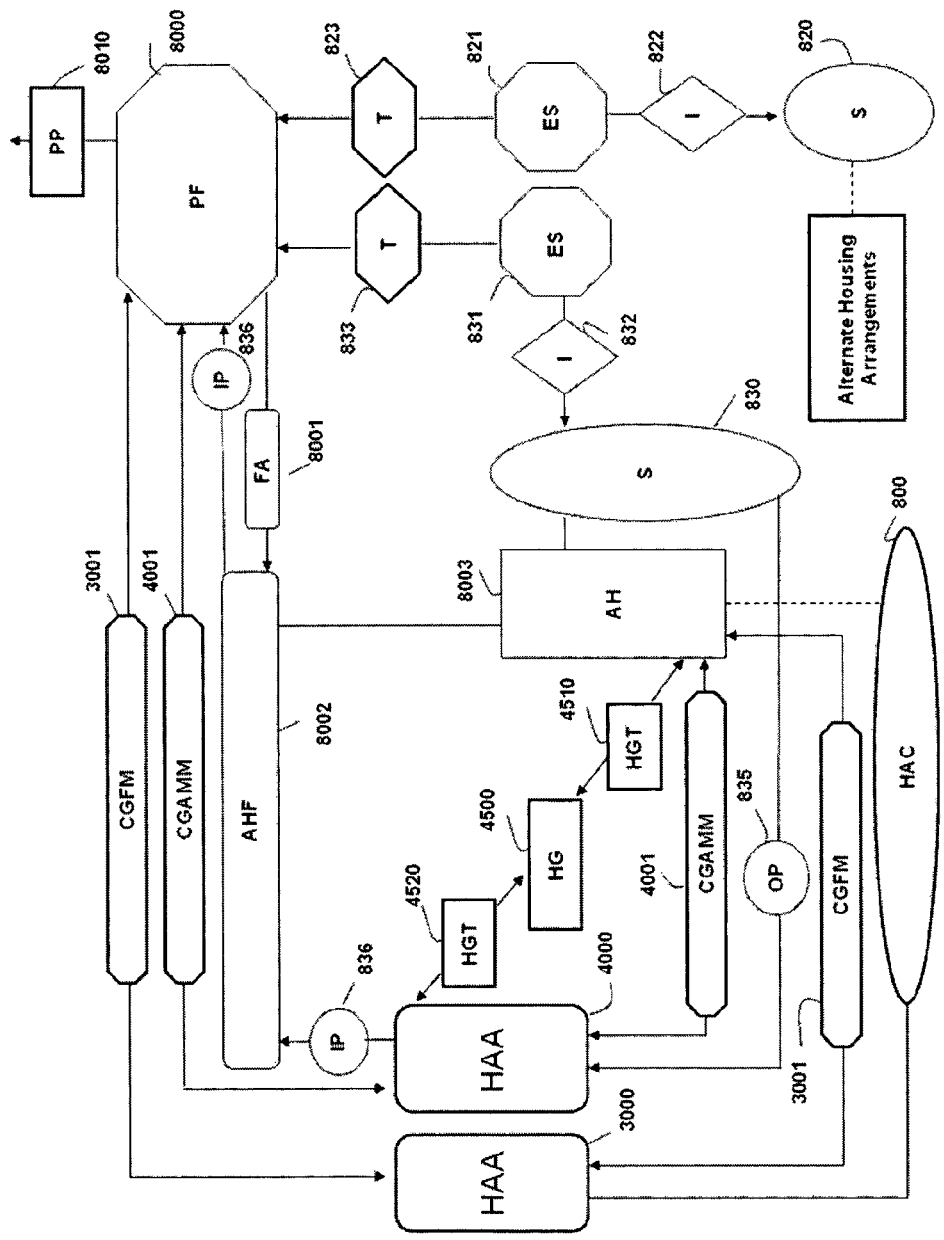
FIG. 9 is a schematic flow chart of an affordable housing home annuation intergenerational retirement saving and retirement income embodiment of the present invention, depicting a replacement home occupier in place.

FIG. 7, FIG. 8, and FIG. 9 describe one potential embodiment of the present invention as it may apply to affordable housing, pensions, retirement saving and retirement income, whereby saver ("S") 820 receives income ("I") 822 from employment source ("ES") 821, from which a portion of his taxation ("T") 823 is contributed to a pension fund ("PF") 8000 affordable housing fund ("AHF") 8002 receives funds allocation ("FA") 8001 from PF 8000, in order that development Costs ("DC") 8004 for affordable home ("AH") 8003 are fully funded and developer ("D") 8005 is remunerated accordingly. It will be appreciated that the cost of obtaining capital amount FA 8001 (Ignoring administration expenses) may be considered as zero, given it is deposited at PF 8000 without charge or expectation of some form of return (i.e. interest); and further appreciated that PF 8000 has a main objective of maximizing the retirement income to be received by S 820 throughout his retirement.

Home annuation agreement ("HAA") 3000 is formed and secured over AH 8003, such that AHF 8002 is a borrower under the arrangement receiving "IP" 826 and S 820 is a lender under the HAA 3000 arrangement; contributing ongoing payment ("OP") 825. The capital guarantee all monies mortgage ("CGAMM") 3001 is secured over AH 8003 with the benefit of this security extended to PF 8000 who effectively holds this benefit on behalf of S 820 until retirement, or in respect of an intergenerational pension system, immediately employs IP 826 via pension payments ("PP") 8010 to current retirees on the basis that AH 8003 will house a subsequent retirement saver when S 820 has retired and thereby provide an intergenerational pension system, but with asset backing, so that an increase in the retirement dependency rate requiring an additional capital input to an intergenerational pension system can be funded in the long term by increasing the number of AH 8003's and in the short term via home annuation agreement transfers ("HAAT") (see FIG. 10). It will be appreciated that the present invention enables PF 8000 to apply FA 8001 IN a manner which allows S 820 to leverage his retirement saving contributions. For example, where ES 821 provides for contributions to PF. 8000 of perhaps nine percent of 1822 (i.e. $100,000.00*0.09=$9,000.00), if PF 8000 enables HAA 3000 by developing AH 8003, S 820 may be able to contribute a further twenty two and a half percent of his pre-taxation income to an intergenerational retirement savings system (based upon AH 8003 market value of $500,000.00 with prior art 'rental' yield of 4.5% or $22,500.00). Where it is necessary for PF 8000 to demonstrate a return on FA 8001, a basic return may be measured in relation to the value of IP 826; and where provided for in the terms of FA 8001 and HAA 3000, any HG allocation which is allocated to PF 8000.

Should S 820 desire to vacate AH 8003, the home annuation custodian ("HAC") 800 ensures that CGAMM 3001 is converted to CGFM 3001 (FIG. 8) in accordance with the particular terms of HAA 3000. The value of CGFM 3001 may be recognised as an asset backing to 'retirement benefit rights' accrued by S 820 via HAA 3000 during the period in which he occupied AH 8003 and contributed to the system. It will be appreciated that this embodiment of the present invention, describing an asset backed intergenerational retirement saving and income system, could operate in addition to prior art systems or in the place of some prior art systems.

FIG. 9 depicts a subsequent saver ("S") 830 in occupation of AH 8003 under the terms of HAA 4000, which is secured by way of CGAMM 4001. Whilst the fundamentals of the arrangement and interactions between S 830, AHF 8002 and PF 8000 may be similar to that depicted in FIG. 7, the AH 8003 need only be built once and after ten years provides an asset backing of approximately $814,447.00 (if the above examples of 5% annual asset appreciation are extended to here), whilst CGFM 3001 secured over AH 8003 would only have an approximate value of $320,000.00 (again extended the previous example of a prior art rental yield of 4.5% equalling, in this case, OP825 and OP 835). As with all embodiments of the present invention, variations, without limitation, to the treatment of capital guarantee and HG allocation may be present, as well as a variety of variations to mandatory redemption criteria and the indexation methods for IP. In addition, whilst the explanation directly above describes affordable housing, asset backed intergenerational retirement saving and income systems and a form of housing bond or derivative in the form of a HMT (FIG. 10), it will be appreciated that without limitation the present invention can equally be applied to; retirement housing complexes/villages; nursing homes; hospitals; holiday homes; general housing accommodation; ski chalets; hotels; resorts; offices; regardless of the funding or source of asset over which the HA agreements and thereby surrounding arrangements are secured.

E. For SMSF Trustees

For smaller funds such as Self Managed Superannuation funds ("SMSFs"), trustees may invoke the present invention as a unique method for holding and deriving an income from residential property. Applied as such, home annuation enables a retiree (whether in occupation or not) to:

(i) Derive a greater income from residential property than possible through the rental market as it is expected that savers (lenders/investors) will pay a premium to participate in a share of horizon gain with a capital guarantee.

(ii) Collaborate with occupiers (prior art tenants) who under the present invention have a vested interest in the value of a property (keeping in mind that horizon gain and capital guarantee can be adjusted downwards by a factor of between zero and one hundred percent in case of default) and who are thereby arguably more inclined to meet their monthly payment obligations and care for a property.

(iii) Hedge their own longevity risk by maintaining ownership of a capital asset which can produce for them "leveraged income growth".

(iv) Enable eventual transfer of asset sale proceeds to the retiree's estate, which is not possible with many purchased annuity products.

(v) Combine those applications described in i) to iv) above, in relation to a saver (lender) occupied agreement, with the benefits of home annuation over the retiree's (borrowers) own home (with "life expiry" or "in occupation" mandatory redemption clauses) so that income from two different assets is achieved.

F. Consumer Direct Securitisation

The present invention allows a direct interaction between consumers as savers (lenders or investors as they may be called from time to time) and counterparty consumers as borrowers (retirees or home owners as the case may be) without excluding superannuation and pension funds who may (where allowed by mandate and in law), through the custodian of the agreement, lend directly to the consumer borrowers without the financial leakage of a securitization process run by the financial industry. While the custodian of the agreement carries out all elements administrative in relation to; the agreement; counterparty; and underlying asset, the lender (consumer investor, superannuation or pension fund) may, with assistance of the custodian as required, perform internal pooling of the home annuation home annuation agreements to which they are a party. The contributions (OP which Include IP) that lenders make to the agreement are; i) secured directly by a real asset; II) capital assured in respect of all qualifying outgoings which includes directly attributable costs regardless of the underlying asset value and in the case of no lender default (which is unlikely for Superannuation funds), a capital assurance upon total horizon gain allocation; iii) made on a monthly (or otherwise) basis in amounts which in aggregate, would take between 1 and 50 years, depending upon the particular embodiment of the present invention, to equal the underlying capital guarantee value over the real asset. Returns upon each home annuation agreement, and collectively where pooled, are dependent upon the value of the lenders horizon gain allocation, as derived from the underlying asset value and "asset division" thereof. In relation to this embodiment of the present invention and using an example whereby the mandatory redemption criteria is set to "life expiry", the value of a pool of home annuation agreements can be valued as for pools of senior life settlement backed securities although without exposure to the risk of the entity who originally issued the life policy (and ultimately collects the investors 'premium') and without the risk of total loss should the investor (lender) be unable to meet the ongoing premium. In respect of this same example, the home annuation near equivalent to a life insurance premium is the OP (inclusive of IP) required to be paid on a regular basis. The risk of total loss for the investor is mitigated by home annuation through the mechanism that ensures all qualifying outgoings are capital assured and directly secured upon a real asset. Continuing further with this example, evaluation and assessment of a pool of home annuation agreements can be achieved within the Superannuation or pension fund itself using well established valuation techniques used in relation to pools of viators and life settlements, for assessing the percentage change in the value of a funds pool of home annuation agreements in relation to percentage changes in time and changes in time respectively.

G. A Hedge to Mortality Risk

Life insurance companies can use home annuation agreements as a unique method to hedge mortality risk; as has been done, but with direct asset ownership, in the European viager market for many years.

It is possible to assemble a self-hedged portfolio by using the premiums from life insurance policies (which exposes the issuing entity to mortality risk) and apply them to home annuation agreements which provide a lump sum payment upon a borrowers (retirees) death—thereby hedging exposure to mortality risk. Corresponding longevity risk generated by entering into the home annuation agreements will, depending upon the level of premiums, be offset by the life insurance premiums the insurer receives until an individual's death. If individuals, en masse, stop paying into life insurance policies, the life insurer can itself stop paying into the home annuation agreements and on-sell (assign) the agreements post default at a discount to the fixed mortgage (conversion value) or prior to default at a potential premium to the present value of their qualifying outgoings or horizon gain share ("greater of" rule) under each agreement. Conversely, a failure by the life insurer (saver, lender, investor, mortality risk hedger, as the case may be) to meet the required payments upon a prior art viager (or life policy premiums) will ensue a forfeit of the transaction and complete loss of all monies paid by the investor up until the point of default by the investor. It has therefore been difficult to construct hedging arrangements using viager for companies looking to hedge life insurance policies they have issued; whereby, a drop in premiums received from policy holders may require the life insurer to default upon any viagers they have entered causing total loss, unless of course they are able to on-sell the agreements. The present invention, as it applies to home annuation agreements, would allow life insurance Companies (or individuals looking to hedge mortality risk, as the case may be) to cease payments into a home annuation agreement without total loss; retaining the right to on-sell (assign) the defaulted HA agreement. Or where the life insurance provider holds numerous HA agreements, they may choose to default on a sufficient number such that they can maintain the payments upon the remaining HA agreements they hold until these remaining HA agreements can be sold as active HA agreements and thereby priced to include for any horizon gain accrued in the investors (life insurers) favour.

It will be appreciated that the present invention is unique and different to viager on numerous counts:

(i) with viager ownership of the property is passed to the investor at the outset in return for either (or a combination of) lump sum payment and ongoing annuity, whereas the present invention ownership of the asset does not change hands at the outset of the agreement regardless of the form of embodiment.

(ii) viager does not provide a capital assurance to the investor (saver, lender), whereas the present invention comprises a capital assurance upon qualifying outgoings, or part thereof depending upon the particular embodiment (or particulars in home annuation agreement), and may also include capital guarantee upon part or all of the horizon gain if so disclosed within a particular home annuation agreement.

(iii) The present invention enables divisibility in real property assets without necessarily invoking co-ownership or joint venture agreements—it is a unique form of agreement in itself. This is not possible with viager.

(iv) viager (and similarly with Home Reversion) does not provide for any of the asset to pass to the borrower's estate. The present invention is quite the opposite with the entire "preserved estate value" ("PEV") passing to the occupier's estate upon death; in the case that life expiry has been set as a mandatory condition for redemption.

(v) viager is a property transfer with subsequent life tenancy contract where it is therefore not possible to apply a flexible range of mandatory redemption criteria as can be applied in the present invention.

(vi) The present invention comprises a capital guarantee upon some pre-agreed ratio of qualifying outgoings and/or horizon gain share.

H. Heterogeneous Derivative

At a consumer level (or otherwise), home annuation agreements can be assigned at either borrower or lender end. It would be readily appreciated by those skilled in the financial arts that a HA agreement in default and thereby of fixed redemption value may trade at a discount to its redemption value, thereby taking account for time value of money and opportunity cost in comparison with other forms of investment. Similarly yet in contrast, an active HA agreement that continues to accrue HG may trade at, or at a premium to HGV, where such value is in excess of a lenders qualifying outgoings at that point in time. Even where HGA is below QO value, the active HA agreement may be traded (assignable) at a premium to QO on expectations of future appreciation in the agreement asset and thereby increases in HGV of the HA agreement.

Beyond the secondary market assignment mechanisms described directly above, the structure of the present invention enables primary lenders of HA agreements to create agreement certificates ("MPAC's") which can be transferred temporarily from one party (a lender) to another (MPAC lender) who is obliged to return the MPAC's either at the end of an agreed term or upon demand from the lender. A MPAC lender may also return an MPAC voluntarily. When a MPAC has been returned to the primary lender, a MPAC lenders obligations in relation to that MPAC may cease, notwithstanding that whilst on loan an MPAC may have been on lent numerous times.

Figure 30:
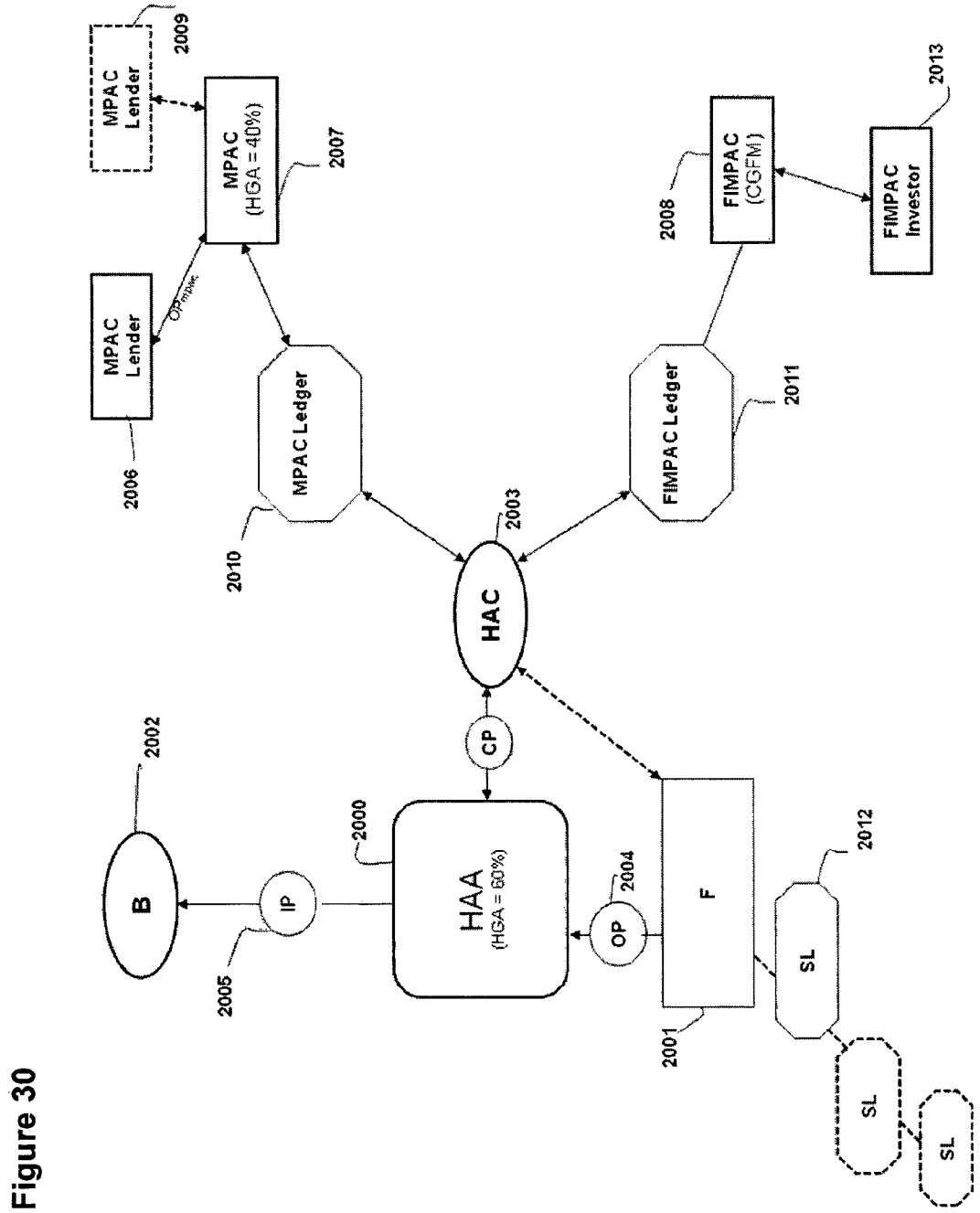
FIG. 30 is a schematic flow chart demonstrating the evolution of heterogeneous derivatives markets for multiple agreements of the present invention.
Figure 31:
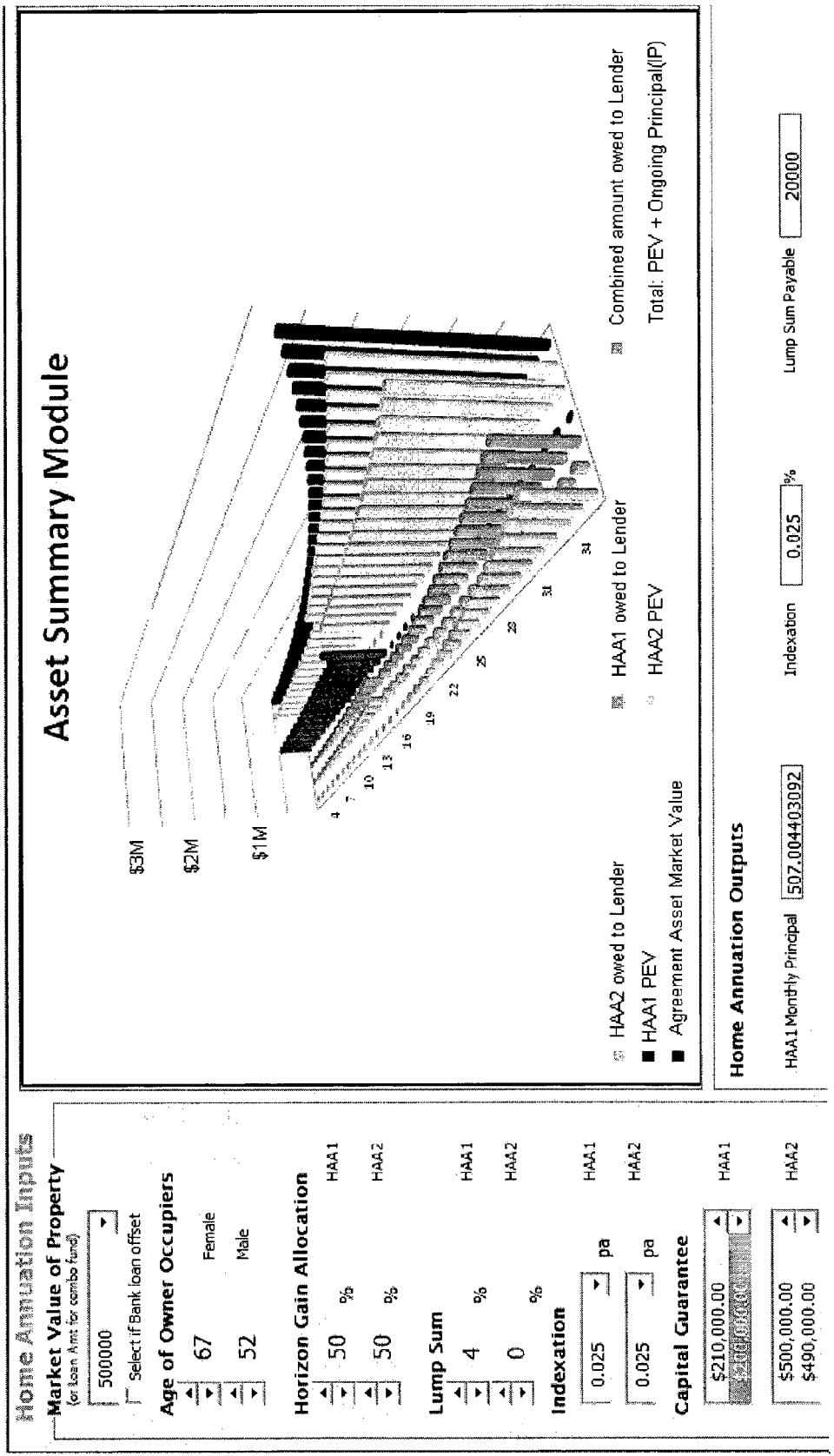
FIG. 31 is a screenshot of a prototype 'combined system' 500 in a system state providing graphical depiction of the 'asset summary module' with multiple agreements in varying states secured over the agreement asset.
Figure 32:
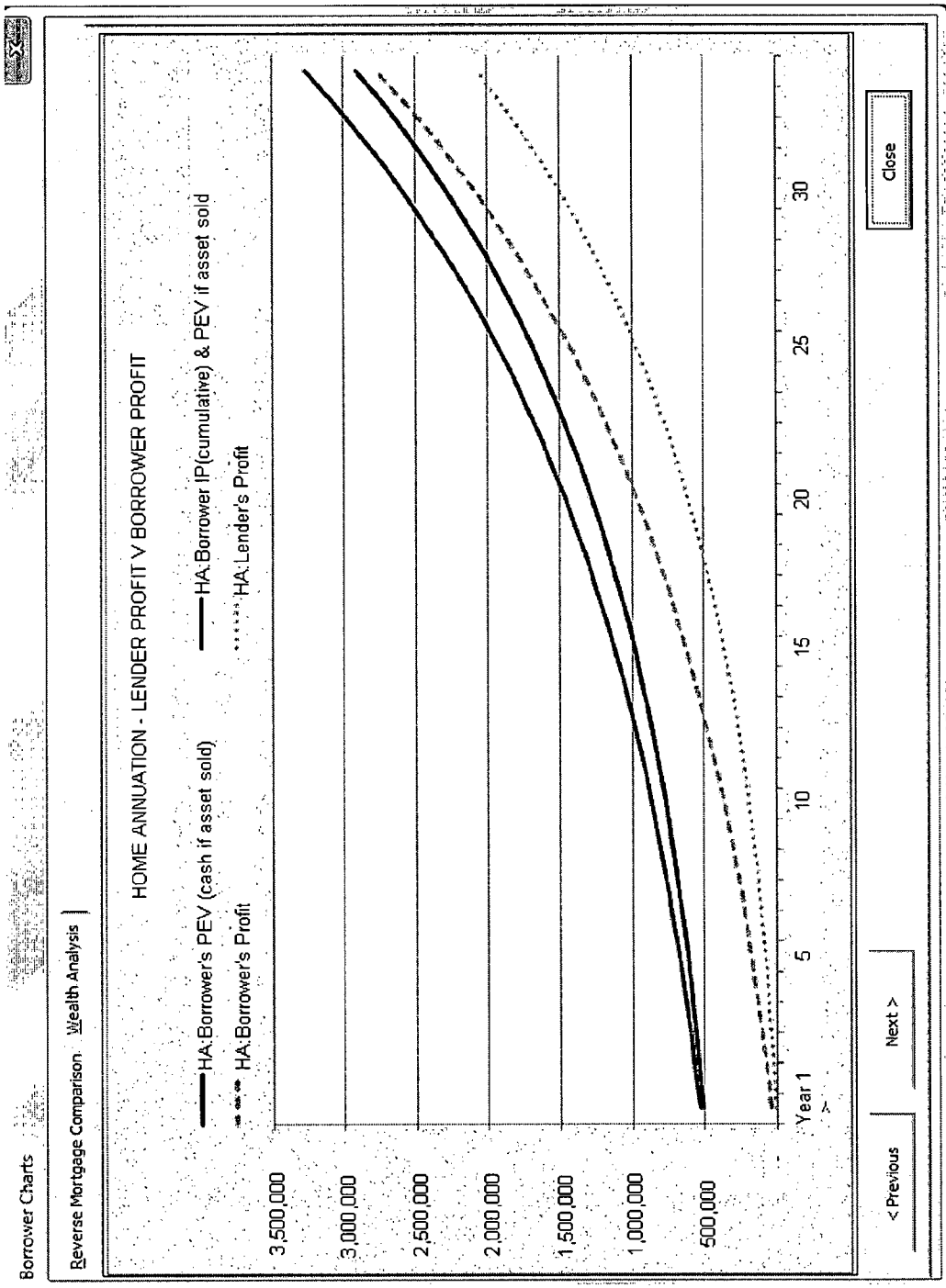
FIG. 32 is a screenshot of a prototype 'combined system' 500 in a system state providing graphical depiction of one of the borrower and lender comparison mechanisms.
Figure 34:
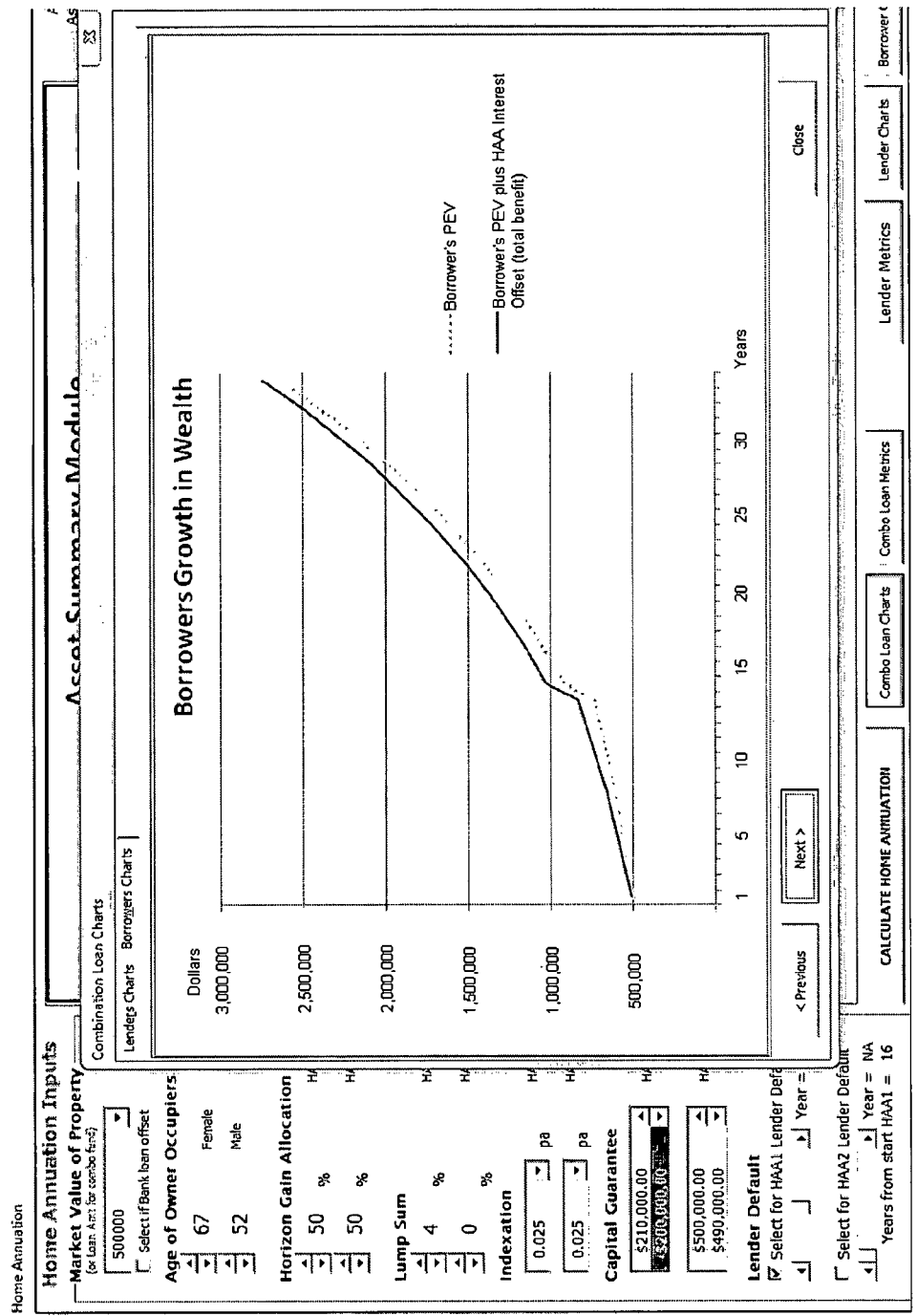
FIG. 34 is a screenshot of a prototype 'combined system' 500 in a system state providing graphical representation of one aspect of a borrowers outcome under a combination loan (combo loan) agreement.
Figure 35:
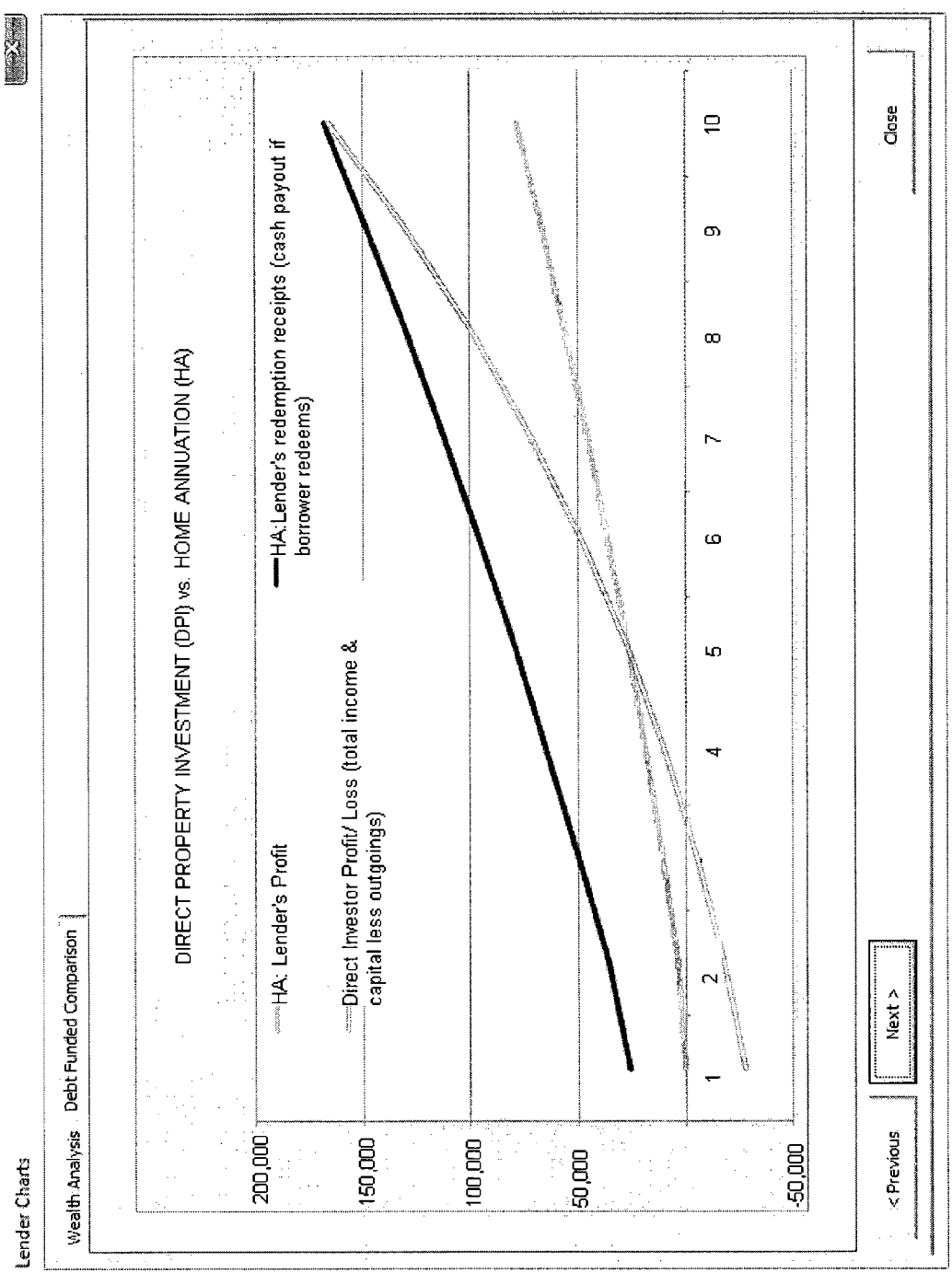
FIG. 35 is a screenshot of a prototype 'combined system' 500 in a system state providing graphical representation of a lenders outcome as a result of investing an amount of money into an agreement generated and administered under the systems of the present invention as compared with an equivalent amount of money invested via prior art residential property investment methods.
Figure 36:
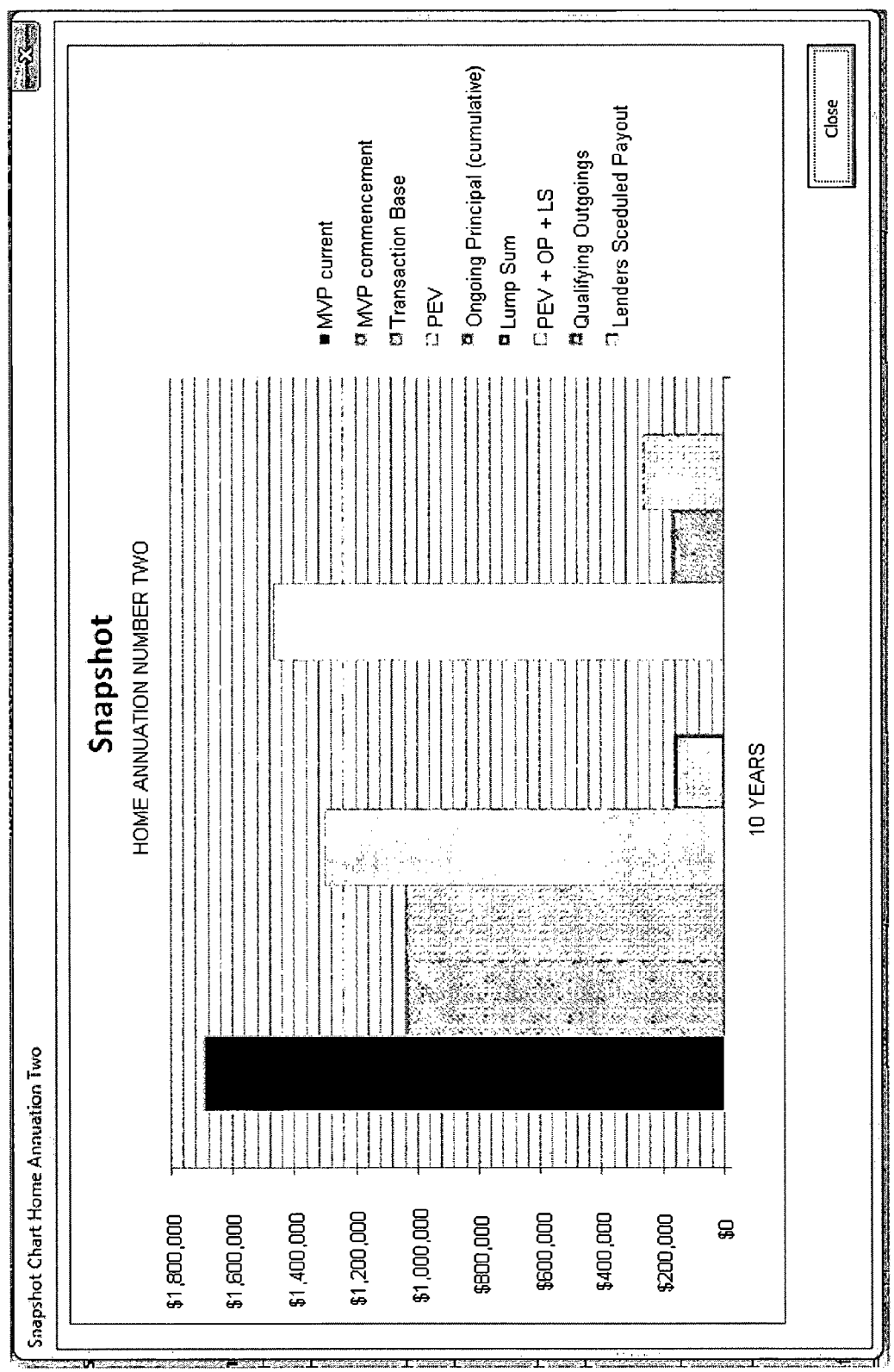
FIG. 36 is a screenshot of a prototype 'combined system' 500 in a system state providing graphical representation of a second home annuation agreement secured over an asset division and providing a snapshot of forecast outcomes at year 10 of the agreement for a system operator nominated rate of asset appreciation.
Figure 37:
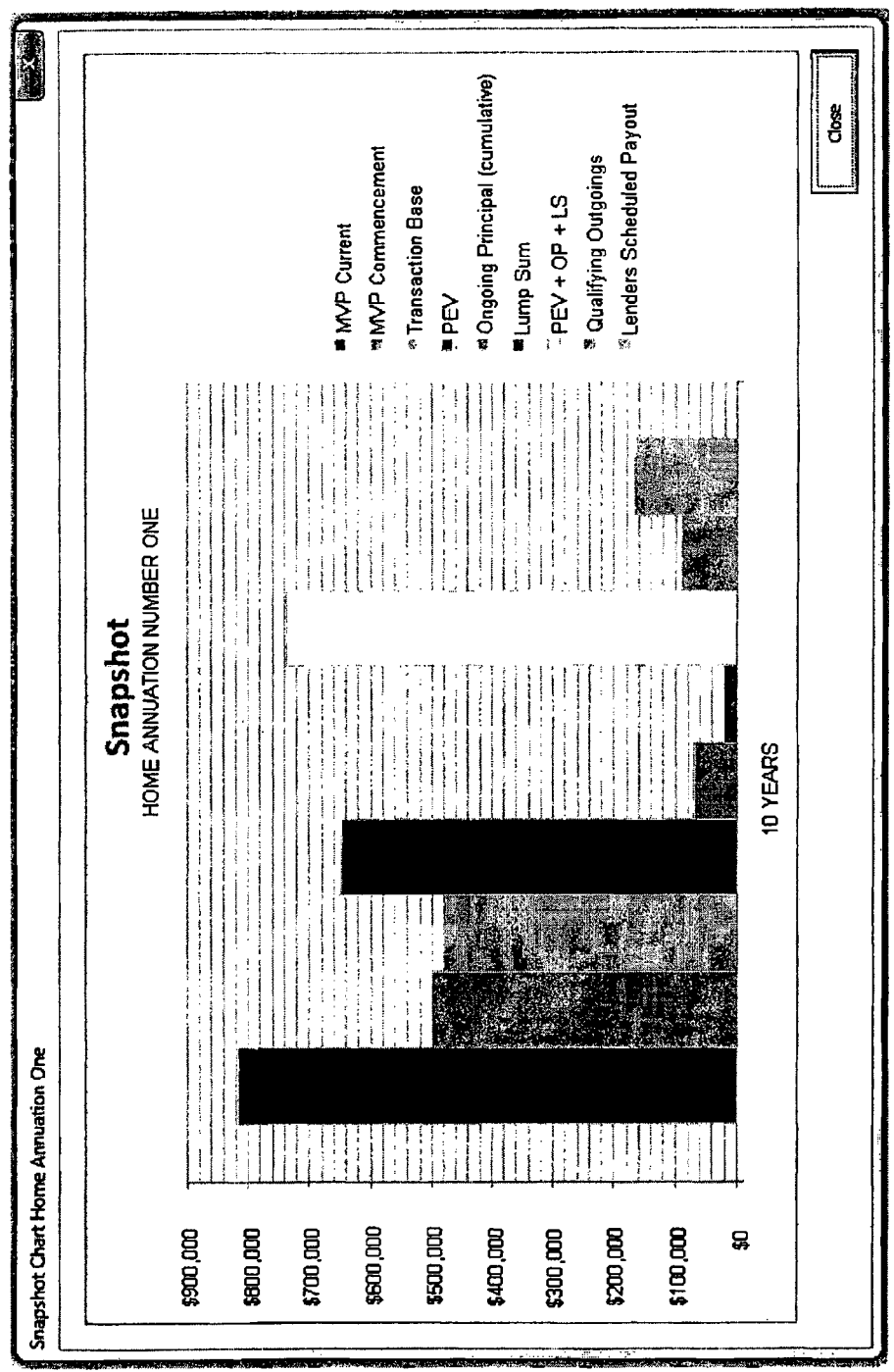
FIG. 37 is a screenshot of a prototype 'combined system' 500 in a system state providing graphical representation of a first home annuation agreement secured over an asset division and providing a snapshot of forecast outcomes at year 10 of the agreement for a system operator nominated rate of asset appreciation.

During the period a MPAC lender holds the MPAC he accrues horizon gain at the stated allocation and in return pays the stated ongoing payment amount (particular to each MPAC) and may be required to contribute collateral upfront which is substantially equivalent to reserve monies under a HA agreement. By way of non-limiting example and in reference to FIG. 30, a fund ("F") 2001, as primary lender, is a counterparty to borrower ("B") 2002 under a HA agreement overseen by home annuation custodian ("HAC") 2003. Whilst F 2001 may be a counterparty to many such HA agreements, in respect of the single HA examined in this example, the HGA under the agreement is sixty percent of the asset division over which the HA agreement is secured. As primary lender, F 2001 holds the head obligation to make ongoing payments ("OP") 2004 under home annuation agreement ("HAA") 2000, in order that borrower ("B") 2002 may receive "IP" 2005. In this embodiment, default rules may be set so that in case of F 2001 (or some other assignee) defaulting upon OP 2004 such that the CGAMM is ordinarily converted to a CGFM, the CGFM will include for qualifying outgoings or forty percent (or some other value) of horizon gain for the asset division to which HAA 2000 relates. Ordinarily, the greater of rule may be applied in the conversion calculation from CGAMM to CGFM. Under these circumstances, it is possible for F 2001 to issue an MPAC secured over HAA 2000 so that MPAC lender 2006 receives MPAC 2007 which includes rights to forty percent horizon gain (or some other proportion not greater than the horizon gain lender default floor under HAA 2000). The MPAC may be administered by HAC 2003 on the combined system 500 or a duplicate version thereof. The greater of rule may also apply to MPAC's so that MPAC lender 2006 continues to accrue horizon gain value whilst he continues to pay ongoing payment ("$OP_{MPAC}$") in addition to the collateral reserve monies contribution he may have made at the outset, whereby his MPAC value is the greater of his QO's or HG. The HAC 2003 maintains a ledger of each MPAC which records the value accrued under each period of ownership by a particular entity. Calculation of value accrued may be substantially the same as for HAA 2000, whereby a valuation is carried out before settlement and before assignment or at the time of conversion following default by a MPAC lender. Alternately a particular MPAC may specify that valuations of the agreement asset and accordingly asset divisions thereof, be established in relation to an Approved valuation under HAA 2000 and adjusted thereafter by the same percentage fluctuation as has occurred in a recognised House (or other asset) price index over the corresponding time period in substantially the same geographical area and preferably of a hedonic composition. Under these valuation methods, MPAC's may be considerably more liquid than HAA 2000 and certain lenders may prefer holding a higher number of MPAC than HA agreements to achieve substantially the same investment outcome.

An MPAC may be issued by F 2001 to mirror the mandatory redemption criteria of HAA 2000, notwithstanding F 2001 may choose to demand the return of an MPAC at any time prior. Suppose the mandatory redemption criteria for HAA 2000 is a combination of "life" and "in-occupation" so that a forecast term may be derived from life expectancy tables, yet mandatory redemption could arise far sooner should B 2002 choose to vacate the real property asset before such life expiry. In the period leading up to mandatory redemption, MPAC lender 2006 may choose to assign (or on-lend) MPAC 2007 by requesting an assignment valuation, albeit potentially calculated using a recognised house price index as described above, in order that he may register the greater of horizon gain or qualifying outgoings accrued over the period he held MPAC 2007. Under terms contained within the particular MPAC the combined system 500 calculates the conversion value of MPAC 2007, in this instance converting MPAC lender 2006's interest to a fixed investment agreement certificate ("FIMPAC") 2008 and reserve monies refunded, whilst. MPAC 2007 is re-issued to new MPAC lender 2009 at a zero starting balance for QO's and HGV; until such time as MPAC lender 2009 has contributed collateral reserve monies and commenced ongoing payments so that QO's and HGV begin to accrue. FIMPAC 2008 may then be tradable on its fixed value and potentially priced at a discount to its redemption value taking into account time value of money, notwithstanding an early redemption may be possible under mandatory redemption criteria. A further, non-limiting example of when said early redemption may occur is in relation to accelerated asset growth when mandatory redemption criteria set under HAA 2000 is related to an upper value in the agreement asset.

For F 2001, the incentives for creating and issuing MPAC's off the back of a HAA potentially arise through opportunities to create a return from very low capital requirements. By using what is potentially a sound reputation, strong covenant and established brand to achieve settlement upon numerous HAA arrangements, F 2001 may write MPAC's so that the cost of ongoing payments are covered by OP contributions from MPAC lender 2006 (& subsequent assignees) whilst a percentage share of horizon gain is maintained as a capital return. Alternatively, F 2001 may choose to allocate a higher percentage share of HG to a MPAC in order to derive a higher OP from a MPAC lender and thereby receive a positive immediate cash flow from the transaction. It will be appreciated that the modules and procedures within the various combined system 500 may only need those procedures and calculation methods described herein to construct, issue, administer and close MPAC and FIMPAC arrangements.

With MPAC's written and secured over the HAA 2000, assignment of said HAA 2000 by F 2001, to Subsequent lenders ("SL") 2012 is carried out in accordance with those procedures described earlier in relation to the combined system 500. The MPAC ledger 2010 and FIMPAC ledger 2011 are further ledgers within the AMS 400, PPS 401 and TA 402; with pricing and valuations performed by sub procedures of Y, $Y_{vcn}$, Z, Zc; that may be executed at a subordinate level to each HAA within AOVVS 100 and PM101 or substantially duplicate systems thereof.

1. Longevity Risk Management System

The present invention, by virtue of an indexed IP, overall design and configuration of certain embodiments, provides for effective longevity risk management for retirees. Not only does a borrower (retiree) benefit from a right to receive ongoing principal IP payments, but where a lender defaults upon his obligation to provide the ongoing payments (OP inclusive of IP) under a home annuation arrangement, the borrower may regain rights to some or all horizon gain that may have accrued in favour of the lender.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

For example the software development of a preferred embodiment of the present invention may involve utilisation of a platform such as Access™ 2007 with a SQL server backend database facility. However, it is also envisaged that alternatively web-based interfaces could be utilised where the SQL server database facility would be able to support such an interface as would be understood by the person skilled in the art. Moreover, key components of a preferred embodiment may comprise tabulated database components for the following:

'Borrowers', which comprises details of each borrower,

'Borrowers Contacts', which comprises details for each borrower contact and may include multiple contacts for each borrower, 'Assets', which comprises details of each Asset held by each Borrower;

'Assets Divisions', which comprises details of each Asset Division created in an Asset or Borrowers Asset;

'Investors', which comprises details of each investor;

'Investors Contacts', which comprises details of each Investor Contact and can include multiple contacts for each Investor;

'Offers', which comprises details of each Offer linking an Asset Division to a Borrower. It is to be noted this table may be combined with the Agreements table and a Status used to convert from Offer to Agreement;

'Agreements', which comprises details of each Agreement linking an Asset Division to a Borrower, including the Required Minimum Balance and current Lender balance;

'Agreements Allocations', which comprises details of the allocation of each monthly payment amongst borrower, management fee, and utilities, etc.;

'Agreements Transactions', which comprises details of each transaction including monthly payments and redemptions;

'Agreements Documents', which comprises links to each document including certificate of title, valuation and insurance, etc.;

'Consultants', which comprises details of each Consultant who is authorised to create Agreements, including User ID, Password, level of access, key dates, etc.;

'System Parameters', which comprises system-wide parameters including current name and address of Home Annuation Council; indexation rates, redemption criteria, life expectancy;

'Bank Accounts', which comprises details of the Cash Trust Account(s) used;

'Bank Transactions', which comprises all transactions uploaded from the Bank for matching against Agreement Transactions;

'Employees', which comprises details of each Staff member with access to the database, including User ID, Password, level of access, etc.;

'Agreement Types', which is used to define characteristics of different agreement types HARI, HAIRO, etc.;

'Agreement Status Codes', which is used to classify an Agreement as Offered, Agreed, Default, Cancelled, etc.;

'Borrower Status Codes', which is used to classify a Borrower as Unqualified, Qualified, Registered, Transactional, Cancelled, etc.;

'Investor Status Codes', which is used to classify an Investor as Unqualified, Qualified, Registered, Transactional, Cancelled, etc.;

'Process Flow Steps', which is used to define processing steps and timelines;

'Product Rates', which is used to store interest and principal rates.

Further to this, key components of a preferred embodiment may also comprise input enquiry forms utilised by the user for the purposes of entering and enquiring on data in the system such as for the following:

'Borrowers & Contacts', which is used to maintain details of each Borrower and contacts;

'Assets & Divisions', which is used to maintain details of each Asset held by each Borrower and Divisions that are available for Agreements;

'Investors & Contacts', which is used to maintain details of each Investor and contacts;

'Offers', which is used to maintain details of each Offer linking an Asset Division to a Borrower;

'Agreements, Allocations & Documents', which is used to maintain details of each Agreement linking an Asset Division to a Borrower, including the Required Minimum Balance and current Lender balance; also provides details of the allocation of each monthly payment amongst borrower, management fee, and utilities, etc, and links to each document including certificate of title, valuation and insurance, etc.;

'System Parameters', which is used to maintain system-wide parameters; and key reference tables including Consultants, Employees, Status Codes, Bank Accounts, Agreement Types, Product Rates and Process Flow Steps;

'Bank Reconciliation', which is used to import all transactions uploaded from the Bank and match against Agreement Transactions.

Further to this, key components of a preferred embodiment may also comprise reports that are a software construct utilised by the user to report on information in the system such as for example, the following:

'Retirement Income Agreement', which is used to print a Retirement Income Agreement;

'Interest Rate Offset Agreement', which is used to print an Interest Rate Offset Agreement;

'Investor Asset Divisions List', which is used to list Investor Asset Divisions by status;

'Investor Status Summary', which is used to print a summary for an Investor listing values and transactions; 'Borrower Status Summary', which is used to print a summary for a Borrower listing values and transactions;

'Borrowers Offer Document', which is used to print an Offer for the Borrower and Investor;

'Default Letters—Investor & Borrower', which is used to produce letters to Investors and Borrowers that are in Default;

'Redemption Letters—Investor & Borrower', which is used to produce letters to Investors & Borrowers as part of the Redemption process.

Further to this, key components of a preferred embodiment may also comprise update processes that are a software construct utilised by the system for complex update processes such as for example, the following:

'Borrower Payment Processing', which is used to process payments for Borrowers taking into account the Required Minimum Balance and current Lender balance; also initiates Default processing if required;

'Default Processing', which is used to control the Default processing as required;

'Redemption Processing', which is used to control the Redemption processing as required.

Each of the exemplary components itemised here as parts of the software development required in a preferred embodiment are also examples of computer implemented devices, systems, processes and methods necessary to effect the transformation of commercial information and data to effect the present invention and accordingly provide the advantages of the present invention in a commercially useful information technology product.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. The described embodiments are to be considered in all respects as illustrative only and not restrictive.

Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

It should be noted that where the terms "server", "secure server" or similar terms are used herein, a communication device is described that may be used in a communication system, unless the context otherwise requires, and should not be construed to limit the present invention to any particular communication device type. Thus, a communication device may include, without limitation, a bridge, router, bridge-router (router), switch, node, or other communication device, which may or may not be secure.

It should also be noted that where a flowchart is used herein to demonstrate various aspects of the invention, it should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Various embodiments of the invention may be embodied in many different forms, including computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an exemplary embodiment of the present invention, predominantly all of the communication between users and the server is implemented as a set of computer program instructions that is converted into a computer executable form, stored as such in a computer readable medium, and executed by a microprocessor under the control of an operating system.

Computer program logic implementing all or part of the functionality where described herein may be embodied in various forms, including a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or complier) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM or DVD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and inter-networking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality where described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM or DVD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

"Comprises/comprising" and "includes/including" when used in this specification is taken to specify the presence of stated features, integers, steps or components but does not preclude the presence or addition of one or more other features, integers, steps, components or groups, thereof. Thus, unless the context clearly requires otherwise, throughout the description and the claims, the words 'comprise', 'comprising', 'includes', 'including' and the like are to be construed in an inclusive sense as opposed to an exclusive or exhaustive sense; that is to say, in the sense of "including, but not limited to".

The claims defining the invention are as follows:

1. A computer-implemented automated method in a data processing system for predicting income derived from an anticipated future benefit (Horizon Gain), the method comprising the following steps:
 (a) using a computer inputting to user fields in a first database, the following values:
  (i) an initial value for an asset owned by a borrower, wherein the asset may increase or decrease in value over time,
  (ii) a Horizon Gain Allocation percentage, expressed in favour of a lender,
  (iii) the lender's target return value,
  (iv) a gearing factor, wherein the system to forecast a potential growth in asset value and therefore a Horizon Gain Allocation Value (HGAV) for any future time interval, for the gearing factor entered, and
  (v) a value representing the number and size of Asset Divisions (AD);
 (b) by said computer generating one or more databases populated with values for one or more selected future time divisions for the borrower's asset over one or more AD's before optimisation, the values being as follows and calculated according to the following formulae:
 (i) an agreed periodic payment from the lender to the borrower based on an ongoing principal value (IP) calculated according to:

$$TB0 \times HGAi \times R \times MRCc0 = IP \qquad \text{equation (1)},$$

wherein $MRCc0$ is a mandatory redemption criteria coefficient, $R$ is a coefficient chosen to optimize IP based on nominated lender and borrower returns at year n and borrower selected variables, $HGAi$ is a horizon gain allocation proportion at time=i expressed in favour of the lender, and $TB0$ is the transaction base calculated from the asset value according to:

$$ADV0 - (M)TC0 - (P)LS0 = TB0 \qquad \text{equation (2)},$$

wherein $TC0$ comprises transaction costs, $M$ is a coefficient chosen to weight the significance in value of $TC0$, $P$ is a coefficient chosen to weight the significance in value of $LS0$, $LS0$ comprises any lump sum payment including any premium loading made by the lender, and $ADV0$ is the asset division value calculated from the equation, $$AV0 \times ADP = ADV0 \qquad \text{equation (3)},$$

wherein $ADP$ is the asset division proportion input by a user, and $AV0$ is the whole of asset value, and
 (ii) an amount payable to a lender upon occurrence of a redemption event, calculated by selecting the greater of:
 an agreed proportion of appreciation of the asset (HGAV), or
 qualifying outgoings (QO),
  wherein the value of QO and HGAV is first adjusted by multiplication with a coefficient calculated or selected in relation to borrower or lender criteria; and
 (c) by said computer creating a visual display based on the values in the database or databases
  to represent predicted income derived from the anticipated future benefit.

2. A computer-implemented automated method according to claim 1, further comprising the step of, using said computer, inserting into a table a lenders qualifying outgoings (QO) value at time i calculated according to:

$$(M)TCi+(P)LS0+\Sigma OPi=QOi \qquad \text{equation (4),}$$

where ΣOP is the cumulative total of all ongoing principal (IP) and allowable administration charges and costs paid by a lender in direct relation to a particular agreement between the lender and borrower.

3. A computer-implemented automated method according to claim 1 further comprising the step, using said computer, of inserting into a table a lender's horizon gain allocation value (HGAV) at time i in order to run a lender redemption value (LRV) algorithm according to:

$$(ADVi-TBi)HGAi=HGAVi \qquad \text{equation (5),}$$

wherein the lender redemption value algorithm is used to select between HGAVi and QOi. and said lender redemption value algorithm may apply further weighting to both or either HGAVi and QOi prior to selecting between the two, such weighting being applied by way of a coefficient calculated in accordance with terms of one or more agreement between the borrower and the lender.

4. A computer-implemented automated method according to claim 1, further comprising the step of, using said computer, inserting into a table a maximum value for a capital guarantee all monies mortgage (CGAMM) where a value is set for capital guarantee at settlement "CG0", wherein,
(i) in the event of asset depreciation, the capital guarantee after settlement (CGi) reduces to nil or a negative amount, as agreed between the borrower and lender; and
(ii) in the event of asset appreciation, the said CGi increases with no upper limit and will be calculated with respect to the following limitations:
(A) at the date of settlement:

$$U0+CG0=ADV0 \qquad \text{equation (6),}$$

where U0 is the portion value of ADV0 which will remain unencumbered and CG0 is the maximum value of capital guarantee which could be applied at a time after the settlement date should the asset not appreciate in value and CG0 is varied thereafter according to agreement between the borrower and lender, so that:
CG0 will decrease proportionally to decrease in asset value until CGi=0; in which case:

$$U0-CGi=U0 \qquad \text{equation (7)}$$

and CG0 will increase proportionally to appreciation in the ADV, so that:

$$CG0+(x)HGi=CGi \qquad \text{equation (8)}$$

given that:

$$HGi=ADVi-TB \qquad \text{equation (9)}$$

wherein
HGi is the total horizon gain for the asset division, and
(x) is a coefficient selected to determine the ratio at which CGi will increase in relation to appreciation in ADV,
CGi is varied on this basis until occurrence of a redemption event or occurrence of other event according to agreement between the borrower and lender.

5. A computer-implemented automated method according to claim 1, wherein, upon occurrence of a default event, a redemption event, assignment event, or any calculation which assigns a valuation to a lender's all monies security under an agreement between the borrower and lender, and independent of the LRV algorithm, the maximum redemption value to a lender will be determined by said computer as follows:
(i) where QOi>HGAVi, the maximum redemption value to a lender is the lesser of CG0 or QOi;
(ii) where QOi>CG0 and QOi>HGAVi and (QOi−HGAVi)<CG0, the maximum redemption value to a lender will be equal to QOi;
(iii) where QOi>CG0 and QOi>HGAVi and (QOi−HGAVi)>CG0, the maximum pay out (redemption) value to a lender will be (HGAV+CG0);
(iv) where HGAVi>CG0, and (QOi−HGAVi)<CG0, the maximum redemption value to a lender is the greater of HGAV or QO as determined by the "greater of rule"; and
(v) where HGAVi>CG0 and HGAVi>QOi, the maximum redemption value to a lender would be the greater of HGAV or QOi as determined by the "greater of rule".

6. A computer-implemented automated method according to claim 2 further comprising the step of, using said computer, inserting into a table a lender's horizon gain allocation value (HGAV) at time i in order to run a lender redemption value (LRV) algorithm according to:

$$(ADVi-TBi)\ HGAi=HGAVi \qquad \text{equation (5),}$$

wherein the lender redemption value algorithm is used to select between HGAVi and QOi. and said lender redemption value algorithm may apply, by a computer, further weighting to both or either HGAVi and QOi prior to selecting between the two, such weighting being applied, by a computer, by way of a coefficient calculated in accordance with terms of one or more agreement between the borrower and the lender.

7. A computer system implementing a method according to claim 1.

8. A computer system for predicting income derived from an anticipated future benefit (Horizon Gain), wherein the system comprises:
a processor;
a storage medium, in communication with the processor, having stored thereon:
(a) first registration means for registering characteristics associated with a borrower in a first database;
(b) second registration means for registering characteristics associated with a lender in a second database;
(c) first automated means including user fields for inputting the following values to a first database;
(i) an initial value for an asset owned by a borrower, wherein the asset may increase or decrease in value over time,
(ii) a Horizon Gain Allocation percentage, expressed in favour of a lender,
(iii) the lender's target return value,
(iv) a gearing factor, wherein the system to forecast a potential growth in asset value and therefore a Horizon Gain Allocation Value (HGAV) for any future time interval, for the gearing factor entered, and
(v) a value representing the number and size of Asset Divisions (AD);
(d) automated means for generating a second database and subsequent databases as necessary populated with values for one or more selected future time divisions for the borrower's asset over one or more AD's before optimisation, the values being as follows and calculated according to the following formulae:
(i) an agreed periodic payment from the lender to the borrower based on an ongoing principal value (IP) calculated according to:

$$TB0 \times HGAi \times R \times MRCc032\ IP \qquad \text{equation (1),}$$

wherein

MRCc0 is a mandatory redemption criteria coefficient,

R is a coefficient chosen to optimize IP based on nominated lender and borrower returns at year n and borrower selected variables, HGAi is a horizon gain allocation proportion at time=i expressed in favour of the lender, and TB0 is the transaction base calculated from the asset value according to $$ADV0-(M)TC0-(P)LS0=TB0 \quad \text{equation (2)},$$

wherein

TC0 comprises transaction costs,

M is a coefficient chosen to weight the significance in value of TC0,

P is a coefficient chosen to weight the significance in value of LS0,

LS0 comprises any lump sum payment including any premium loading made by the lender, and ADV0 is the asset division value calculated from the equation:

$$AV0 \times ADP=ADV0 \quad \text{equation (3)},$$

wherein

ADP is the asset division proportion input by a user, and

AV0 is the whole of asset value, and (ii) an amount payable to a lender upon occurrence of a redemption event, calculated by selecting the greater of:

an agreed proportion of appreciation of the asset (HGAV), or qualifying outgoings (QO), wherein the value of QO and HGAV is first adjusted by multiplication with a coefficient calculated or selected in relation to borrower or lender criteria;

(e) visual display means for creating visual depictions based on the values in the database or databases to represent predicted income derived from the anticipated future benefit; and (f) automated means for responding to a redemption event by determining the value of a payment to the lender that is the greater of:

(i) an agreed proportion of appreciation of the asset (HGAV), or (ii) qualifying outgoings (QO).

9. A computer system according to claim 8, further comprising means for inserting into a table a lender's qualifying outgoings (QO) value at time i calculated, by a computer, according to:

$$(M)TCi+(P)LS0+\Sigma OPi=QOi \quad \text{equation (4)},$$

where $\Sigma OP$ is the cumulative total of all ongoing principal (IP) and allowable administration charges and costs paid by a lender in direct relation to a particular agreement between the lender and borrower.

10. A computer system according to claim 9, further comprising means for inserting into a table a lender's horizon gain allocation value (HGAV) at time i in order to run a lender redemption value (LRV) algorithm, by said computer, according to:

$$(ADVi-TBi)HGAi=HGAVi \quad \text{equation (5)},$$

wherein the lender redemption value algorithm is used to select between HGAVi and QOi. and said lender redemption value algorithm may apply, by a computer, further weighting to both or either HGAVi and QOi prior to selecting between the two, such weighting being applied, by a computer, by way of a coefficient calculated in accordance with terms of one or more agreement between the borrower and the lender.

11. A computer implemented system according to claim 10, which includes an automated means for establishing a lenders horizon gain allocation value at time i according to equation (5).

12. A computer implemented system according to claim 9, which includes an automated means for establishing lenders qualifying outgoings (QO) value at time i according to equation (4).

13. A computer system according to claim 8, further comprising means for inserting into a table a lender's horizon gain allocation value (HGAV) at time i in order to run a lender redemption value (LRV) algorithm, by a computer, according to:

$$(ADVi-TBi)HGAi=HGAVi \quad \text{equation (5)},$$

wherein the lender redemption value algorithm is used to select between HGAVi and QOi. and said lender redemption value algorithm may apply, by said computer, further weighting to both or either HGAVi and QOi prior to selecting between the two, such weighting being applied, by said computer, by way of a coefficient calculated in accordance with terms of one or more agreement between the borrower and the lender.

14. A computer implemented system according to claim 13, which includes an automated means for establishing a lenders horizon gain allocation value at time i according to equation (5).

15. Apparatus adapted to predict income derived from an anticipated future benefit (Horizon Gain) in a data processing system, said apparatus comprising:

processor and memory combined with processor adapted to operate in accordance with a predetermined instruction set, said apparatus, in conjunction with said instruction set, being adapted to perform the method as claimed in claim 1.

16. A non-transitory computer-readable medium comprising executable instructions that, when executed by a processor, cause the processor to:

perform the steps of the method of claim 1.

17. A computer system implementing a method according to claim 2.

18. A computer system implementing a method according to claim 3.

19. A computer system implementing a method according to claim 4.

20. A computer system implementing a method according to claim 5.

21. A computer system implementing a method according to claim 6.

22. Apparatus adapted to predict income derived from an anticipated future benefit (Horizon Gain) in a data processing system, said apparatus comprising:

processor and memory combined with processor adapted to operate in accordance with a predetermined instruction set, said apparatus, in conjunction with said instruction set, being adapted to perform the method as claimed in claim 2.

23. Apparatus adapted to predict income derived from an anticipated future benefit (Horizon Gain) in a data processing system, said apparatus comprising:

processor and memory combined with processor adapted to operate in accordance with a predetermined instruction set, said apparatus, in conjunction with said instruction set, being adapted to perform the method as claimed in claim 3.

24. Apparatus adapted to predict income derived from an anticipated future benefit (Horizon Gain) in a data processing system, said apparatus comprising:

processor and memory combined with processor adapted to operate in accordance with a predetermined instruction set, said apparatus, in conjunction with said instruction set, being adapted to perform the method as claimed in claim 4.

25. Apparatus adapted to predict income derived from an anticipated future benefit (Horizon Gain) in a data processing system, said apparatus comprising:

processor and memory combined with processor adapted to operate in accordance with a predetermined instruction set, said apparatus, in conjunction with said instruction set, being adapted to perform the method as claimed in claim 5.

26. Apparatus adapted to predict income derived from an anticipated future benefit (Horizon Gain) in a data processing system, said apparatus comprising:

processor and memory combined with processor adapted to operate in accordance with a predetermined instruction set, said apparatus, in conjunction with said instruction set, being adapted to perform the method as claimed in claim 6.

27. A computer usable medium having computer readable program code and computer readable system code embodied on said medium for predicting income derived from an anticipated future benefit (Horizon Gain) within a data processing system including a processor, said computer readable program code and computer readable system code causing the processor to:

perform the steps of the method of claim 2.

28. A computer usable medium having computer readable program code and computer readable system code embodied on said medium for predicting income derived from an anticipated future benefit (Horizon Gain) within a data processing system including a processor, said computer readable program code and computer readable system code causing the processor to:

perform the steps of the method of claim 3.

29. A computer program product comprising:

A computer usable medium having computer readable program code and computer readable system code embodied on said medium for predicting income derived from an anticipated future benefit (Horizon Gain) within a data processing system including a processor, said computer readable program code and computer readable system code causing the processor to:

perform the steps of the method of claim 4.

30. A computer program product comprising:

A computer usable medium having computer readable program code and computer readable system code embodied on said medium for predicting income derived from an anticipated future benefit (Horizon Gain) within a data processing system including a processor, said computer readable program code and computer readable system code causing the processor to:

perform the steps of the method of claim 5.

31. A computer program product comprising:

A computer usable medium having computer readable program code and computer readable system code embodied on said medium for predicting income derived from an anticipated future benefit (Horizon Gain) within a data processing system including a processor, said computer readable program code and computer readable system code causing the processor to:

perform the steps of the method of claim 6.

* * * * *